(12) United States Patent
Nakao

(10) Patent No.: US 8,265,700 B2
(45) Date of Patent: *Sep. 11, 2012

(54) TRANSMITTING AND RECEIVING METHOD, AND RADIO APPARATUS UTILIZING THE SAME

(75) Inventor: Seigo Nakao, Gifu (JP)

(73) Assignee: Hera Wireless S.A., Luxembourg (LU)

( * ) Notice: Subject to any disclaimer, the term of this patent is extended or adjusted under 35 U.S.C. 154(b) by 325 days.

This patent is subject to a terminal disclaimer.

(21) Appl. No.: 12/323,757

(22) Filed: Nov. 26, 2008

(65) Prior Publication Data

US 2009/0103644 A1    Apr. 23, 2009

Related U.S. Application Data

(62) Division of application No. 11/272,029, filed on Nov. 14, 2005, now Pat. No. 7,715,877.

(30) Foreign Application Priority Data

| Nov. 12, 2004 | (JP) | 2004-328780 |
| Nov. 26, 2004 | (JP) | 2004-343179 |
| Jan. 25, 2005 | (JP) | 2005-017539 |
| Jan. 28, 2005 | (JP) | 2005-022311 |
| Feb. 4, 2005 | (JP) | 2005-029859 |

(51) Int. Cl.
    *H04M 1/00* (2006.01)
(52) U.S. Cl. ............ 455/562.1; 375/260; 375/267; 455/115.1; 455/67.14
(58) Field of Classification Search .......... 375/346, 375/347, 349; 342/387, 359, 457, 382, 380, 342/451; 701/215; 455/562.1
    See application file for complete search history.

(56) References Cited

U.S. PATENT DOCUMENTS

| 6,473,467 | B1 * | 10/2002 | Wallace et al. ............ 375/267 |
| 6,600,933 | B1 | 7/2003 | Hiramatsu et al. |
| 6,751,187 | B2 | 6/2004 | Walton et al. |
| 6,931,238 | B1 | 8/2005 | Aizawa et al. |
| 7,330,513 | B2 | 2/2008 | Tsai et al. |
| 7,366,250 | B2 | 4/2008 | Mujtaba et al. |
| 7,586,881 | B2 | 9/2009 | Hansen et al. |
| 7,715,877 | B2 * | 5/2010 | Nakao ................. 455/562.1 |
| 7,738,356 | B2 | 6/2010 | Kim |

(Continued)

FOREIGN PATENT DOCUMENTS

JP    2002-26796 A    1/2002

(Continued)

OTHER PUBLICATIONS

United States Notice of Allowance issued in U.S. Appl. No. 11/272,029 dated Feb. 23, 2010.

(Continued)

*Primary Examiner* — Jean Gelin
*Assistant Examiner* — Mahendra Patel
(74) *Attorney, Agent, or Firm* — DC Patent Lawyers, PLLC

(57) ABSTRACT

A processing unit transmits, from at least one of a plurality of antennas, data corresponding respectively to the plurality of antennas. A control unit generates request signals with which to let a second radio apparatus supply information on rates at the second radio apparatus. When transmitting the request signal, the processing unit also transmits, from a plurality of antennas which includes antennas other than the antennas that transmit the data, known signals corresponding respectively to the plurality of antennas.

10 Claims, 27 Drawing Sheets

U.S. PATENT DOCUMENTS

| | | | |
|---|---|---|---|
| 7,738,924 B2 * | 6/2010 | Nakao | 455/562.1 |
| 7,899,413 B2 | 3/2011 | Nakao | |
| 2002/0127978 A1 * | 9/2002 | Khatri | 455/103 |
| 2003/0043732 A1 | 3/2003 | Walton et al. | |
| 2003/0137989 A1 | 7/2003 | Nagai | |
| 2003/0181170 A1 * | 9/2003 | Sim | 455/101 |
| 2004/0082356 A1 * | 4/2004 | Walton et al. | 455/522 |
| 2004/0192216 A1 | 9/2004 | Marzetta et al. | |
| 2004/0264592 A1 * | 12/2004 | Sibecas et al. | 375/267 |
| 2005/0035885 A1 | 2/2005 | Hosur et al. | |
| 2005/0041751 A1 * | 2/2005 | Nir et al. | 375/267 |
| 2005/0084030 A1 * | 4/2005 | Zhou et al. | 375/267 |
| 2005/0118953 A1 * | 6/2005 | Tynderfeldt | 455/63.1 |
| 2005/0152387 A1 | 7/2005 | Utsunomiya et al. | |
| 2005/0180360 A1 * | 8/2005 | Hansen et al. | 370/334 |
| 2005/0181737 A1 | 8/2005 | Kobayashi et al. | |
| 2005/0184906 A1 | 8/2005 | Nakaya et al. | |
| 2005/0201270 A1 | 9/2005 | Song et al. | |
| 2005/0219999 A1 * | 10/2005 | Kim et al. | 370/207 |
| 2005/0259567 A1 | 11/2005 | Webster et al. | |
| 2006/0013186 A1 | 1/2006 | Agrawal et al. | |
| 2006/0056540 A1 | 3/2006 | Magee | |
| 2006/0068698 A1 | 3/2006 | Sandhu et al. | |
| 2006/0105813 A1 | 5/2006 | Nakao | |
| 2006/0165191 A1 | 7/2006 | Lin et al. | |
| 2006/0227891 A1 | 10/2006 | Niu et al. | |
| 2006/0246839 A1 | 11/2006 | Nakao | |
| 2006/0246852 A1 | 11/2006 | Nakao | |
| 2006/0246853 A1 | 11/2006 | Nakao | |
| 2006/0246854 A1 | 11/2006 | Nakao | |
| 2006/0252386 A1 | 11/2006 | Boer et al. | |
| 2006/0268165 A1 | 11/2006 | Van Nee | |
| 2007/0093216 A1 | 4/2007 | Nakao | |
| 2007/0253324 A1 | 11/2007 | Ma et al. | |
| 2008/0039107 A1 | 2/2008 | Ma et al. | |
| 2008/0273494 A1 | 11/2008 | Vook et al. | |
| 2009/0103644 A1 | 4/2009 | Nakao | |

FOREIGN PATENT DOCUMENTS

| | | |
|---|---|---|
| JP | 2003-60604 | 2/2003 |
| JP | 2003-258770 A | 9/2003 |
| JP | 2003-530010 A | 10/2003 |
| JP | 2004-080110 | 3/2004 |
| JP | 2004-304760 A | 10/2004 |
| JP | 2005-039807 | 2/2005 |
| JP | 2005-073221 | 3/2005 |
| JP | 2005-506754 | 3/2005 |
| JP | 2005-198213 A | 7/2005 |
| JP | 2005-210690 | 8/2005 |
| JP | 2006-504339 | 2/2006 |
| JP | 2006-101035 | 4/2006 |
| WO | WO 01/76110 A2 | 10/2001 |
| WO | 02/099995 A2 | 12/2002 |
| WO | WO 03/001702 A1 | 1/2003 |
| WO | WO 03/034614 A1 | 4/2003 |
| WO | WO 2004/017586 | 2/2004 |
| WO | 2004/019515 A1 | 3/2004 |
| WO | WO 2004-038984 A2 | 5/2004 |
| WO | WO 2004/075451 A1 | 9/2004 |
| WO | WO 2004/095730 A1 | 11/2004 |
| WO | WO 2005/046113 A2 | 5/2005 |

OTHER PUBLICATIONS

United States Notice of Allowance issued in U.S. Appl. No. 11/476,576 dated Feb. 23, 2010.

United States Notice of Allowance issued in U.S. Appl. No. 11/476,600 dated Feb. 2, 2010.

United States Notice of Allowance issued in U.S. Appl. No. 11/476,856 dated Feb. 22, 2010.

United States Notice of Allowance issued in U.S. Appl. No. 11/476,599 dated Jan. 28, 2010.

United States Office Action, issued in U.S. Appl. No. 11/521,488, mailed Jul. 13, 2010.

T. Aoki et al., "New preamble structure for AGC in a MIMO-OFDM system," IEEE802.11-04/046r1, Jan. 2004, URL: https://mentor.ieee.org/802.11/dcn/04/11-04-0046-01-000n-new-preamble-structure-agc-in-mimo-ofdm-system.ppt.

Japanese Notification of Reason(s) for Refusal, w/ English translation thereof, issued in Japanese Patent Application No. JP 2007-146075 dated Nov. 4, 2009.

Sinem Coleri, et al. "Channel Estimation Techniques Based on Pilot Arrangement in OFDM Systems," IEEE Transactions on Broadcasting, Sep. 2002, pp. 223-229, vol. 48, No. 3.

Search Report issued in related International Application No. PCT/JP2005/020652.

International Search Report Written Opinion issued in corresponding Patent Application No. PCT/JP2005/020652, dated Feb. 21, 2006.

Japanese Office Action issued in Japanese Patent Application No. JP 2005-29859.

Namkamura, Y., et al., "Estimation of Channel and Frequency Offset in a MIMO-OFDM System," Technical Report of IEICE, pp. 79-84, RCS2004-149 (Aug. 2004), The Institute of Electronics, Information and Communication Engineers.

Nakao, S., et al., "Considerations for STS for MIMO-OFDM," IEEE 802.11-04/002r2, Jan. 2004, Slides 1-26, SANYO Electric Co., Ltd., Japan.

Japanese Office Action with English translation issued in corresponding Japanese Patent Application No. JP 2005-029859, dated Oct. 2, 2007.

Japanese Office Action with English translation issued in corresponding Japanese Patent Application No. JP 2006-087301, dated Oct. 2, 2007.

Japanese Office Action with English translation issued in corresponding Japanese Patent Application No. JP 2006-087302, Oct. 2, 2007.

Gorokhov, et al., "Transmit/Receive MIMO Antenna Subset Selection," IEEE International Conference on Acoustics, Speech, and Signal Processing, vol. 2, pp. ii-13-16, May 19, 2004.

Ogawa, et al., "A MIMO-OFDM System for High-Speed Transmission," Vehicular Technology Conference, IEEE 58th, vol. 1, pp. 493-497, 2003.

Boer, et al., "Backwards Compatibility," IEEE 802.11-03/714r0, Agere Systems, Sep. 2003.

Japanese Office Action issued in Japanese Patent Application No. JP 2007-243402, dated Nov. 13, 2007.

United States Notice of Allowance issued in U.S. Appl. No. 11/521,488, mailed Oct. 25, 2010.

United States Office Action issued in U.S. Appl. No. 12/324,163 dated Jun. 2, 2011.

United States Office Action, issued in U.S. Appl. No. 13/004,571, dated Nov. 8, 2011.

United States Notice of Allowance, issued in U.S. Appl. No. 12/324,163, dated Oct. 12, 2011.

Japanese Notification of Reasons for Refusal, issued in Japanese Patent Application No. 2009-026157, dated Aug. 16, 2011.

Japanese Notification of Reason(s) for Rejection, w/ English translation thereof, issued in Japanese Patent Application No. JP 2009-026157 dated May 31, 2011.

Japanese Office Action, and English translation thereof, issued in Japanese Patent Application No. 2009-293744 dated Jan. 31, 2012.

U.S. Office Action issued in U.S. Appl. No. 13/004,571 dated Mar. 20, 2012.

* cited by examiner

FIG.3A

| LegacySTS | LegacyLTS | Legacy SIGNAL | MIMO SIGNAL | 1ST MIMO-STS | 1ST MIMO-LTS | 1ST DATA |

| | | | | 2ND MIMO-STS | 2ND MIMO-LTS | 2ND DATA |

FIG.3B

| LegacySTS | LegacyLTS | Legacy SIGNAL | MIMO SIGNAL | 1ST MIMO-STS | 1ST MIMO-LTS | 1ST DATA |

| | | | | 2ND MIMO-STS | 2ND MIMO-LTS | 2ND DATA |

| | | | | 3RD MIMO-STS | 3RD MIMO-LTS | |

| | | | | 4TH MIMO-STS | 4TH MIMO-LTS | |

| LegacySTS | LegacyLTS | Legacy SIGNAL | MIMO SIGNAL | 1ST MIMO-STS | 1ST MIMO-LTS | 1ST DATA |
| | | | | 2ND MIMO-STS | 2ND MIMO-LTS | 2ND DATA |
| | | | | | 3RD MIMO-LTS | |

FIG.19B

| LegacySTS | LegacyLTS | Legacy SIGNAL | MIMO SIGNAL | 1ST MIMO-LTS | 1ST DATA |
| | | | | 2ND MIMO-LTS | |

FIG. 20

| LegacySTS | LegacyLTS | Legacy SIGNAL | MIMO SIGNAL | 1ST MIMO-STS | 1ST MIMO-LTS | 1ST DATA |

| 2ND MIMO-STS | 2ND MIMO-LTS | 1ST HALF DATA |

| 3RD MIMO-STS | 3RD MIMO-LTS | 2ND HALF DATA |

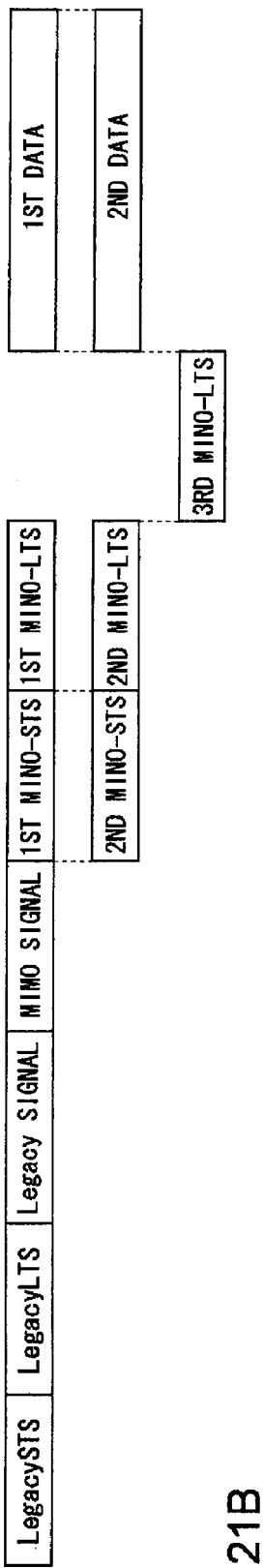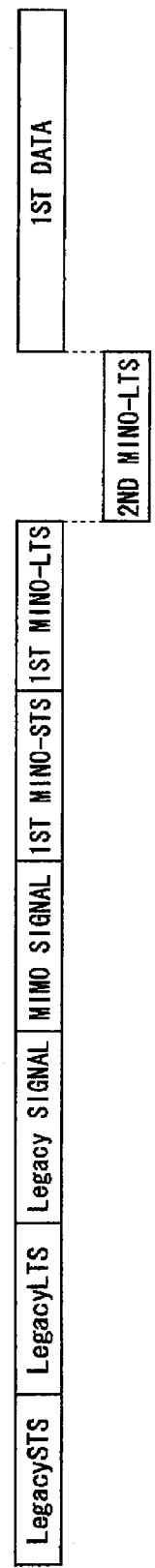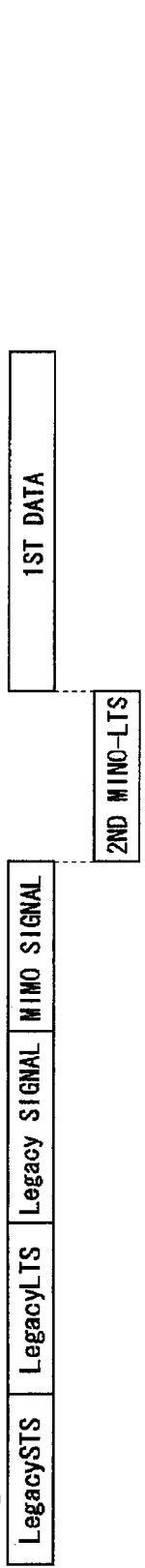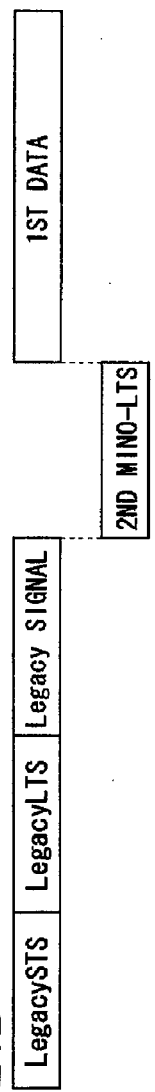
FIG.21A
FIG.21B
FIG.21C
FIG.21D

FIG.22A

| L-STS | L-LTS | L-SIGNAL | MIMO SIGNAL | 1ST MIMO-STS | 1ST MIMO-LTS(1) | 1ST MIMO-LTS(2) | 1ST MIMO-LTS(3) | 1ST SEGMENTED DATA |
|---|---|---|---|---|---|---|---|---|
| | | | | 2ND MIMO-STS | 2ND MIMO-LTS(1) | 2ND MIMO-LTS(2) | 2ND MIMO-LTS(3) | 2ND SEGMENTED DATA |
| | | | | 3RD MIMO-STS | 3RD MIMO-LTS(1) | 3RD MIMO-LTS(2) | 3RD MIMO-LTS(3) | 3RD SEGMENTED DATA |

FIG.22B

| L-STS | L-LTS | L-SIGNAL | MIMO SIGNAL | 1ST MIMO-STS | 1ST MIMO-LTS(1) | 1ST MIMO-LTS(2) | 1ST MIMO-LTS(3) | 1ST SEGMENTED DATA |
|---|---|---|---|---|---|---|---|---|
| L-STS +CDD | L-LTS +CDD | L-SIGNAL +CDD | MIMO SIGNAL +CDD | 2ND MIMO-STS | 2ND MIMO-LTS(1) | 2ND MIMO-LTS(2) | 2ND MIMO-LTS(3) | 2ND SEGMENTED DATA |
| L-STS +CDD | L-LTS +CDD | L-SIGNAL +CDD | MIMO SIGNAL +CDD | 3RD MIMO-STS | 3RD MIMO-LTS(1) | 3RD MIMO-LTS(2) | 3RD MIMO-LTS(3) | 3RD SEGMENTED DATA |

FIG.26A

| L-STS | L-LTS | L-SIGNAL | MIMO SIGNAL | 1ST MIMO-STS | 1ST MIMO-LTS | 1ST DATA |
|---|---|---|---|---|---|---|
| | | | | 2ND MIMO-STS | 2ND MIMO-LTS | 2ND DATA |
| | | | | 3RD MIMO-STS | 3RD MIMO-LTS | |
| | | | | 4TH MIMO-STS | 4TH MIMO-LTS | |

FIG.26B

| L-STS | L-LTS | L-SIGNAL | MIMO SIGNAL | 1ST MIMO-STS | 1ST MIMO-LTS' | 1ST DATA' |
|---|---|---|---|---|---|---|
| | | | | 2ND MIMO-STS | 2ND MIMO-LTS' | 2ND DATA' |
| | | | | 3RD MIMO-STS | 3RD MIMO-LTS' | 3RD DATA' |
| | | | | 4TH MIMO-STS | 4TH MIMO-LTS' | 4TH DATA' |

FIG. 27

| L-STS | L-LTS | L-SIGNAL | MIMO SIGNAL | 1ST MIMO-STS' | 1ST MIMO-LTS' | 4TH MIMO-LTS' | 1ST DATA' |
|---|---|---|---|---|---|---|---|
| | | | | 2ND MIMO-STS' | 2ND MIMO-LTS' | 5TH MIMO-LTS' | 2ND DATA' |
| | | | | 3RD MIMO-STS' | 3RD MIMO-LTS' | 6TH MIMO-LTS' | 3RD DATA' |

TRANSMITTING AND RECEIVING METHOD, AND RADIO APPARATUS UTILIZING THE SAME

RELATED APPLICATIONS

This application is a Divisional of U.S. application Ser. No. 11/272,029, filed Nov. 14, 2005, now U.S. Pat. No. 7,715,877, claiming priority of Japanese Application Nos. 2004-328780, filed Nov. 12, 2004, 2004-343179, filed Nov. 26, 2004, 2005-017539, filed Jan. 25, 2005, 2005-022311, filed Jan. 28, 2005 and 2005-029859, filed Feb. 4, 2005, the entire contents of each of which are hereby incorporated by reference.

BACKGROUND OF THE INVENTION

1. Field of the Invention

The present invention relates to transmitting and receiving technologies, and it particularly relates to a transmitting and receiving method, in which signals are transmitted from a plurality of antennas and the signals are received by a plurality of antennas, and a radio apparatus utilizing said method.

2. Description of the Related Art

An OFDM (Orthogonal Frequency Division Multiplexing) modulation scheme is one of multicarrier communication schemes that can realize the high-speed data transmission and are robust in the multipath environment. This OFDM modulation scheme has been used in the wireless standards such as IEEE802.11a/g and HIPERLAN/2. The burst signals in such a wireless LAN are generally transmitted via a time-varying channel environment and are also subject to the effect of frequency selective fading. Hence, a receiving apparatus generally carries out the channel estimation dynamically.

In order for the receiving apparatus to carry out the channel estimation, two kinds of known signals are provided within a burst signal. One is the known signal, provided for all carries in the beginning of the burst signal, which is the so-called preamble or training signal. The other one is the known signal, provided for part of carriers in the data area of the burst signal, which is the so-called pilot signal (See Reference (1) in the following Related Art List, for instance).

RELATED ART LIST (1) Sinem Coleri, Mustafa Ergen, Anuj Puri and Ahmad Bahai, "Channel Estimation Techniques Based on Pilot Arrangement in OFDM Systems", *IEEE Transactions on broadcasting*, vol. 48, No. 3, pp. 223-229, September 2002.

In wireless communications, adaptive array antenna technology is one of the technologies to realize the effective utilization of frequency resources. In adaptive array antenna technology, the directional patterns of antennas are controlled by controlling the amplitude and phase of signals, to be processed, in a plurality of antennas, respectively. In adaptive array antenna technology, the amplitude and phase of signals transmitted from and received by a plurality of antennas, respectively, are so controlled as to form a directional pattern of the antenna. One of techniques to realize higher data transmission rates by using such an adaptive array antenna technology is the MIMO (Multiple-Input Multiple-Output) system. In this MIMO system, a transmitting apparatus and a receiving apparatus are each equipped with a plurality of antennas, and a channel corresponding to each of the plurality of antennas is set. That is, channels up to the maximum number of antennas are set for the communications between the transmitting apparatus and the receiving apparatus so as to improve the data transmission rates. Moreover, combining this MIMO system with a technique such as the OFDM modulation scheme results in a higher data transmission rate.

In the MIMO system, the data rate can also be adjusted by increasing the number of antennas to be used for data communications. Furthermore, the data rate can be adjusted in greater detail by applying the adaptive modulation to the MIMO system. To perform such an adjustment of data rates more reliably it is desired that the transmitting apparatus already acquire from the receiving apparatus the information on data rates suited for the radio channel between the transmitting apparatus and the receiving apparatus (hereinafter referred to as "rate information"). If, on the other hand, the rate information is not transmitted periodically in the MIMO system, the transmitting apparatus transmits to the receiving apparatus a signal by which to request the transmission of the rate information (hereinafter referred to as "rate request signal"). Examples of the combinations of directivity patterns in the transmitting apparatus and receiving apparatus in a MIMO system are as follows. One example is a case where the antennas of a transmitting apparatus have omni patterns and the antennas of a receiving apparatus have patterns in adaptive array signal processing. Another example is a case where both the antennas of the transmitting apparatus and those of the receiving apparatus have patterns in adaptive array signal processing. The system can be simplified in the former case. In the latter case, however, the directivity patterns of antennas can be controlled in greater detail, so that the characteristics thereof can be improved. Since in the latter case the transmitting apparatus performs adaptive array signal processing for transmission, it is necessary to receive beforehand from the receiving apparatus the known signals by which to estimate channels. To improve the accuracy of controlling the adaptive array antennas, it is desirable that the transmitting apparatus acquire the respective channel characteristics between a plurality of antennas contained in the transmitting apparatus and those in the receiving apparatus. For this reason, the receiving apparatus transmits from all of antennas the known signals for channel estimation. In this patent specification, the known signals, for use with channel estimation, transmitted from a plurality of antennas will be called "training signals" independently of the number of antennas to be used for data communication.

Under these circumstances, the inventors of the present invention came to recognize the following problems to be solved. If any error is contained in the rate information determined by the receiving apparatus, an error will be caused in communications by a MIMO system and therefore the transmission quality and effective data rate will deteriorate. Thus, the determination of rate information by the receiving apparatus needs to be done with accuracy. In order to raise the effective data rate, it is desired that the transmission of signals other than the data, for example, the rate request signal or training signals, be minimized. When the transmitting apparatus or the receiving apparatus is powered by a battery, the lower power consumption is desired.

SUMMARY OF THE INVENTION

The present invention has been made in view of the foregoing circumstances and an object thereof is to provide a receiving method by which to improve control accuracy in transmitting data and to provide also a radio apparatus utilizing said method.

In order to solve the above problems, a radio apparatus according to a preferred embodiment of the present invention comprises: a transmitter which transmits data corresponding respectively to a plurality of antennas from at least one of the plurality of antennas to a targeted radio apparatus compatible with a variable data rate; and a control unit which generates a request signal by which to inform said radio apparatus of information on a data rate suitable for a radio channel between said radio apparatus and the targeted radio apparatus and which transmits the generated request signal as the data from the transmitter. When transmitting the request signal, the transmitter also transmits, from a plurality of antennas that include antennas other than the at least one of antennas to transmit the data, known signals corresponding respectively to the plurality of antennas.

The factors to determine the "data rate" are, for example, modulation schemes, error correction coding rates and the number of antennas used in a MIMO system. Here, the "data rate" may be determined by arbitrary combination of these and other factors or it may be determined by one of these and other factors.

According to this embodiment, the known signals are transmitted from a plurality of antennas when the request signal is sent to a radio apparatus to be communicated with. As a result thereof, information, on data rates, generated anew based on the known signals can be acquired, thus contributing to improving the information accuracy.

When transmitting the request signal, the transmitter performs beamforming on at least the known signals corresponding respectively to the plurality of antennas. In this case, the signal strength in a targeted radio apparatus can be raised by performing the beamforming, so that information on data rates having faster values can be obtained.

The radio apparatus may further comprise a selector which selects, from among the plurality of antennas, at least one antenna to be used when receiving the data from the targeted radio apparatus. The transmitter may transmit the known signals from the antenna selected by the selector. In this case, the number of antennas that should transmit control signals can be reduced, so that the power consumption can be reduced.

The radio apparatus may further comprise a receiver which receives, by a plurality of antennas, known signals for use with receiving from the targeted radio apparatus. The selector may derive radio qualities corresponding respectively to the plurality of antennas, based on the known signals received by the receiver, and may select preferentially an antenna whose radio quality is satisfactory.

The "radio quality" is the quality of a radio link and it may be evaluated by arbitrary parameters that include signal strength, delay spread and interference amount. The radio quality may be evaluated by the combination thereof. In such a case, since an antenna whose radio quality is desirable is selected preferentially, the deterioration of quality of data transmission can be prevented.

The radio apparatus may further comprise: a receiver which receives, by a plurality of antennas, known signals for use with receiving from the targeted radio apparatus; and a selector which selects, from among the plurality of antennas, at least one antenna that should transmit the known signals. The selector may derive radio qualities corresponding respectively to the plurality of antennas, based on the known signals received by the receiver, and may select preferentially an antenna whose radio quality is satisfactory.

Another preferred embodiment according to the present invention relates also to a radio apparatus. This apparatus comprises: a selector which selects, among a plurality of antennas, at least one antenna to be used when data are received from a targeted radio apparatus; and a transmitter which transmits data corresponding to each antenna, from an antenna contained in the at least one antenna selected by the selector to the targeted radio apparatus and which transmits also a training signal corresponding to each antenna, from the at least one antenna selected by the selector.

According to this embodiment, the known signals are transmitted from the antennas that should transmit data. As a result, the deterioration of directivity in a targeted radio apparatus can be prevented. Moreover, since the antennas that should receive the data are selected, so that the power consumption can be reduced.

Still another preferred embodiment according to the present invention relates also to radio apparatus. This apparatus is a radio apparatus that receives variable-rate data, transmitted from at least one of a plurality of antennas, which corresponds to each antenna, and the radio apparatus comprises: a receiver which receives known signals, transmitted from a plurality of antennas containing also antennas other than the at least one antenna to receive the data, which correspond respectively to the plurality of antennas; a receiving response vector computing unit which computes receiving response vectors corresponding respectively to the plurality of antennas, based on the known signals received by the receiver; a correlation computing unit which computes correlation among the receiving response vectors corresponding respectively to the plurality of antennas, from the receiving response vectors computed by the receiving response vector computing unit; and a determining unit which determines a data rate for data, based on the correlation computed by the correlation computing unit.

According to this embodiment, the correlation among the receiving response vectors are taken into account. Thus, the effects of among signals transmitted respectively from a plurality of antennas can be reflected and the degree of accuracy in data rate thus determined can be improved.

Still another preferred embodiment according to the present invention relates also to radio apparatus. This apparatus is a radio apparatus that receives variable-rate data, transmitted from at least one of a plurality of antennas, which corresponds to each antenna, and the radio apparatus comprises: a receiver which receives known signals, transmitted from a plurality of antennas containing also antennas other than the at least one antenna to receive the data, which correspond respectively to the plurality of antennas; a receiving response vector computing unit which computes receiving response vectors corresponding respectively to the plurality of antennas, based on the known signals received by the receiver; a power ratio computing unit which computes power ratios among the receiving response vectors corresponding respectively to the plurality of antennas, from the receiving response vectors computed by the receiving response vector computing unit; and a determining unit which determines a data rate for data, based on the power ratios computed by the power ratio computing unit.

According to this embodiment, the ratios of strength among the receiving response vectors are taken into account. Thus, the effects of among signals transmitted respectively from a plurality of antennas can be reflected and the degree of accuracy in data rate thus determined can be improved.

The known signal received by the receiver uses a plurality of carriers, and the determining unit may determine a data rate for data, based on a state of any of the plurality of carriers. "Any of the plurality of carriers" may be a carrier whose correlation or ratio of strength for all carriers is most desirable or undesirable, or a carrier that complies with a predetermined rule. The average of correlation or ratios of strength for all carrier may be calculated so as to be corresponded to a pseudo carrier. Also, the average or ratios of strength for part of carriers may be calculated so as to be corresponded to a pseudo carrier. In this case, the present invention can be applied to a system using a plurality of carriers. The "state" includes correlation or power ratios, and may be information indicative of the quality of a signal.

The receiver may receive also a request for information on the data rate at the time of receiving the known signals, and the apparatus may further comprise a notifying unit which conveys the data rate determined by the determining unit, as a response to the request received by the receiver. In this case, when the known signals are received, the request signal is also received. As a result, the information on data rates thus determined can be notified and the highly accurate data rates can be supplied.

Still another preferred embodiment according to the present invention relates also to a radio apparatus. This apparatus comprises: a generator which generates a burst signal that contains: first known signals corresponding respectively to at least one of a plurality of antennas; second known signals corresponding respectively to a plurality of antennas containing also antennas other than the at least one antenna to transmit the first known signals; and data corresponding respectively to the at least one antenna to transmit the first known signals; and a transmitter which transmits the burst signal generated by the generator, via the plurality of antennas. One example of the "first known signal" is a signal by which to set AGC in a targeted radio apparatus. One example of the "second known signal" is a signal by which to estimate channel characteristics in a targeted radio apparatus. According to this embodiment, a structure is such that an antenna to transmit the first known signals is the same as that to transmit the data. Thus, the estimation result by the first known signals at a receiving side can be used for the receiving of data and therefore the characteristics of data receiving can be improved.

Among the second known signals the generator may assign, at different timings, a portion corresponding to the at least one antenna to transmit the first known signals and a portion corresponding to the antennas other than the at least one antenna to transmit the first known signals. In this case, among the second known signals, the effect of the portion corresponding to the antennas other than the at least one antenna to transmit the first known signals on the portion corresponding to the at least one antenna to transmit the first known signals can be reduced. Thus, the accuracy of estimation, at a receiving side, based on the second known signals at a portion corresponding to the at least one antenna to transmit the first known signals can be improved.

The generator may increase the number of antennas that should transmit the first known signals up to the number of antennas that should transmit the second known signals, segment data corresponding respectively to antennas prior to increasing the number thereof, and associate the segmented data to antennas whose number has been increased. In this case, a structure is such that an antenna to transmit the first known signals is the same as that to transmit the data. Thus, the estimation result by the first known signals at a receiving side can be used for the receiving of data and therefore the characteristics of data receiving can be improved.

While using a plurality of subcarriers, the generator may generate the data contained in the burst signal and segment the data on a subcarrier-by-subcarrier basis. In this case, interference among the segmented data can be reduced.

Still another preferred embodiment according to the present invention relates also to a radio apparatus. This apparatus comprises: a transmitter which transmits burst signals respectively from a plurality of antennas; a generator which generates a burst signal, to be transmitted from the transmitter, that contains known signals corresponding respectively to the plurality of antennas and data assigned posterior to the known signals; and a determining unit which determines a data rate of data contained in the burst signal generated by the generator. When the data corresponds to at least one of the plurality of antennas, the generator associates said data to the plurality of antennas by increasing the number of antennas to be associated thereto, and when the generator associates said data to the plurality of antennas, the determining unit determines that the data rate is lower than that prior to associating the data to the plurality of antennas.

According to this embodiment, even if data are associated respectively to a plurality of antennas and the radio channel characteristics from the thus associated antennas are not suited to the data, the occurrence of data error can be reduced by lowering the data rate.

While using a plurality of subcarriers for the known signals and data, the generator varies a combination of subcarriers to be used respectively for the known signals, for each of the plurality of antennas, and when the data are associated to the plurality of antennas, a combination of subcarriers in the known signals transmitted from the same antenna as the data may be used for said data. In this case, the same subcarries are used for the known signals and data corresponding to one antenna. Thereby the selection of subcarriers to be used for the respective data can be facilitated.

Still another preferred embodiment according to the present invention relates also to a radio apparatus. This apparatus comprises: a transmitter which transmits burst signals respectively from a plurality of antennas; and a generator which generates a burst signal, to be transmitted from the transmitter, that contains known signals corresponding respectively to the plurality of antennas and data assigned posterior to the known signals. The generator includes: a first means for associating the data to antennas that should transmit the known signals, if the data corresponds to at least one of the plurality of antennas, by increasing the number of antennas to be associated thereto; and a second means for varying a combination of subcarriers to be used respectively for the known signals, for each of the plurality of antennas, while using a plurality of subcarriers for the known signals and data, and for using a combination of subcarriers in the known signal transmitted from the same antenna as the data, for said data, when the data are associated to a plurality of antennas.

According to this embodiment, if data are associated to a plurality of antennas, the same subcarries are used for the known signals and data corresponding to one antenna. Thereby the selection of subcarriers to be used for the respective data can be facilitated.

Still another preferred embodiment according to the present invention relates to a transmitting method. This is a method for transmitting data corresponding respectively to a plurality of antennas from at least one of the plurality of antennas to a targeted radio apparatus compatible with a variable data rate, and the method is characterized in that a request signal by which to inform the radio apparatus of information on a data rate suitable for a radio channel between the radio apparatus and the targeted radio apparatus is generated and when the generated request signal is transmitted as the data, known signals corresponding respectively to a plurality of antennas are also transmitted from the plurality of antennas that include antennas other than the at least one of antennas to transmit the data.

Still another preferred embodiment according to the present invention relates also to a transmitting method. This is a method for transmitting data corresponding respectively to a plurality of antennas from at least one of the plurality of antennas to a targeted radio apparatus, and the method is characterized in that at least one antenna to be used when data are received from a targeted radio apparatus is selected from among a plurality of antennas and a known signal corresponding to each antenna is also transmitted from the selected at least one antenna.

Still another preferred embodiment according to the present invention relates also to a transmitting method. This method comprises: transmitting data corresponding respectively to a plurality of antennas from at least one of the plurality of antennas to a targeted radio apparatus compatible with a variable data rate; and generating a request signal by which to inform a radio apparatus of information on a data rate suitable for a radio channel between the radio apparatus and the targeted radio apparatus. When transmitting the generated request signal as the data, the transmitting is such that known signals corresponding respectively to a plurality of antennas are also transmitted from a plurality of antennas that include antennas other than the at least one of antennas to transmit the data.

When transmitting the request signal, the transmitting may be such that beamforming is performed on at least the known signals corresponding respectively to the plurality of antennas. The method may further comprise selecting, from among the plurality of antennas, at least one antenna to be used when receiving the data from the targeted radio apparatus, wherein the transmitting may be such that the known signals are transmitted from the selected antenna. The method may further comprise a receiving, by a plurality of antennas, known signals for use with receiving from the targeted radio apparatus, wherein the selecting may be such that radio qualities corresponding respectively to the plurality of antennas are derived based on the received known signals and an antenna whose radio quality is satisfactory is selected preferentially.

The method may further comprise: receiving, by a plurality of antennas, known signals for use with receiving from the targeted radio apparatus; and selecting, from among the plurality of antennas, at least one antenna that should transmit the known signals. The selecting may be such that radio qualities corresponding respectively to the plurality of antennas are derived based on the received known signals and an antenna whose radio quality is satisfactory is selected preferentially.

Still another preferred embodiment according to the present invention relates also to a transmitting method. This method comprises: selecting, among a plurality of antennas, at least one antenna to be used when data are received from a targeted radio apparatus; and transmitting data corresponding to each antenna, from an antenna contained in the at least one antenna selected by the selecting to the targeted radio apparatus and transmitting also a training signal corresponding to each antenna, from the at least one antenna selected by the selecting.

The method may further comprise: generating a burst signal, to be transmitted in the transmitting, that contains known signals and data; and determining a data rate of data contained in the burst signal generated in the generating, wherein when the data is associated to at least one of antennas that should transmit the known signal, the generating may be such that said data are associated to the antennas that should transmit the known signal by increasing the number of antennas to be associated thereto, and wherein when, in the generating, data are associated to the antennas that should transmit the known signals, the determining may be such that a data rate, for the antenna that should transmit the known signals, is determined to be lower than that before the data are associated thereto.

While using a plurality of subcarriers for the known signals and data, the generating may be such that a combination of subcarriers to be used respectively for the known signals are varied for each of the plurality of antennas, and when the data are associated to the antennas that should transmit the known signals, a combination of subcarriers in the known signals transmitted from the same antenna as the data is used for said data.

The method may further comprise generating burst signals, to be transmitted in the transmitting, which contain known signals and data, wherein the generating includes: associating said data to antennas that should transmit the known signals, if the data corresponds to at least one of antennas that should transmit the known signals, by increasing the number of antennas to be associated thereto; and varying a combination of subcarriers to be used respectively for the known signals, for each of the plurality of antennas, while using a plurality of subcarriers for the known signals and data, and using a combination of subcarriers in the known signal transmitted from the same antenna as the data, for said data, when the data are associated to the antennas that should transmit the known signals.

Still another preferred embodiment according to the present invention relates to a receiving method. This is a method for receiving variable-rate data, transmitted from at least one of a plurality of antennas, which corresponds to each antenna, and the method is characterized in that, based on known signals, transmitted from a plurality of antennas containing also antennas other than the at least one antenna to receive the data, which correspond respectively to the plurality of antennas, receiving response vectors corresponding respectively to the plurality of antennas are computed, correlation among the receiving response vectors corresponding respectively to the plurality of antennas are computed from the computed receiving response vectors, and a data rate for data is determined based on the correlation.

Still another preferred embodiment according to the present invention relates also to a receiving method. This is a method for receiving variable-rate data, transmitted from at least one of a plurality of antennas, which corresponds to each antenna, and the method is characterized in that, based on known signals, transmitted from a plurality of antennas containing also antennas other than the at least one antenna to receive the data, which correspond respectively to the plurality of antennas, receiving response vectors corresponding respectively to the plurality of antennas are computed, power ratios among the receiving response vectors corresponding respectively to the plurality of antennas are computed from the computed receiving response vectors, and a data rate for data is determined based on the power ratios.

Still another preferred embodiment according to the present invention relates to a receiving method. This is a method for receiving variable-rate data, transmitted from at least one of a plurality of antennas, which corresponds to each antenna, and the method comprises: receiving known signals, transmitted from a plurality of antennas containing also antennas other than the at least one antenna to receive the data, which correspond respectively to the plurality of antennas; computing receiving response vectors corresponding respectively to the plurality of antennas, based on the received known signals; computing correlation among the receiving response vectors corresponding respectively to the plurality of antennas from the computed receiving response vectors; and determining a data rate for data based on the computed correlation.

Still another preferred embodiment according to the present invention relates also to a receiving method. This is a method for receiving variable-rate data, transmitted from at least one of a plurality of antennas, which corresponds to each antenna, and the method comprises: receiving known signals, transmitted from a plurality of antennas containing also antennas other than the at least one antenna to receive the data, which correspond respectively to the plurality of antennas; computing receiving response vectors corresponding respectively to the plurality of antennas, based on the received known signals; computing power ratios among the receiving response vectors corresponding respectively to the plurality of antennas from the computed receiving response vectors; and determining a data rate for data, based on the computed power ratios.

The known signal received in the receiving uses a plurality of carriers and the determining may be such that a data rate for data is determined based on a state of any of the plurality of carriers. The receiving may be such that, a request for information on the data rate is also received at the time of receiving the known signals and the method may further comprise notifying the data rate determined in the determining, as a response to the received request.

Still another preferred embodiment according to the present invention relates also to a transmitting method. This method includes transmitting a burst signal that contains: first known signals corresponding respectively to at least one of a plurality of antennas; second known signals corresponding respectively to a plurality of antennas containing also antennas other than the at least one antenna to transmit the first known signals; and data corresponding respectively to the at least one antenna to transmit the first known signals.

Still another preferred embodiment according to the present invention relates also to a transmitting method. This method comprises: generating a burst signal that contains first known signals corresponding respectively to at least one of a plurality of antennas, second known signals corresponding respectively to a plurality of antennas containing also antennas other than the at least one antenna to transmit the first known signals and data corresponding respectively to the at least one antenna to transmit the first known signals; and transmitting the burst signal generated in the generating, via the plurality of antennas.

The generating may be such that, among the second known signals, a portion corresponding to the at least one antenna to transmit the first known signals and a portion corresponding to the antennas other than the at least one antenna to transmit the first known signals are assigned at different timings. The generating may be such that the number of antennas that should transmit the first known signals are increased up to the number of antennas that should transmit the second known signals, data corresponding respectively to antennas prior to increasing the number thereof are segmented, and the segmented data are associated to antennas whose number has been increased. The generating may be such that while a plurality of subcarriers are being used, the data contained in the burst signal are generated and the data are segmented on a subcarrier-by-subcarrier basis.

The generating may be such that while the number of antennas that should transmit the first known signals is being increased up to the number of antennas that should transmit the second known signals, data corresponding respectively to antennas prior to increasing the number thereof are segmented into the number of increased antennas, and the segmented data are associated respectively to antennas that should transmit the second known signals. The generating may be such that while a plurality of subcarriers for at least the second known signal and data are being used, a combination of subcarriers to be used respectively for the second known signals are varied for each of the antennas that should transmit the second known signals and when segmented data are associated respectively to antennas that should transmit the second known signals, a combination of subcarriers in the second known signals transmitted from the same antenna as the data is used for said data.

The method may further comprise determining a data rate of data contained in the burst signal generated in the generating, wherein the determining may set so that a data rate in a case where in the generating the number of antennas that should transmit the first known signals is increased up to the number of antennas that should transmit the second known signals is lower than a data rate in a case where in the generating the number of antennas that should transmit first known signals is not increased up to the number of antennas that should transmit the second known signals.

Still another preferred embodiment according to the present invention relates also to a transmitting method. This method comprises: transmitting burst signals from a plurality of antennas, respectively; generating burst signals, to be transmitted in the transmitting, which contain known signals corresponding respectively to the plurality of antennas and data assigned posterior to the known signals; and determining a data rate of data contained in the burst signals generated in the generating. When the data correspond to at least one of the plurality of antennas, the generating may be such that said data are associated to the plurality of antennas by increasing the number of antennas to be associated thereto, and the determining may be such that when the data are associated to the plurality of antennas, the data rate is determined to be a rate lower than the data rate prior to associating the data to the plurality of antennas.

The generating may be such that while using a plurality of subcarriers for known signals and data, a combination of subcarriers to be used respectively for the known signals are varied for each of the plurality of antennas, and when the data are associated to the plurality of antennas, a combination of subcarriers in the known signals transmitted from the same antenna as the data is used for said data.

Still another preferred embodiment according to the present invention relates also to a transmitting method. This method comprises: transmitting burst signals from a plurality of antennas, respectively; and generating burst signals, to be transmitted in the transmitting, which contain known signals corresponding respectively to the plurality of antennas and data assigned posterior to the known signals. The generating includes: associating data to the plurality of antennas by increasing the number of antennas to be associated thereto when said data correspond to at least one of the plurality of antennas; and varying a combination of subcarriers to be used respectively for the known signals, for each of the plurality of antennas while using a plurality of subcarriers, and using a combination of subcarriers in the known signals transmitted from the same antenna as the data when the data are associated to the plurality of antennas.

Still another preferred embodiment according to the present invention relates also to a radio apparatus. This apparatus comprises: a generator which generates a burst signal of a plurality of streams that contains first known signals and second known signals assigned respectively in a plurality of streams and data assigned in at least one of the plurality of streams; a deformation unit including: a first means for generating the second known signals, where an orthogonal matrix has been multiplied, and data which have been increased up to the number of a plurality of streams, by multiplying respectively the second known signals and data by the orthogonal matrix, in the burst signal of a plurality of streams generated by the generator; and a second means for varying the burst signal of a plurality of streams in a manner such that a cyclic time shifting in the orthogonal-matrix-multiplied second known signal is executed, with time shift amounts corresponding respectively to the plurality of streams, for each stream and at the same time a cyclic time shifting in the data which have been increased up to the number of a plurality of streams is executed for each stream; and an output unit which outputs burst signals of a plurality of streams which have been varied by the deformation unit. The first known signal contained in the burst signal of a plurality of streams generated by the generator has a predetermined cycle, and at least one of the time shift amounts corresponding respectively to the plurality of streams in the deformation unit is greater than or equal to the predetermined cycle that the first known signal has.

According to this embodiment, even if the number of data streams is less than the number of streams in the second known signals, the multiplication by an orthogonal matrix and the cyclic time shift processing are performed, so that the number of data streams can be made equal to the number of streams in the second known signals. Since the same processing as with the data streams is also performed on the second known signals, the second known signals can be used for a targeted radio apparatus at the time of receiving the data. The same processing as with the data streams is not performed on the first known signals, so that the time shift amount can be made larger and the receiving characteristics in the targeted radio apparatus can be improved.

Still another preferred embodiment according to the present invention relates also to a transmitting method. This method comprises: generating second known signals, where an orthogonal matrix has been multiplied, and data which have been increased up to the number of a plurality of streams, by multiplying respectively the second known signals and data by the orthogonal matrix, in a burst signal of a plurality of streams that contains first known signals and the second known signals assigned respectively in a plurality of streams and the data assigned in at least one of the plurality of streams; executing, for each stream, a cyclic time shifting in the orthogonal-matrix-multiplied second known signal, with time shift amounts corresponding respectively to the plurality of streams, and executing at the same time a cyclic time shifting in the data which have been increased up to the number of a plurality of streams, for each stream; and outputting burst signals of a plurality of streams which have been so varied as to contain the second known signal and data to which the cyclic time shifting has been executed. The first known signal contained in the burst signal of a plurality of streams generated by the generating has a predetermined cycle, and at least one of the time shift amounts corresponding respectively to the plurality of streams in the executing is greater than or equal to the predetermined cycle that the first known signal has.

The generating may be such that a plurality of subcarriers are used for burst signals of a plurality of streams and the second known signals assigned respectively in the plurality of streams use different subcarriers for each stream. The outputting may be such that the burst signals of a plurality of streams which have been varied are outputted by associating them to the plurality of antennas.

Still another preferred embodiment according to the present invention relates also to a radio apparatus. This apparatus comprises: an output unit which outputs data assigned in at least one stream, to a targeted radio apparatus compatible with a variable data rate; and a control unit which generates a request signal by which to inform said radio apparatus of information on a data rate suitable for a radio channel between said radio apparatus and the targeted radio apparatus and which outputs the generated request signal as the data from the output unit. When outputting the request signal, the output unit also transmits, from a plurality of streams that include streams other than the at least one stream to transmit the data, known signals assigned respectively in the plurality of streams.

According to this embodiment, the known signals are outputted at the time when the request signal is outputted to the targeted radio apparatus. As are results, information on the data rate, in the targeted radio apparatus, which has been generated based on the known signals can be obtained, thus improving the accuracy of information.

Still another preferred embodiment according to the present invention relates also to a radio apparatus. This apparatus comprises: a generator which generates a burst signal that contains first known signals assigned in at least one of a plurality of streams, second known signals assigned respectively in the plurality of streams and data assigned in the same stream as the first known signal; and an output unit which outputs the burst signal generated by the generator.

According to this embodiment, a stream where the first known signal is to be assigned is identical to that where data is to be assigned. Thus, the estimation result by the first known signal can be used for the data at a receiving side, thus improving the receiving characteristics of data. The apparatus may further comprise a decision unit which determines a data rate of data contained in the burst signal generated by the generator, wherein the decision unit may set so that a data rate in a case where the generator increases the number of streams where the first known signals are to be assigned up to the number of a plurality of streams is lower than a data rate in a case where the generator does not increase the number of streams, where the first known signals are to be assigned, up to the number of a plurality of streams.

Still another preferred embodiment according to the present invention relates also to a radio apparatus. This apparatus comprises: an output unit which outputs a burst signal of a plurality of streams; a generator which generates the burst signal, to be outputted from the output unit, which contains known signals assigned respectively to the plurality of streams and data assigned posterior to the known signals; and a decision unit which determines a data rate of data contained in the burst signal generated by the generator. When the data is assigned in at least one of streams, the generator assigns said data to the plurality of streams, by increasing the number of streams to be assigned, and when the generator assigns said data to the plurality of streams, the determining unit determines that the data rate is lower than that prior to assigning the data to the plurality of streams.

According to this embodiment, if the data are assigned respectively in a plurality of streams and if the characteristics of a radio channel from the assigned streams are not suited for the data transmission, the occurrence of data error can be reduced by lowering the data rate.

While using a plurality of subcarriers for the known signals and data, the generator may be such that a combination of subcarriers to be used respectively for the known signals are varied for each of the plurality of streams, and when the data are assigned in the plurality of streams, a combination of subcarriers in the known signals assigned in the same stream as the data is used for said data.

Still another preferred embodiment according to the present invention relates also to a radio apparatus. This apparatus comprises: an output unit which outputs a burst signal of a plurality of streams; and a generator which generates the burst signal, to be outputted from the output unit, which contains known signals assigned respectively to the plurality of streams and data assigned posterior to the known signals. The generator includes: a first means for assigning data in the plurality of streams, if the data is assigned in at least one of the plurality of streams, by increasing the number of streams to be assigned; and a second means for varying a combination of subcarriers to be used respectively for the known signals, for each of the plurality of streams, while using a plurality of streams for the known signals and data, and for using a combination of subcarriers in the known signal assigned in the same stream as the data, for said data, when the data are assigned in the plurality of streams.

According to this embodiment, when the data are assigned in the plurality of streams, the same subcarries are used for the known signal and data assigned in one stream. Thereby the selection of subcarriers to be used for the respective data can be facilitated.

Still another preferred embodiment according to the present invention relates also to a transmitting method. This method comprises: outputting data assigned in at least one stream, to a targeted radio apparatus compatible with a variable data rate; and generating a request signal by which to inform a radio apparatus of information on a data rate suitable for a radio channel between the radio apparatus and the targeted radio apparatus wherein the request signal is outputted as the data from the outputting. The outputting may be such that when the request signal is outputted, known signals assigned respectively in a plurality of streams are also outputted from the plurality of streams that contain streams other than the at least one stream to transmit the data.

Still another preferred embodiment according to the present invention relates also to a transmitting method. This method comprises: generating a burst signal of a plurality of streams that contains a first known signal assigned in at least one of a plurality of streams and second known signals assigned respectively in a plurality of streams and data assigned in the same stream as the first known signal; and outputting the generated burst signal.

Still another preferred embodiment according to the present invention relates also to a transmitting method. This method comprises: outputting a burst signal of a plurality of streams; and generating a burst signal, to be outputted in the outputting, which contain known signals assigned respectively in a plurality of streams and data assigned posterior to the known signal. The generating includes: assigning data to a plurality of streams by increasing the number of streams to be assigned if the data is assigned in at least one of the plurality of streams; and varying a combination of subcarriers to be used respectively for the known signals, for each of a plurality of streams, while using the plurality of subcarriers for the known signals and data, and using a combination of subcarriers in the known signal assigned in the same stream as the data, for said data, when the data are assigned in the plurality of streams.

The method may further comprise setting by a plurality of antennas at least one antenna to transmit the data, based on signals received from a targeted radio apparatus, wherein, in the transmitting, the at least one antenna set by the setting may be used as at least one antenna that should transmit the data. The method may further comprise setting at least one antenna, by which to transmit the data, of antennas selected in a selecting, based on signals received from a targeted radio apparatus, wherein, in the transmitting, the at least one antenna set by the setting may be used as at least one antenna that should transmit the data.

The method may further comprise setting by a plurality of antenna at least one antenna to transmit the data, based on signals received from a targeted radio apparatus, wherein the generating may be such that the at least one antenna set in the setting is used as at least one antenna to which the data is to be associated. The plurality of streams outputted in the outputting are associated respectively to the plurality of antennas, and the method may further comprise setting by a plurality of antennas at least one antenna to output the data, based on signals received from the targeted radio apparatus, wherein the outputting may be such that a stream associated to the at least one antenna set in the setting is used as at least one stream that should output the data.

The plurality of streams outputted in the outputting are associated respectively to the plurality of antennas, and the method may further comprise setting by a plurality of antenna at least one antenna to transmit the data, based on signals received from the targeted radio apparatus, wherein the generating may be such that a stream associated to the at least one antenna set in the setting is used as at least one stream in which data is to be assigned. The method may further comprise generating a burst signal, to be transmitted in the transmitting, that contains known signals and data, wherein when data is associated to at least one of antennas that should transmit the known signals, the generating may be such that the amplitude of a signal transmitted from antennas other than antennas that should transmit the data, among the known signals, is defined to be a value less than the amplitude of a signal transmitted from the antennas that should transmit the data, among the known signals.

The generating may be such that the amplitude of a signal transmitted from antennas other than antennas that should transmit the data, among the second known signals, is defined to be a value less than the amplitude of a signal transmitted from the antennas that should transmit the data, among the second known signals. The generating may be such that the amplitude of a signal assigned in a stream other than streams in which the data are to be assigned, among the second known signals, is defined to be a value less than the amplitude of a signal assigned in the streams in which the data are to be assigned, among the second known signals. The method may further comprise generating a burst signal, to be outputted in the outputting, that contains known signals and data, wherein when data is assigned in at lest one of streams in which the known signals are to be assigned, the generating may be such that the amplitude of a signal assigned in a stream other than streams in which the data are to be assigned, among the known signals, is defined to be a value less than the amplitude of a signal assigned in the streams in which the data are to be assigned, among the known signals.

The method may further comprise generating a burst signal, to be transmitted in the transmitting, that contains known signals and data, wherein when data is associated to at least one of antennas that should transmit the known signals, the generating may be such that the number of subcarriers used at a portion transmitted from antennas other than antennas that should transmit data, among the known signals, is defined to be a value less than the number of subcarriers used at a portion transmitted from the antennas that should transmit data, among the known signals. The generating may be such that the number of subcarriers used at a portion transmitted from antennas other than antennas that should transmit data, among the second known signals, is defined to be a value less than the number of subcarriers used at a portion transmitted from the antennas that should transmit data, among the second known signals The generating may be such that the number of subcarriers used at a portion assigned in a stream other than streams in which the data are to be assigned, among the second known signals, is defined to be a value less than the number of subcarriers used at a portion assigned in the streams in which the data are to be assigned, among the second known signals. The method may further comprise generating a burst signal, to be outputted in the outputting, that contains known signals and data, wherein when data is assigned in at least one of streams in which the known signals are to be assigned, the generating may be such that the number of subcarriers used at a portion assigned in a stream other than streams in which the data are to be assigned, among the known signals, is defined to be a value less than the number of subcarriers used at a portion assigned in the streams in which the data are to be assigned, among the known signals.

The radio apparatus may further comprise a setting unit which sets at least one antenna to transmit the data, based on signals received by the plurality of antennas from a targeted radio apparatus, wherein the generator may use the at least one antenna set by the setting unit as an antenna to which the data is to be associated. The radio apparatus may further comprise a setting unit which sets at least one antenna, based on signals received by a plurality of antennas from a targeted radio apparatus wherein the plurality of streams are associated respectively to a plurality of streams outputted from the output unit, wherein the generator may use streams corresponding to the at least one antenna set by the setting unit, as at least one stream in which the data is to be assigned.

In the generator the amplitude of a signal transmitted from antennas other than antennas that should transmit the data, among the second known signals, may be defined to be a value less than the amplitude of a signal transmitted from the antennas that should transmit the data, among the second known signals. The amplitude of a signal assigned in a stream other than streams in which the data are to be assigned, among the second known signals, may be defined to be a value less than the amplitude of a signal assigned in the streams in which the data are to be assigned, among the second known signals. In the generator the number of subcarriers used at a portion transmitted from antennas other than antennas that should transmit the data, among the second known signals, may be defined to be a value less than the number of subcarriers used at a portion transmitted from the antennas that should transmit the data, among the second known signals.

The number of subcarriers used at a portion assigned in a stream other than streams in which the data are to be assigned, among the second known signals, may be defined to be a value less than the number of subcarriers used at a portion assigned in the streams in which the data are to be assigned, among the second known signals. Still another preferred embodiment according to the present invention relates also to a radio apparatus. This apparatus comprises: a receiver which receives a burst signal that contains: first known signals assigned in at least one of a plurality of streams; second known signals assigned respectively in the plurality of streams; and data assigned in the same streams as the first known signals; and a processing unit which processes the burst signal received by the receiver, wherein the receiver receives, at different timings, a portion assigned in a stream in which the first known signal is assigned, among the second known signals, and a portion assigned in a stream other than the stream in which the first known signal is assigned, among the second known signals.

The receiver may set a gain of automatic gain control, based on the first known signal, and receives respectively, based on the gain, the portion assigned in a stream in which the first known signal is assigned, among the second known signals, and the portion assigned in a stream other than the stream in which the first known signal is assigned, among the second known signals. The processing unit may perform independent operations on the plurality of streams, respectively.

The radio apparatus may further comprise a setting unit which sets at least one of a plurality of antennas to transmit the data, by the plurality of antennas, based on signals received from the targeted radio apparatus, wherein the transmitter may use the at least one antenna set by the setting unit, as at least one antenna that should transmit the data. The radio apparatus may further comprise a setting unit which sets at least one antenna, to transmit the data, which is at least one of antennas selected by the selector, by at least one of the plurality of antennas, based on signals received from the targeted radio apparatus, wherein the transmitter may use the at least one antenna set by the setting unit, as at least one antenna that should transmit the data.

The radio apparatus, wherein the plurality of streams outputted from the output unit are associated respectively to a plurality of antennas, may further comprise a setting unit which sets at least one antenna to output the data, by the plurality of antennas, based on signals received from the targeted radio apparatus, wherein the output unit may use a stream corresponding to the at least one antenna set by the setting unit, as at least one stream that should output the data. The radio apparatus may further comprise a generator which generates a burst signal, to be transmitted from the transmitter, that contains known signals and data, wherein when the data may be associated to at least one of antennas that should transmit the known signals, in the generator the amplitude of a signal transmitted from antennas other than antennas that should transmit the data, among the known signals, is defined to be a value less than the amplitude of a signal transmitted from the antennas that should transmit the data, among the known signals.

The radio apparatus may further comprise a generator which generates a burst signal, to be outputted from the output unit, that contains known signals and data, wherein when the data is assigned in at least one of streams in which the known signals are to be assigned, in the generator the amplitude of a signal assigned in a stream other than streams in which the data are to be assigned, among the known signals, may be defined to be a value less than the amplitude of a signal assigned in the streams in which the data are to be assigned, among the known signals. The radio apparatus may further comprise a generator which generates a burst signal, to be transmitted from the transmitter, that contains known signals and data, wherein when the data is associated to at least one of antennas that should transmit the known signals, in the generator the number of subcarriers used at a portion transmitted from antennas other than antennas that should transmit the data, among the known signals, may be defined to be a value less than the number of subcarriers used at a portion transmitted from the antennas that should transmit the data, among the known signals.

The radio apparatus may further comprise a generator which generates a burst signal, to be transmitted from the transmitter, that contains known signals and data, wherein when the data is assigned in at least one of streams in which the known signals are to be assigned, in the generator the number of subcarriers used at a portion assigned in a stream other than streams in which the data are to be assigned, among the known signals, may be defined to be a value less than the number of subcarriers used at a portion assigned in the streams in which the data to be assigned, among the known signals.

It is to be noted that any arbitrary combination of the above-described structural components and expressions changed among a method, an apparatus, a system, a recording medium, a computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 3A and 3B show each a structure of burst format in the communication system of FIG. 2.

FIGS. 19A and 19B illustrate another structures of burst format in the communication system of FIG. 2.

FIG. 20 illustrates still another structure of burst format in the communication system of FIG. 2.

FIGS. 21A to 21D illustrate still another structure of burst format in the communication system of FIG. 2.

FIGS. 22A and 22B illustrate structures of burst format modified over that of FIG. 20.

FIGS. 26A and 26B each illustrate a burst format of a burst signal generated in the transmitting apparatus of FIG. 25.

FIG. 27 illustrates a structure of a burst format according to a third embodiment of the present invention.

DETAILED DESCRIPTION OF THE INVENTION

Figure 1:
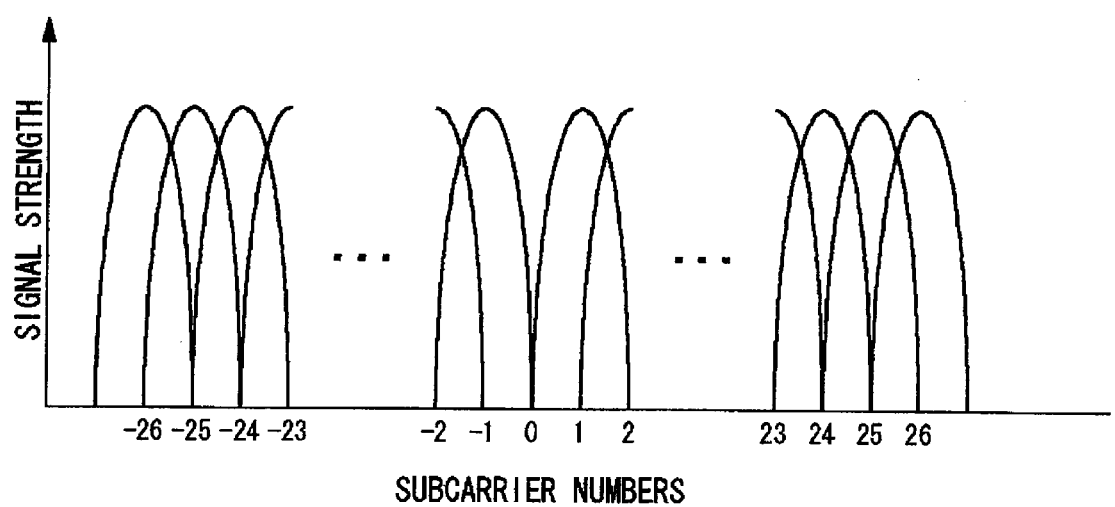
FIG. 1 illustrates a spectrum of a multicarrier signal according to a first embodiment of the present invention.

The invention will now be described based on the following embodiments which do not intend to limit the scope of the present invention but exemplify the invention. All of the features and the combinations thereof described in the embodiments are not necessarily essential to the invention.

First Embodiment

Before describing the present invention in detail, an outline of the present invention will be described first. A first embodiment of the present invention relates to a MIMO system comprised of two radio apparatuses (for convenience, hereinafter referred to as "first radio apparatus" and "second radio apparatus"). Both the first radio apparatus and the second radio apparatus carry out adaptive array signal processing. The MIMO system changes the data rate by varying the values or mode corresponding to the number of antennas, modulation scheme and coding rate of error correction. In so doing, a radio apparatus at the transmitting side transmits a rate request signal to a radio apparatus at the receiving side. For example, when the first radio apparatus transmits data to the second radio apparatus, the first radio apparatus transmits the rate request signal to the second radio apparatus.

The second radio apparatus conveys rate information of its own to the first radio apparatus. However, the rate information contains errors in the following cases. The first example is a case where some period of time is required and spent after the second radio apparatus has determined the rate information. The second example is a case where the number of antennas used for transmission in the first radio apparatus differs between when the second radio apparatus has determined the rate information and when it receives the data from the first radio apparatus. Specific explanation for these cases will be given later. In order for the first radio apparatus of the present embodiment to obtain information which is as accurate as possible, from the second radio apparatus, a training signal is also added when the rate request signal is transmitted from the first radio apparatus. As a result thereof, the second radio apparatus can update the rate information by the training signal, so that the rate information will be accurate.

When the data is to be transmitted from the first radio apparatus to the second radio apparatus, the first radio apparatus must derive, in advance, transmission weight vectors based on a training signal. It is for this reason that the first radio apparatus requests the second radio apparatus to send the training signal (hereinafter, the signal for this request will be referred to as "training request signal"). In accordance with this training request signal, the second radio apparatus transmits the training signal to the first radio apparatus. At this time, instead of transmitting the training signal from all of the antennas of the second radio apparatus, the second radio apparatus sends the training signal from an antenna that should receive data from the first radio apparatus, to reduce the power consumption.

FIG. 1 illustrates a spectrum of a multicarrier signal according to a first embodiment of the present invention. In particular, FIG. 1 shows a spectrum of a signal in the OFDM modulation scheme. One of a plurality of carriers in an OFDM modulation scheme is generally called a subcarrier. Herein, however, each of the subcarriers is designated by a "subcarrier number". Similar to the IEEE802.11a standard, 53 subcarriers, namely, subcarrier numbers "−26" to "26" are defined herein. It is to be noted that the subcarrier number "0" is set to null so as to reduce the effect of a direct current component in a baseband signal. The respective subcarriers are modulated by a modulation scheme which is set variably. Used here is any of modulation schemes among BPSK (Binary Phase-Shift Keying), QPSK (Quadrature Phase-Shift Keying), 16QAM (Quadrature Amplitude Modulation) and 64QAM.

Convolutional coding is applied, as an error correction scheme, to these signals. The coding rates for the convolutional coding are set to ½, ¾ and so forth. The number of antennas used in a MIMO system is set variably. As a result, when the mode or values corresponding to the modulation scheme, coding rate and the number of antennas are set variably, the data rate is also set variably. Hereinafter, the information on data rates will be referred to as "rate information" as mentioned already, and each rate information includes values corresponding respectively to the modulation scheme, coding rate and the number of antennas. Unless otherwise particularly necessary, the description on values of the modulation scheme, coding rate and the number of antennas will not be given herein.

Figure 2:
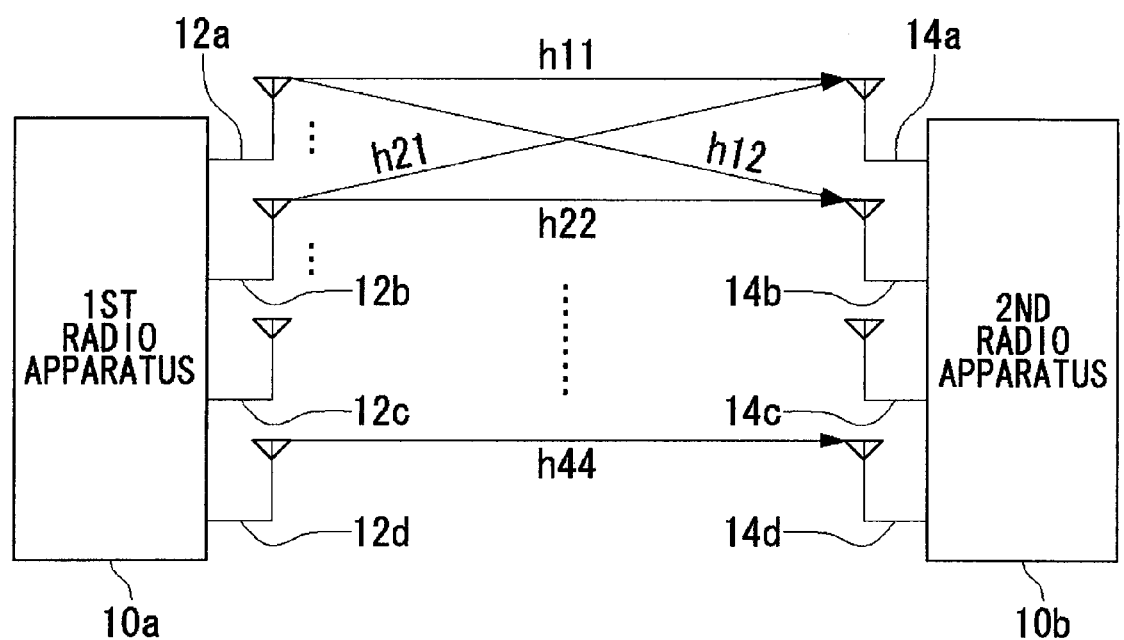
FIG. 2 illustrates a structure of a communication system according to a first embodiment of the present invention.

FIG. 2 illustrates a structure of a communication system according to the first embodiment of the present invention. A communication system 100 includes a first radio apparatus 10a and a second radio apparatus 10b, which is generically called "radio apparatus 10". The first radio apparatus 10a includes a first antenna 12a, a second antenna 12b, a third antenna 12c and a fourth antenna 12d, which are referred to as "antennas 12", and the second radio apparatus 10b includes a first antenna 14a, a second antenna 14b, a third antenna 14c and a fourth antenna 14d, which are generically referred to as "antennas 14". One of the first radio apparatus 10a and the second radio apparatus 10b corresponds to a transmitting apparatus, whereas the other corresponds to a receiving apparatus. One of the first radio apparatus 10a and the second radio apparatus 10b corresponds to a base station apparatus, whereas the other corresponds to a terminal apparatus.

Before describing a structure of the communication system 100, an outline of a MIMO system will be explained first. Assume herein that data are being transmitted from the first radio apparatus 10a to the second radio apparatus 10b. The first radio apparatus 10a transmits different data from the first antenna 12a to fourth antenna 12d, respectively. As a result, the data rate becomes higher. The second radio apparatus 10b receives the data by the first antenna 14 to fourth antenna 14d. The second radio apparatus 10b separates the received signals by adaptive array signal processing and demodulates the signals transmitted from the first antenna 12a to fourth antenna 12b independently.

Since the number of antennas 12 is "4" and the number of antennas 14 is also "4", the number of combinations of channels between the antennas 12 and the antennas 14 is "16". The channel characteristic between from the ith antenna 12i to the jth antenna 14j is denoted by $h_{ij}$. In FIG. 2, the channel characteristic between the first antenna 12a and the first antenna 14a is denoted by $h_{11}$, that between the first antenna 12a and the second receiving antenna 14b by $h_{12}$, that between the second antenna 12b and the first antenna 14a by $h_{21}$, that between the second antenna 12b and the second antenna 14b by $h_{22}$, and that between the fourth antenna 12d and the fourth antenna 14d by $h_{44}$. For the clarity of illustration, it is omitted to show the other channels in FIG. 2.

The second radio apparatus 10b operates so that data transmitted from the first antenna 12a and the second antenna 12b, respectively, are demodulated independently by adaptive array signal processing. The first radio apparatus 10a also performs adaptive array signal processing on the first antenna 12a to the fourth antenna 12d. In this manner, adaptive array signal processing is performed also at the transmitting side, namely, by the first radio apparatus 10a, so that the space division in a MIMO system is ensured. As a result, the interference of signals transmitted by a plurality of antennas 12 becomes smaller, so that the data transmission characteristics can be improved.

The first radio apparatus 10a transmits different data respectively from the first antenna 12a to fourth antenna 12d. The first radio apparatus 10a controls the number of antenna 12a to be used, in response to the rate or capacity of data to be transmitted. For instance, if the volume of data is larger, "four" antennas 12 are used, whereas if the volume of data is small, "two" antennas 12 are used. When the first radio apparatus 10a decides on the number of antennas 12 to be used, the rate information in the second radio apparatus 10b is referred to. For instance, when the receiving by "two" antennas 14 is instructed from the second radio apparatus 10b, the first radio apparatus 10a uses "two" antennas 12. When the first radio apparatus 10a transmits data, it performs adaptive array signal processing on the antennas 12. As a result, the first radio apparatus 10a receives beforehand a training signal from the second radio apparatus 10b and derives transmission weight vectors based on the training signal.

The second radio apparatus 10b performs adaptive array signal processing on the first antenna 14a to fourth antenna 14d and then receives data from the first radio apparatus 10a. As described above, the second radio apparatus 10b conveys the rate information and transmits the training signal to the first radio apparatus 10a. It is to be noted that the operations by the first radio apparatus 10a and the second apparatus 10b may be reversed.

FIGS. 3A and 3B show each a structure of burst format in a communication system 100. FIG. 3A shows a burst format when the number of antennas 12 used is "2". The upper row of FIG. 3A shows a burst signal transmitted from the first antenna 12a whereas the lower row thereof shows a burst signal transmitted from the second antenna 12b. "Legacy STS (Short Training Sequence)", "Legacy LTS (Long Training Sequence)" and "Legacy Signal" are signals compatible with a communication system, such as a wireless LAN system that conforms to the IEEE802.11a standard, which is not compatible with a MIMO. "Legacy STS" is used for timing synchronization, AGC (Automatic Gain Control) and the like, "Legacy LTS" is used for channel estimation and "Legacy Signal" contains control information. Signals assigned posterior to "MIMO Signal" are those characteristic of and inherent to a MIMO system, and "MIMO Signal" contains control information corresponding to a MIMO system. "First MIMO-STS" and the "Second MIMO-LTS" are used for timing synchronization, AGC and the like, "First MIMO-LTS" and "Second MIMO-LTS" are used for channel estimation, and "First Data" and the "Second Data" are data to be transmitted.

Similar to FIG. 3A, FIG. 3B shows a burst format at the time when "two" antennas 12 are used for data transmission. In FIG. 3B, however, the above-described training signals are added. In FIG. 3B, the training signals correspond to "First MIMO-STS", "First MIMO-LTS" through "Fourth MIMO-STS" and "Fourth MIMO-LTS". The "First MIMO-STS", "First MIMO-LTS" through "Fourth MIMO-STS" and "Fourth MIMO-LTS" are transmitted from the first antenna 12 to fourth antenna 12d, respectively. As mentioned earlier, the number of antennas 12 from which the training signals are transmitted may be less than "4". "First MIMO-STS" to "Fourth MIMO-STS" are structured by patterns such that the interference among them becomes small. The same is true for "First MIMO-LTS" to "Fourth MIMO-LTS". The explanation of these structures thereof is omitted here. Though it may be generally a case that "Legacy LTS", "First MIMO-LTS" and the like in FIG. 3A are called training signals, the training signals defined in this patent specification are restricted to the aforementioned training signals as shown in FIG. 3B. That is, "training signals" correspond to "MIMO-LTSs" having multiple streams the number of which corresponds to channels to be estimated, in order for a targeted radio apparatus 10 to estimate the channels, independently of the number of data to be transmitted, namely, the number of streams. Hereinafter, the "First MIMO-STS" to "Fourth MIMO-LTS" are generically referred to as "MIMO-STS" or "MIMO-STSs", whereas "First Data" and "Second Data" are generically referred to as "data" or "Data".

Figure 4:
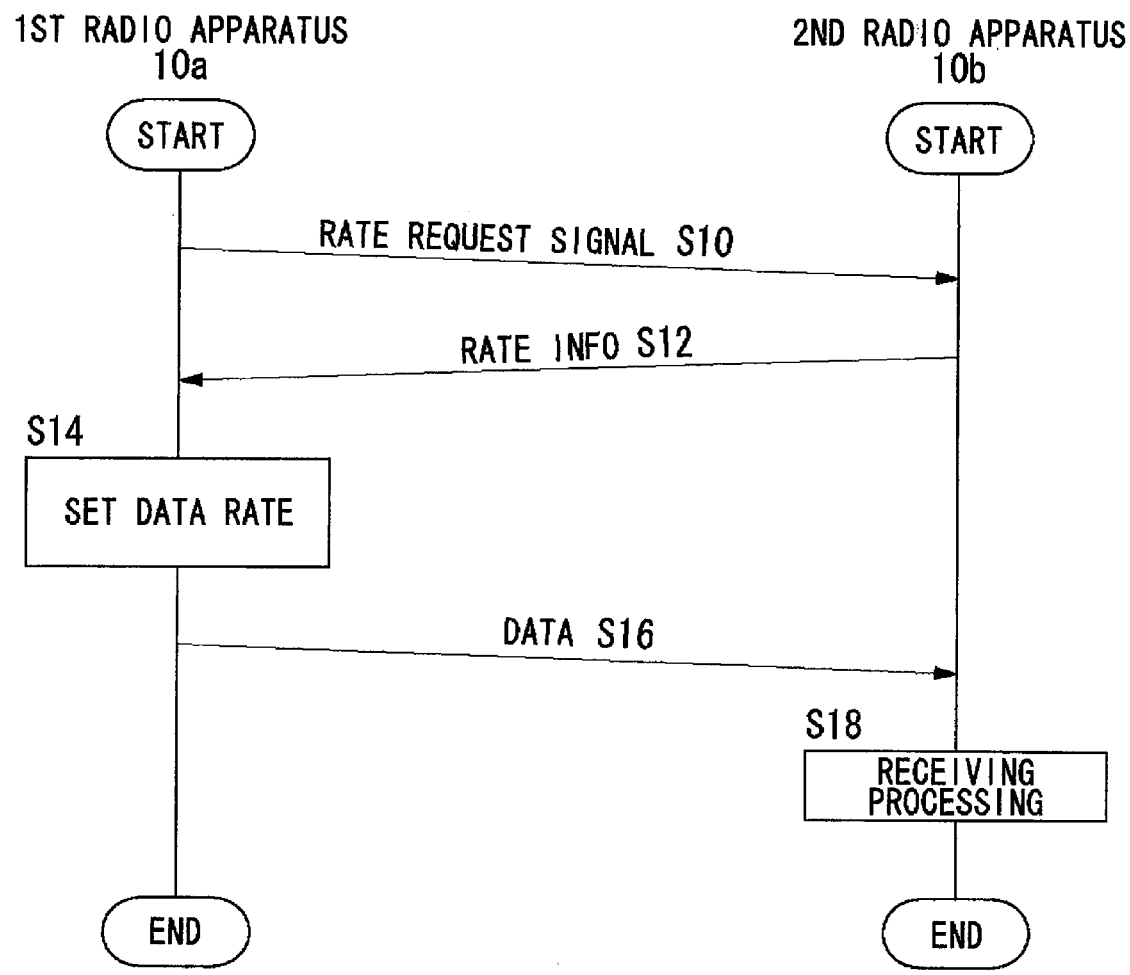
FIG. 4 shows a sequence of communication procedure to be compared in the communication system of FIG. 2.

FIG. 4 shows a sequence of communication procedure to be compared in a communication system 100. Shown here is an operation in which the first radio apparatus 10a acquires information on rates of the second radio apparatus 10b. For the brevity of explanation, the operation for adaptive array signal processing is omitted here. The first radio apparatus 10a sends a rate request signal to the second radio apparatus 10b (S10). The second radio apparatus 10b sends rate information to the first radio apparatus 10a (S12). The first radio apparatus 10a sets a data rate, based on the rate information (S14). That is, the data rate is set by referring to the rate information. The first radio apparatus 10a transmits data at the data rate thus set (S16). The second radio apparatus 10b performs a receiving processing on the data (S18).

According to the above-described operation, the rate information in the second radio apparatus 10b contains errors, as described above, in the following cases. First one is a case where a certain period of time elapses after the second radio apparatus 10b has determined the rate information. In other words, the characteristics of a channel between the first radio apparatus 10a and the second radio apparatus 10b generally fluctuates, and the content of rate information also varies according to the fluctuation of channel characteristics. For example, there is a case where although the receiving at 50 Mbps was possible when the rate information was decided, the receiving at 10 MBps is the limit when data are received from the first radio apparatus 10a. The second one is a case where the number of antennas used differs between when the second radio apparatus 10b decides on the rate information and when the data are received from the first radio apparatus 10a. In other words, when the training signals have not yet been fully received from all of the antennas 12 but the second apparatus 10b determines the rate information, there exists an unrecognized channel, so that accurate rate information cannot be derived. For example, when rate information is derived from the first antenna 12a and the second antenna 12b, the effect of the third antenna 12c and fourth antenna 12d is not taken into account, so that error will be contained in the rate information.

Figure 5:
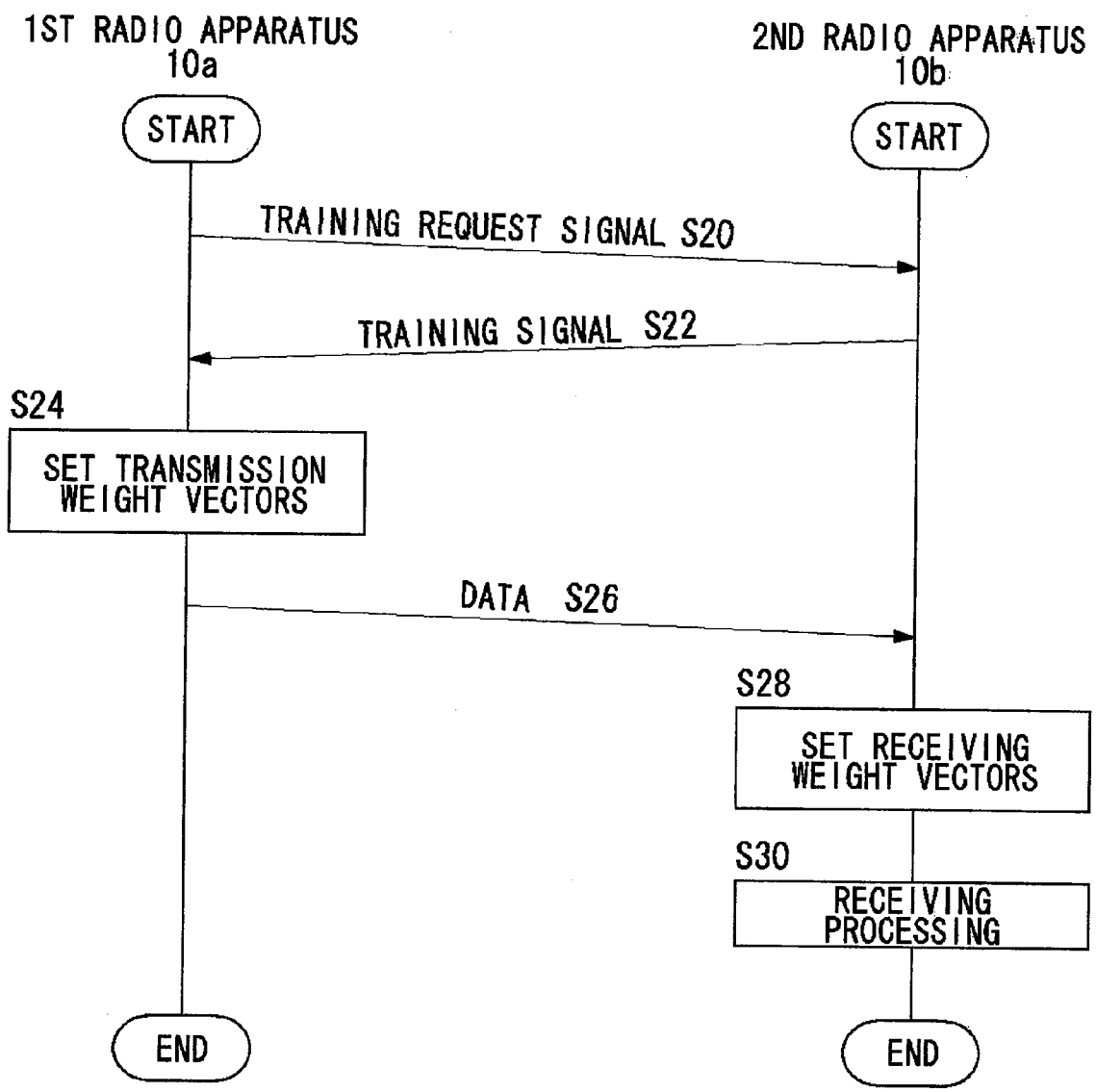
FIG. 5 shows another sequence of communication procedure to be compared in the communication system of FIG. 2.

FIG. 5 shows another sequence of communication procedure to be compared in the communication system 100. Shown here is an operation in which data are transmitted by MIMO. The first radio apparatus 10a sends a training request signal to the second radio apparatus 10b (S20). The training request signal is contained in the "First Data" and/or "Second Data" shown in FIG. 3A. The second radio apparatus 10b sends a training signal to the first radio apparatus 10a (S22). The first radio apparatus 10a derives transmission weight vectors, based on the training signals received and then sets them (S24). The first radio apparatus 10a transmits data using the transmission weight vectors (S26). The second radio apparatus derives receiving weight vectors for the received data and sets them (S28) Then the second radio apparatus 10b performs a receiving processing on the data, based on the receiving weight vectors (S30).

According to the above-described operation, the second radio apparatus 10b transmits the training signals from all of antennas 14, so that the power consumption increases. On the other hand, there is a case where the less number of antennas 14 to be used suffices if the data rate in the rate information is low to some extent. In such a case, the deterioration of transmission quality can be suppressed even if no training signal is sent from the antennas 14 which are not scheduled to be used. In particular, the reduction of power consumption is desired when the second radio apparatus 10b is a terminal apparatus and is battery-driven.

Figure 6:
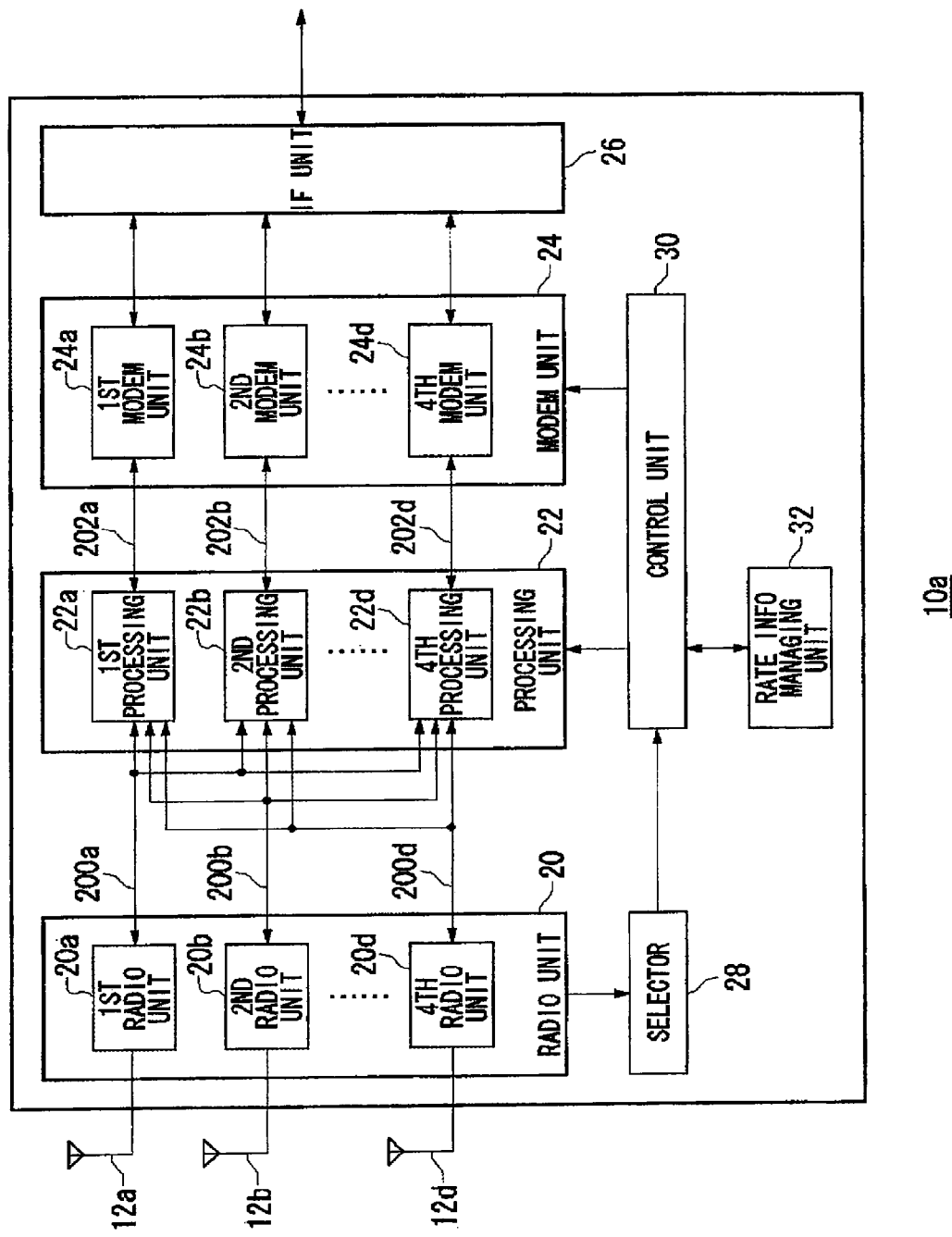
FIG. 6 illustrates a structure of a first radio apparatus of FIG. 2.

FIG. 6 illustrates a structure of a first radio apparatus 10a. The first radio apparatus 10a includes a first radio unit 20a, a second radio unit 20b, . . . and a fourth radio unit 20d, which are generically referred to as "radio unit 20", a first processing unit 22a, a second processing unit 22b, . . . and a fourth radio 22d, which are generically referred to as "processing unit 22", a first modem unit 24a, a second modem unit 24b, . . . and a fourth modem unit 24d, which are generically referred to as "modem unit 24", an IF unit 26, a selector 28, a control unit 30 and a rate information managing unit 32. Signals involved include a first time-domain signal 200a, a second time-domain signal 200b, and a fourth time-domain signal 200d, which are generically referred to as "time-domain signal 200", and a first frequency-domain signal 202a, a second frequency-domain signal 202b, . . . and a fourth frequency-domain signal 202d, which are generically referred to as "frequency-domain signal 202". The second radio apparatus 10b has a structure similar to that of the first radio apparatus 10a. Different component or components will be further included in this structure depending on whether the first radio apparatus 10a (or second radio apparatus 10b) is a base station apparatus or terminal apparatus. However, for the clarity of explanation, they will be omitted here.

As a receiving operation, the radio unit 20 carries out frequency conversion of received radiofrequency signal received by the antennas 12 so as to derive baseband signals. The radio unit 20 outputs the baseband signals to the processing unit 22 as the time-domain signals 200. The baseband signal, which is composed of in-phase components and quadrature components, shall generally be transmitted by two signal lines. For the clarity of figure, the signal is presented here by a single signal line. An AGC unit and/or an A-D conversion unit are also included. As a transmission operation, the radio unit 20 carries out frequency conversion of baseband signals from the processing unit 22 so as to derive radiofrequency signals. Here, the baseband signal from the processing unit 22 is also indicated as the time-domain signal 200. The radio unit 20 outputs the radiofrequency signals to the antenna 12. A power amplifier and/or a D-A conversion unit are also included. It is assumed herein that the time-domain signal 200 is a multicarrier signal converted to the time domain and is a digital signal. Signals processed in the radio unit 20 form burst signals, and their formats are those as shown in FIGS. 3A and 3B.

As a receiving operation, the processing unit 22 converts a plurality of time-domain signals 200 respectively into the frequency domain and performs adaptive array signal processing on the thus converted frequency-domain signals. Then the processing unit 22 outputs the result of adaptive array signal processing as the frequency-domain signals 202. One frequency-domain signal 202 corresponds to a signal transmitted from one of the antennas 14 shown in FIG. 2, and this corresponds to a signal corresponding to one channel. As a transmission operation, the processing unit 22 inputs, from the modem unit 24, the frequency-domain signal 202 serving as a frequency-domain signal, and then performs adaptive array signal processing on the frequency-domain signal. Then the processing unit 22 coverts the signal that has undergone the adaptive array signal processing, into the time domain and outputs the thus converted signal as a time-domain signal 200. Here, the number of antennas 12 to be used in the transmission processing is specified by the control unit 30. It is assumed herein that the frequency-domain signal 202, which is a signal in the frequency domain, contains a plurality of subcarrier components. For the clarity of figure, the frequency-domain signal is arranged in the order of the subcarrier numbers, and forms serial signals.

Figure 7:
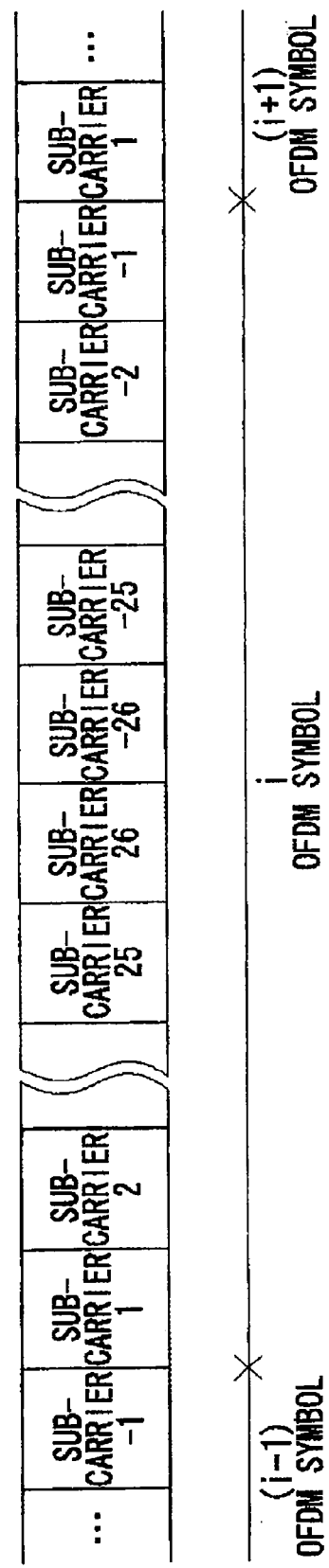
FIG. 7 illustrates a structure of frequency-domain signal of FIG. 6.

FIG. 7 illustrates a structure of a frequency-domain signal. Assume herein that a combination of subcarrier numbers "−26" to "26" shown in FIG. 1 constitutes an "OFDM" symbol. An "i"th OFDM symbol is such that subcarrier numbers "1" to "26" and subcarriers "−26" to "−1" are arranged in this order. Assume also that an "i−1"th OFDM symbol is placed immediately before the "i"th OFDM symbol, and an "i+1"th OFDM symbol is placed immediately after the "i"th OFDM symbol.

Referring back to FIG. 6, as a receiving processing, the modem unit 24 demodulates and decodes the frequency-domain signal 202 outputted from the processing unit 22. The demodulation and decoding are carried out per subcarrier. The modem unit 24 outputs the demodulated signal to the IF unit 26. As a transmission processing, the modem unit 24 carries out coding and modulation. The modem unit 24 outputs the modulated signal to the processing unit 22 as a frequency-domain signal 202. When the transmission processing is carried out, the modulation scheme and coding rate are specified by the control unit 30. They are specified based on the above-described rate information. As a receiving processing, the IF unit 26 combines signals outputted from a plurality of modem units 24 and then forms one data stream. The IF unit 26 outputs the data stream. As a transmission processing, the IF unit 26 inputs one data stream and then separates it. Then the IF unit 26 outputs the thus separated data to a plurality of modem units 24. A description is given hereinbelow of a case when a request signal is transmitted in such a structure as above. As shown in FIG. 3A or 3B, the processing unit 22 transmits, from at least one of a plurality of antennas 12, data corresponding respectively to the plurality of antennas 12. If the number of antennas 12 to be used is "2", the data correspond to "First Data" and "Second Data" in FIG. 3A or 3B. Assume herein that the number of antennas 12 to be used for data transmission is specified by the control unit 30. The processing unit 22 adds signals other than "Legacy STS" and the like as shown in FIG. 3A. When the number of antennas 12 to be used for data transmission is "4", "Third Data" and "Fourth Data" which are not shown in FIGS. 3A and 3B will be added. Such data are transmitted to the second radio apparatus 10b compatible with variable data rates. The control unit 30 generates request signals with which to let the second radio apparatus 10b supply information on rates at the second radio apparatus 10b. Then the control signal 30 outputs the thus generated request signal to the modulation unit 24. When transmitting the request signal, the processing unit 22 also transmits, from a plurality of antennas 12 which includes antennas 12 other than the antennas 12 to transmit the data, known signals corresponding respectively to the plurality of antennas 12. Here, the request signal is allotted to "first data" and/or "second data" of FIG. 3B. In FIG. 3B, the known signals correspond to "First MIMO-STS", "First MIMO-LTS" to "Fourth MIMO-STS" and "Fourth MIMO-LTS". As a result, even if the number of antennas 12 to transmit data is "2" as in the case of FIG. 3B, the processing unit 22 transmits the known signals, namely, training signals, from "four" antennas 12. In this manner, the request signals and the training signals are combined together and transmitted, and then the first radio apparatus 10a has the second radio apparatus 10b generate the rate information based on the training signals, and can obtain the thus generated rate information. As a result, the accuracy of rate information, acquired by the first radio apparatus 10a, on the second radio apparatus 10b improves.

In response to the above description, a case where the request signal and the training signals are received will be described hereinbelow. The control unit 30 generates the rate information, based on the received training signal. A method for generating the rate information may be arbitrary. For example, the rate information may be generated in a manner such that the signal strength of signals received by the radio unit 20 is measured and the measured signal strength is compared with a threshold value. Alternatively, the rate information may also be generated based on the receiving weight vectors derived by the processing unit 22. More detailed description of a specific example to generate the rate information will be given later. The rate information may be generated based on a demodulation result obtained by the modem unit 24. The rate information thus determined is transmitted via the modem unit 24, processing unit 22 and radio unit 20 and is at the same time stored in the rate information managing unit 32. The rate information managing unit 32 also stores the rate information at a targeted radio apparatus 10.

With a structure described as above, the first radio apparatus 10a operates as follows to reduce the power consumption. The radio unit 20 receives, via a plurality of antennas 12, training signals from the second radio apparatus 10b. Based on the received training signals, the selector 28 selects, from among a plurality of antennas 12, at least one antenna to be used when data are received from the second radio apparatus 10b. More specifically, such an operation is as follows. Based on the training signals received by the radio unit 20, the selector 28 derives signal strength corresponding respectively to the plurality of antennas 12. The selector 28 preferentially selects antennas 12 whose strength is larger. If, for example, the number of antennas 12 to be used when the data are received is "3", the selector 28 selects "three" antennas from among those whose signal strengths are large. It is to be noted here that the total number of antennas 12 to be selected is specified separately based on a value of data rate, at which the data are to be transmitted, and a value of power consumption. While using the antennas 12 selected by the selector 28, the processing unit 22 transmits the training signals. In this manner, the power consumption is lowered by reducing the number of the antennas 12 that should actually transmit the training signal.

It is also possible to execute the above-described operation even in a case when the request signal is not transmitted. In other words, the above-described operation can be applied even in a case when a training request signal is accepted from the second radio apparatus 10b. That is, the selector 28 selects, from among a plurality of antennas 12, at least one antenna to be used when the data from the second radio apparatus 10b are received. In so doing, the selection is done based on an instruction from the control unit 30. The processing unit 22 transmits data corresponding respectively to the antennas 12, from at least one of a plurality of antennas 12 to the second radio apparatus 10b, and also transmits training signals corresponding respectively to the antennas 12 selected by the selector 28, independently of the number of antennas 12 to be used when the data are transmitted. For example, the data are transmitted from "two" antennas 12 and the training signals are transmitted from "three" antennas 12.

In terms of hardware, this structure can be realized by a CPU, a memory and other LSIs of an arbitrary computer. In terms of software, it is realized by memory-loaded programs which have managing and scheduling functions or the like, but drawn and described herein are function blocks that are realized in cooperation with those. Thus, it is understood by those skilled in the art that these function blocks can be realized in a variety of forms such as by hardware only, software only or the combination thereof.

Figure 8:
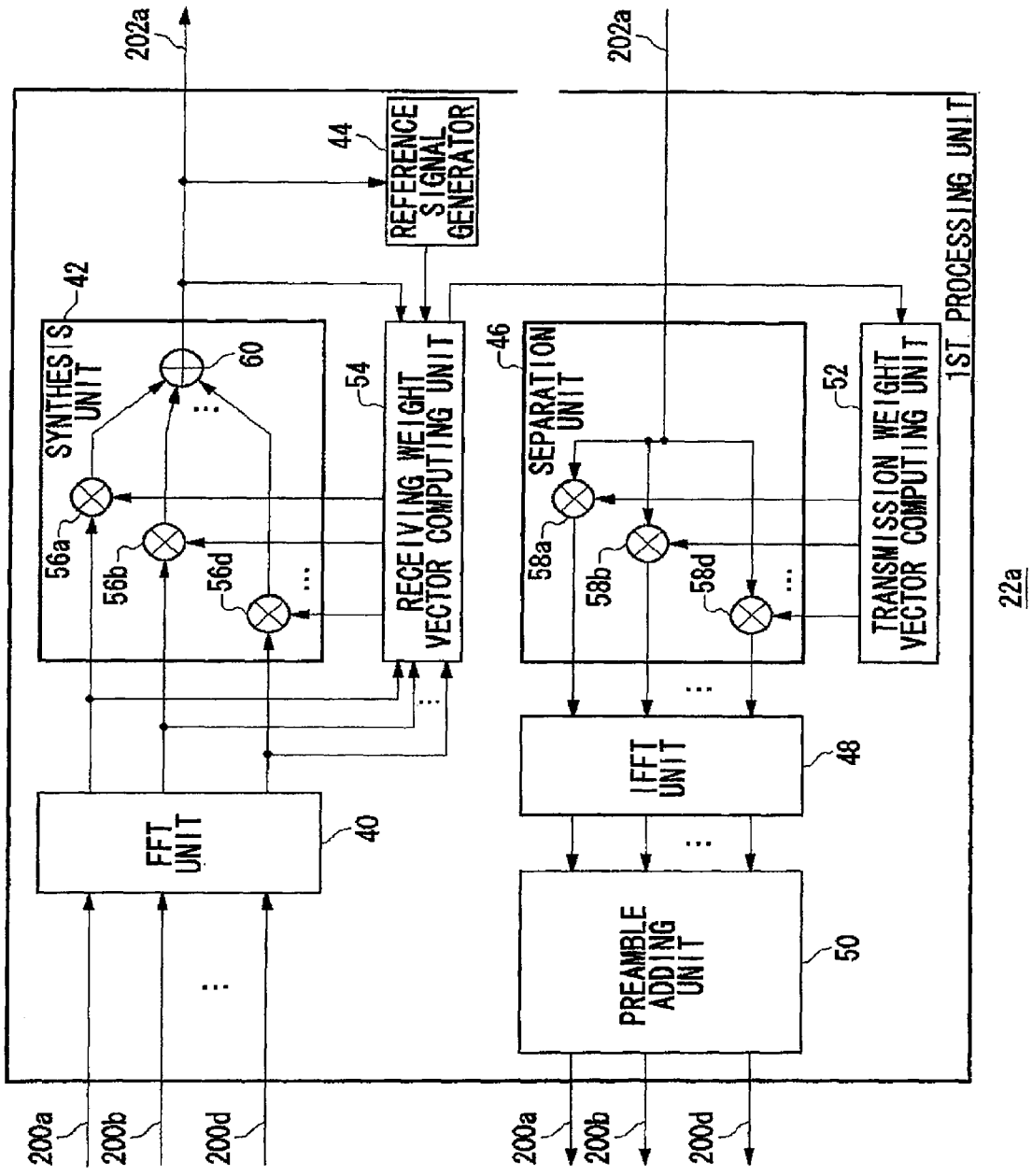
FIG. 8 illustrates a structure of a first processing unit of FIG. 6.

FIG. 8 illustrates a structure of a first processing unit 22a. The first processing unit 22a includes an FFT (Fast Fourier Transform) unit 40, a synthesis unit 42, a reference signal generator 44, a receiving weight vector computing unit 54, a separation unit 46, a transmission weight vector computing unit 52, an IFFT unit 48 and a preamble adding unit 50. The synthesis unit 42 includes a first multiplier 56a, a second multiplier 56b, . . . and a fourth multiplier 56d, which are generically referred to as "multiplier 56", and an adder 60. The separation unit 46 includes a first multiplier 58a, a second multiplier 58b, . . . and a fourth multiplier 58d, which are generically referred to as "multiplier 58".

The FFT unit 40 inputs a plurality of time-domain signals 200 and performs Fast Fourier Transform on them, respectively, so as to derive frequency-domain signals. As described earlier, one frequency-domain signal is such that signals corresponding to subcarriers are arranged serially in the order of the subcarrier numbers.

The multiplier 56 weights the frequency-domain signal with a receiving weight vector outputted from the receiving weight vector computing unit 54, and the adder 60 adds up the outputs from the multipliers 56. Since the frequency-domain signals are arranged in the order of the subcarrier numbers, the receiving weight vectors outputted from the receiving weight vector computing unit 54 are arranged in such a manner as to correspond thereto, too. That is, one multiplier 56 inputs successively the receiving weight vectors arranged in the order of the subcarrier numbers. Thus, the adder adds up a multiplication result on a subcarrier-by-subcarrier basis. As a result, the added-up signal is also arranged serially in the order of the subcarrier numbers as shown in FIG. 7. The thus added signal is the aforementioned frequency-domain signal 202. In the following explanation, if the signal to be processed corresponds to the frequency-domain, the processing therefor is basically executed subcarrier by subcarrier, too. For the brevity of explanation, the processing for one subcarrier will be described herein. Hence, the processing for a plurality of subcarriers will be accommodated in a manner such that the processing for a single subcarrier is executed in parallel or serially.

During the period of "Legacy STS", "Legacy LTS", "First MIMO-STS" and "First MIMO-LTS", the reference signal generator 44 outputs, as reference signals, "Legacy STS", "Legacy LTS", "First MIMO-STS" and "First MIMO-LTS" which have been stored beforehand. During the period other than these periods, the frequency-domain signal 202 is determined by a predefined threshold value, and its result is outputted as a reference signal. The determination may be a soft decision instead of the hard decision.

The receiving weight vector computing unit 54 derives receiving weight vectors, based on the frequency-domain signal outputted from the FFT unit 40 and the reference signal. A method for deriving the receiving weight vectors may be arbitrary. One such a method is the derivation by an LMS (Least Mean Square) algorithm. The receiving weight vectors may be derived by a correlation processing. When a correlation processing is carried out, the frequency-domain signal and the reference signal will be inputted not only from the first processing unit 22a but also from the second processing unit 22b via a signal line not shown. If a frequency-domain signal in the first processing unit 22a is denoted by $x_1(t)$, a frequency-domain signal in the second processing unit 22b by $x_2(t)$, a reference signal in the first processing unit 22a by $S_1(t)$ and a reference signal in the second processing 22b by $S_2(t)$, then $x_1(t)$ and $x_2(t)$ will be expressed by the following Equation (1):

$$x_1(t) = h_{11} S_1(t) + h_{21} S_2(t)$$

$$x_2(t) = h_{12} S_1(t) + h_{22} S_2(t) \qquad (1)$$

The noise is ignored here. A first correlation matrix $R_1$, with E as an ensemble average, is expressed by the following Equation (2):

$$R_1 = \begin{bmatrix} E[x_1 S_1^*] & E[x_1 S_1^*] \\ E[x_2 S_2^*] & E[x_2 S_2^*] \end{bmatrix} \qquad (2)$$

A second correlation matrix $R_2$ among the reference signals is given by the following Equation (3):

$$R_2 = \begin{bmatrix} E[S_1 S_1^*] & E[S_1 S_2^*] \\ E[S_2 S_1^*] & E[S_2 S_2^*] \end{bmatrix} \qquad (3)$$

Finally, the first correlation matrix $R_1$ is multiplied by the inverse matrix of the second correlation matrix $R_2$ so as to derive a receiving response vector, which is expressed by the following Equation (4):

$$\begin{bmatrix} h_{11} & h_{21} \\ h_{12} & h_{22} \end{bmatrix} = R_1 R_2^{-1} \qquad (4)$$

Then the receiving weight vector computing unit 54 computes a receiving weight vector from the receiving response vector.

The transmission weight vector computing unit 52 estimates the transmission weight vectors necessary for weighting the frequency-domain signals 202, from the receiving weight vectors. The method for estimating the transmission weight vectors is arbitrary. As a most simple method therefor, however, the receiving weight vector may be used intact. As another method, the receiving weight vector may be corrected using a conventional technique in view of the Doppler frequency shift of a propagation environment caused by time difference in between a receiving processing and a transmission processing. Here, it is assumed that the receiving weight vectors are used, directly and without modification, as the transmission weight vectors.

The multipliers 58 weight the frequency-domain signals 202 with the transmission weight vectors, and the results thereof are outputted to the IFFT unit 48. Then the IFFT unit 48 performs inverse Fast Fourier Transform on the signals outputted from the multipliers 58 so as to convert them into time-domain signals. As shown in FIGS. 3A and 3B, the preamble adding unit 50 adds preambles in a header portion of burst signal. Here, "Legacy STS", "Legacy LTS", "First MIMO-STS" and "First MIMO-LTS" are added. The preamble adding unit 50 outputs, as time-domain signals 200, the signals where the preamble has been added. The above-described operation is controlled by the control unit 30 shown in FIG. 6. In FIG. 8, the first time-domain signal 200*a* and the like appear twice. However, these are the signal in one direction and these correspond to the first time-domain signal 200*a* and the like which are two-way signals as shown in FIG. 6.

Figure 9:
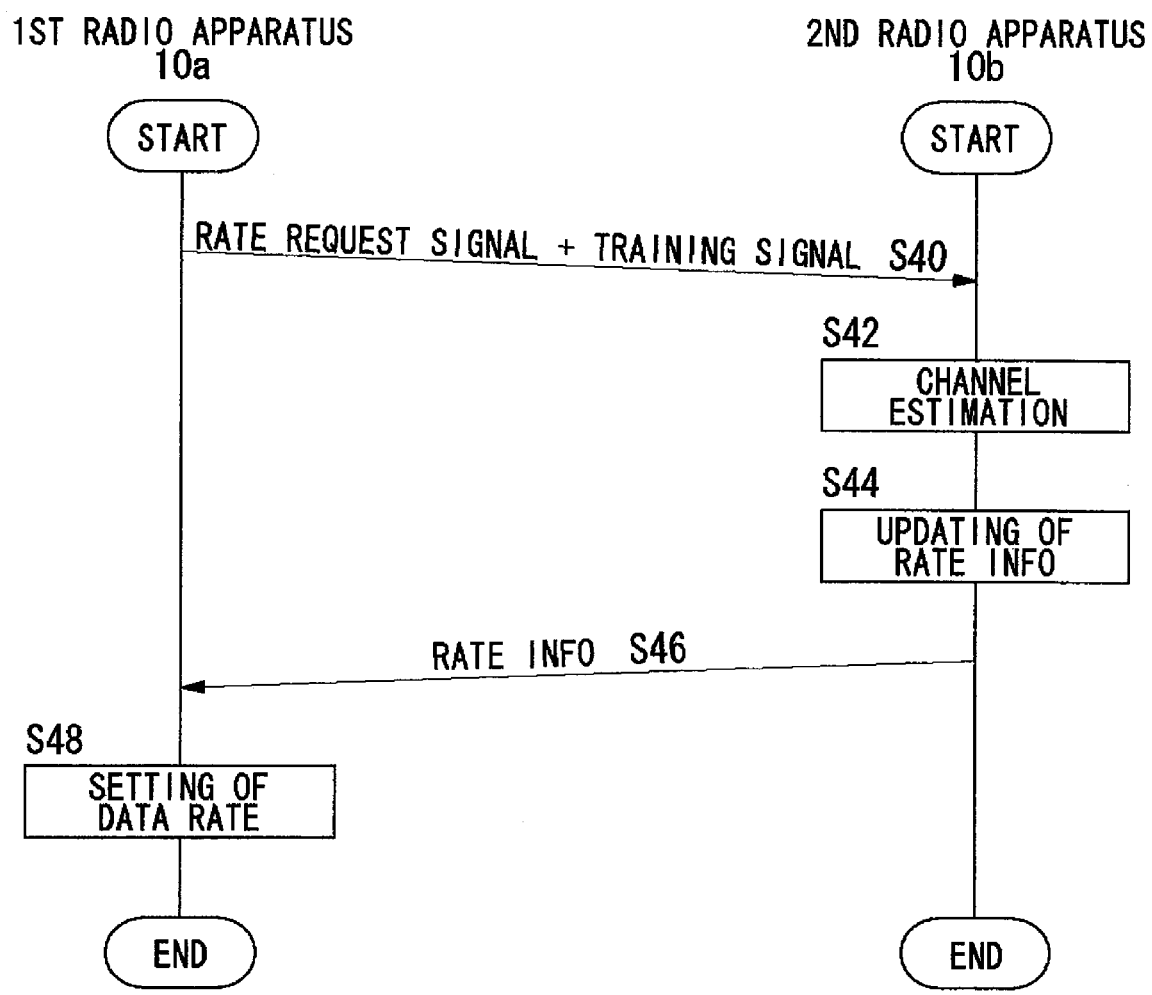
FIG. 9 is a sequence diagram showing a procedure of setting a data rate in the communication system of FIG. 2.

An operation of a communication system 100 structured as above will be described. FIG. 9 is a sequence diagram showing a procedure of setting a data rate in the communication system 100. FIG. 9 is a sequence diagram that shows a case when a rate request signal and training signals are transmitted, and FIG. 9 corresponds to FIG. 4. The first radio apparatus 10*a* transmits to the second radio apparatus 10*b* a rate request signal and training signals as shown in FIG. 3B (S40). The second radio apparatus 10*b* estimates a channel based on the training signals (S42). Here, the channel estimation corresponds to deriving the aforementioned receiving weight vectors. The second radio apparatus 10*b* updates the rate information, based on the estimated channel (S44). The description on updating the rate is omitted here. The second radio apparatus 10*b* transmits the rate information to the first radio apparatus 10*a* (S46). The first radio apparatus 10*a* sets a data rate by referring to the thus received rate information (S48).

Figure 10:
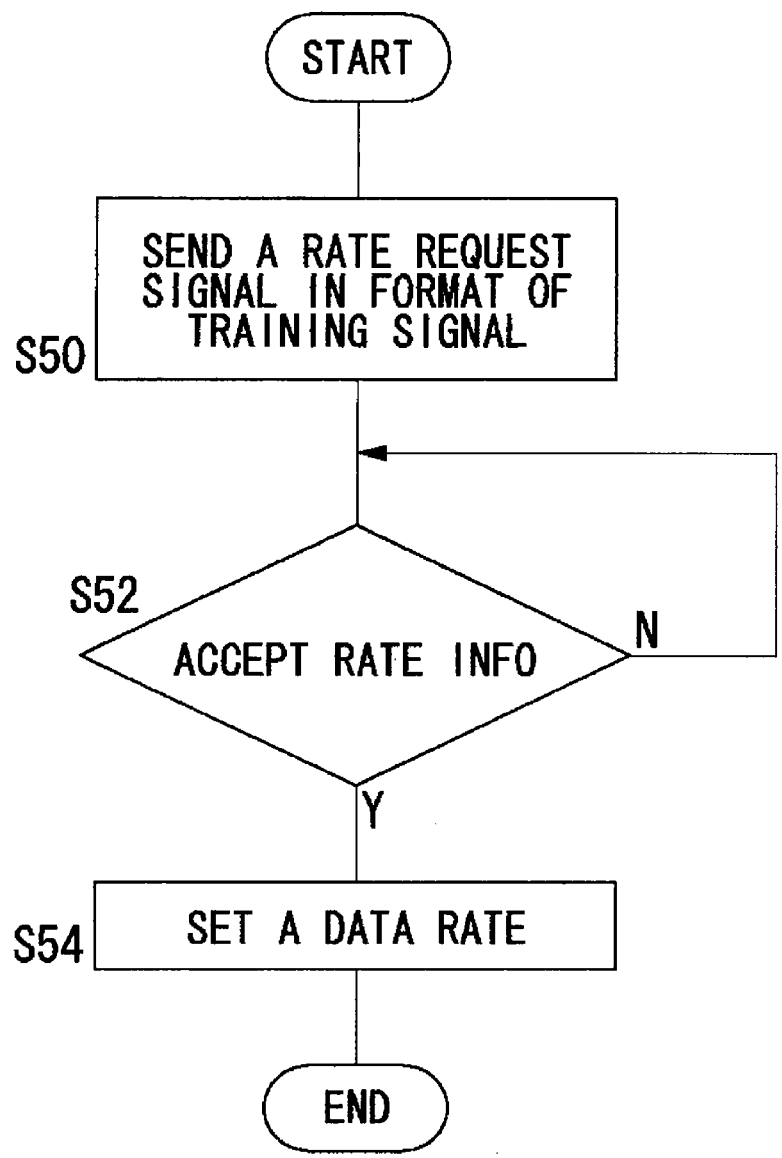
FIG. 10 is a flowchart showing a procedure of setting a data rate in the first radio apparatus of FIG. 6.

FIG. 10 is a flowchart showing a procedure of setting a data rate in the first radio apparatus 10*a*. FIG. 10 corresponds to the operation of first radio apparatus 10*a* in FIG. 9. The processing unit 22 transmits a rate request signal in a format of training signals as shown in FIG. 3B (S50). If the IF unit 26 does not accept rate information via the antenna 12, radio unit 20, processing unit 22 and modem unit 24 (N of S52), keep waiting until the IF unit 26 accepts it. If, on the other hand, the IF unit 26 accepts the rate information (Y of S52), the control unit 30 sets a data rate (S54). The rate information managing unit 32 stores the rate information.

Figure 11:
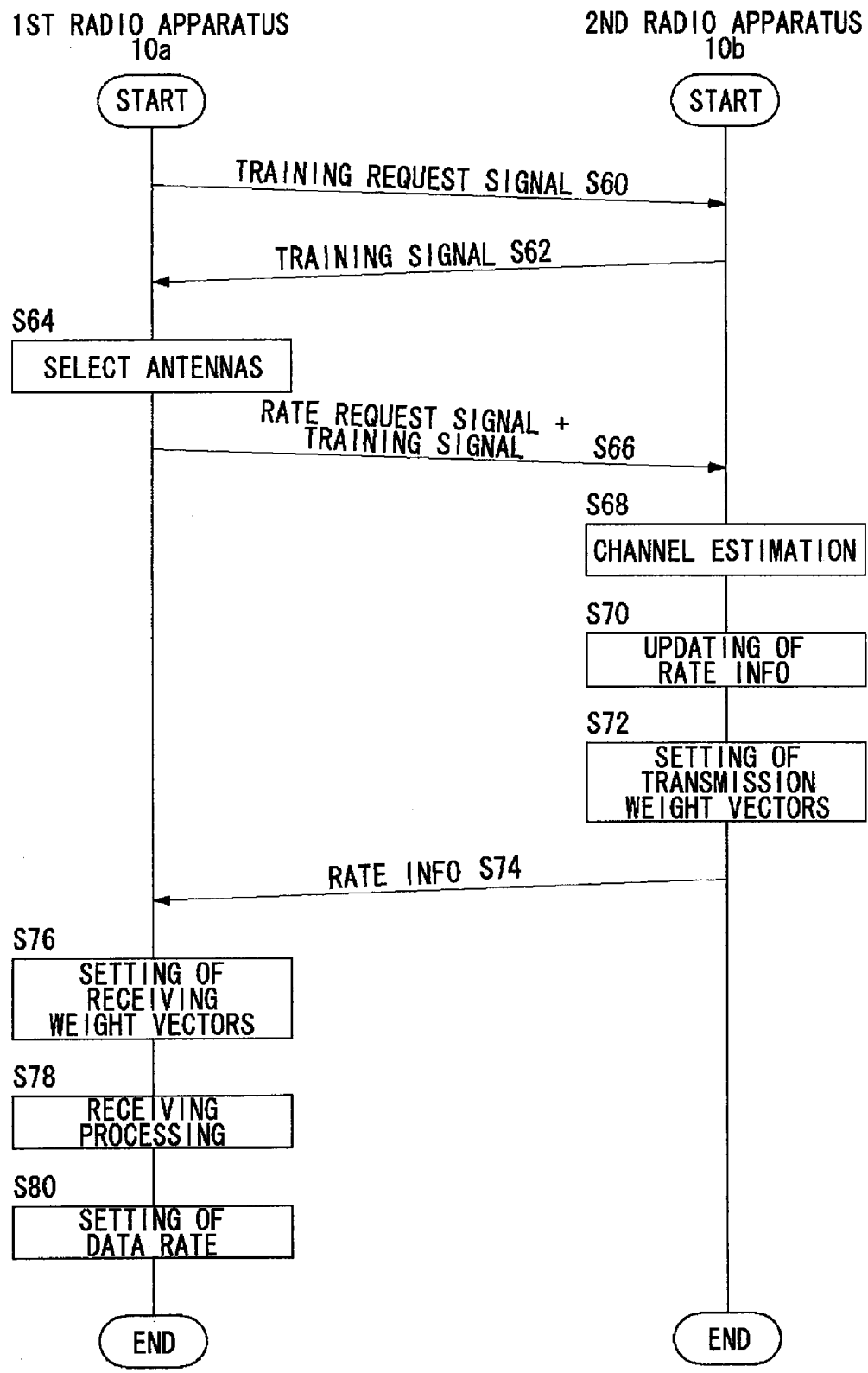
FIG. 11 is a sequence diagram showing another procedure of setting a data rate in the communication system of FIG. 2.

FIG. 11 is a sequence diagram showing another procedure of setting a data rate in the communication system 100. FIG. 11, which corresponds to FIG. 5, is a sequence diagram for a processing wherein adaptive array signal processing is taken into account and a lower power consumption is intended on top of FIG. 9. The first radio apparatus 10*a* transmits a training request signal to the second radio apparatus 10*b* (S60). The second radio apparatus 10*b* transmits training signals to the first radio apparatus 10*a* (S62). The first radio apparatus 10*a* selects antenna 12 based on the strength of the received training signals (S64). The first radio apparatus 10*a* transmits to the second radio apparatus 10*b* a rate request signal and training signals as shown in FIG. 3B (S66). The training signals are transmitted from the selected antenna 12. The second radio apparatus 10*b* estimates a channel, based on the training signals (S68). Based on the estimated channel, the second radio apparatus 10*b* updates the rate information (S70). The second radio apparatus 10*b* derives transmission weight vectors and then sets them (S72). The second radio apparatus 10*b* transmits the rate information to the first radio apparatus 10*a* (S74). In so doing, the transmission weight vectors are used so as to execute adaptive array signal processing. The first radio apparatus unit 10*a* sets receiving weight vectors, based on a burst signal that contains the rate information (S76). While using the receiving weight vectors, the first radio apparatus 10*a* then performs a receiving processing on the rate information (S78). The first radio apparatus 10*a* sets a data rate by referring to the accepted rate information (S80).

Figure 12:
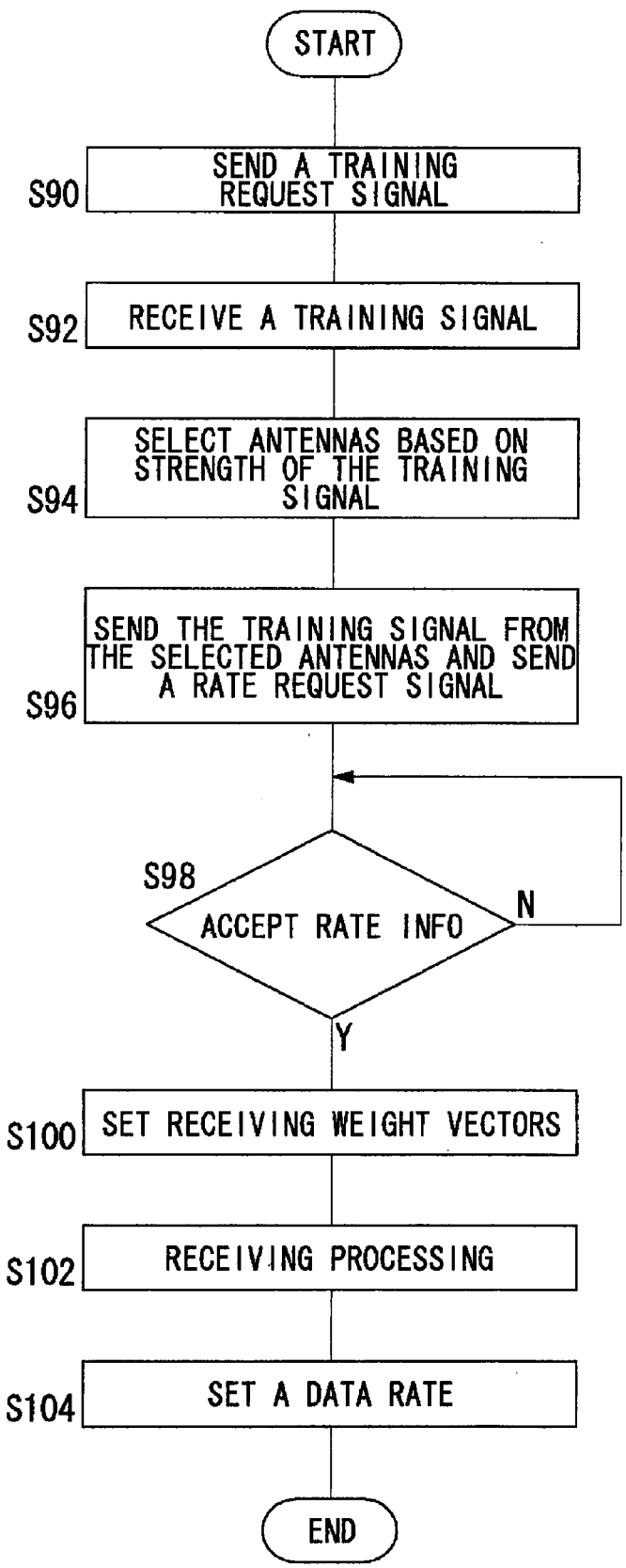
FIG. 12 is another flowchart showing a procedure of setting a data rate in a first radio apparatus of FIG. 6.

FIG. 12 is a flowchart showing another procedure of setting a data rate in the first radio apparatus 10*a*. FIG. 12 corresponds to the operation of first radio apparatus 10*a* shown in FIG. 11. The processing unit 22 transmits a training request signal (S90). The radio unit 20 receives training signals (S92). The selector 28 measures the strength of the received training signals for each antenna 12, and selects an antenna 12 based on the measured strength (S94). The processing unit 22 transmits, from the selected antenna 12, the training signals in a format of training signals as shown in FIG. 3B and also transmits a rate request signal (S96).

If the IF unit 26 does not accept the rate information via the antenna 12, radio unit 20, processing unit 22 and modem unit 24 (N of S98), keep waiting until the IF unit 26 accepts it. If, on the other hand, the IF unit 26 accepts the rate information (Y of S98), the processing unit 22 sets receiving weight vectors (S100). The processing unit 22, modem unit 24 and IF unit 26 carry out receiving processing (S102). The control unit 30 sets a data rate (S104). The rate information managing unit 32 stores the rate information.

Figure 13:
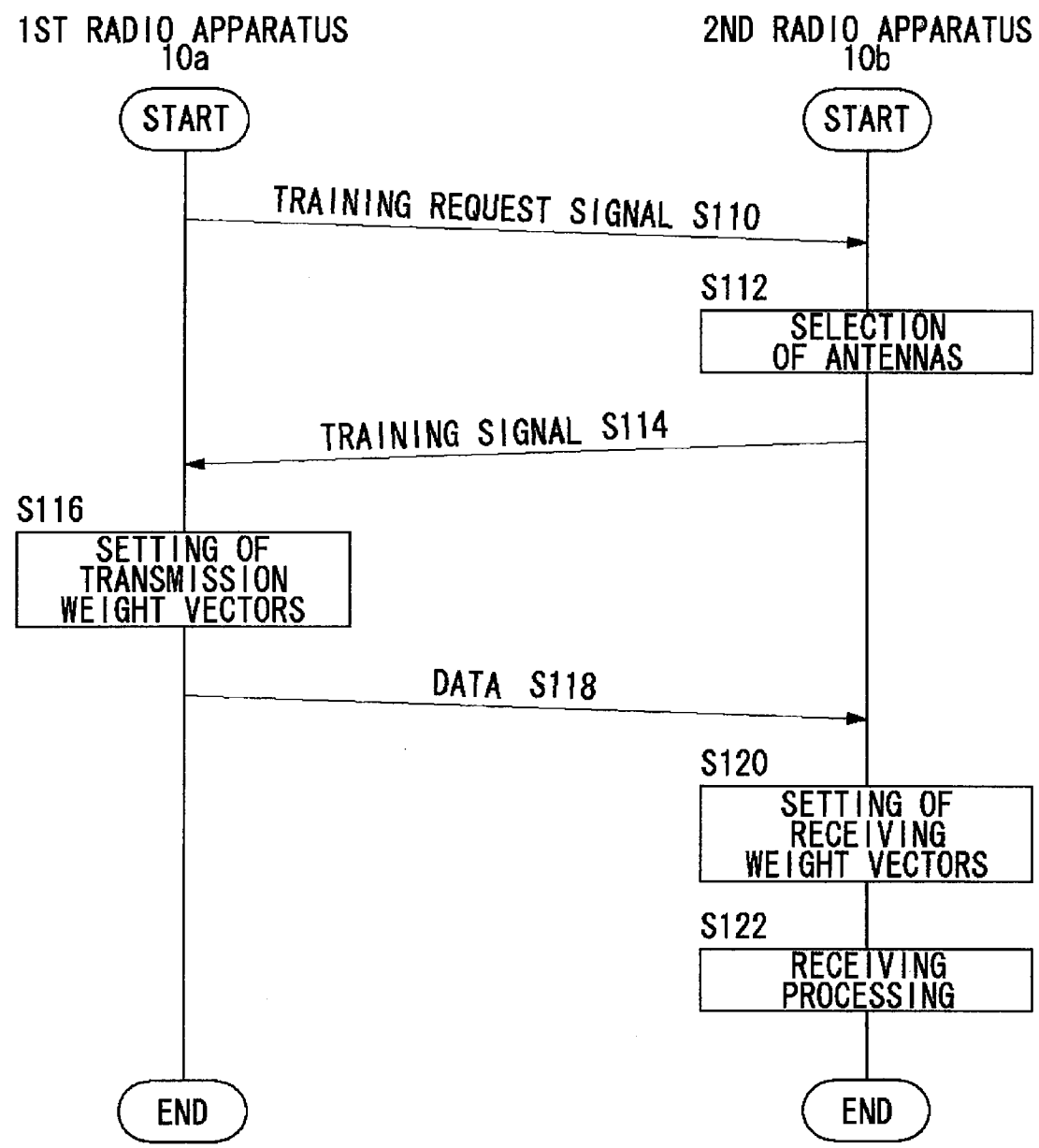
FIG. 13 is a sequence diagram showing a communication procedure in the communication system of FIG. 2.

FIG. 13 is a sequence diagram showing a communication procedure in the communication system 100. FIG. 13 is a sequence diagram for a procedure wherein the lower power consumption is intended in transmitting the training signals. The first radio apparatus 10*a* transmits a training request signal to the second radio apparatus 10*b* (S110). The second radio apparatus 10*b* selects an antenna 14 which is to be used when data are received (S112). The second radio apparatus 10*b* transmits training signals to the first radio apparatus from the selected antenna 14 (S114). The first radio apparatus 10*a* sets transmission weight vectors, based on the strength of the received training signals (S116). While using the transmission weight vectors, the first radio apparatus 10*a* transmits data to the second radio apparatus 10*b* (S118). The second radio apparatus 10*b* derives receiving weight vectors from a burst signal that contains the data, and then sets this (S120). A receiving processing is carried out based on the receiving weight vectors (S122).

Figure 14:
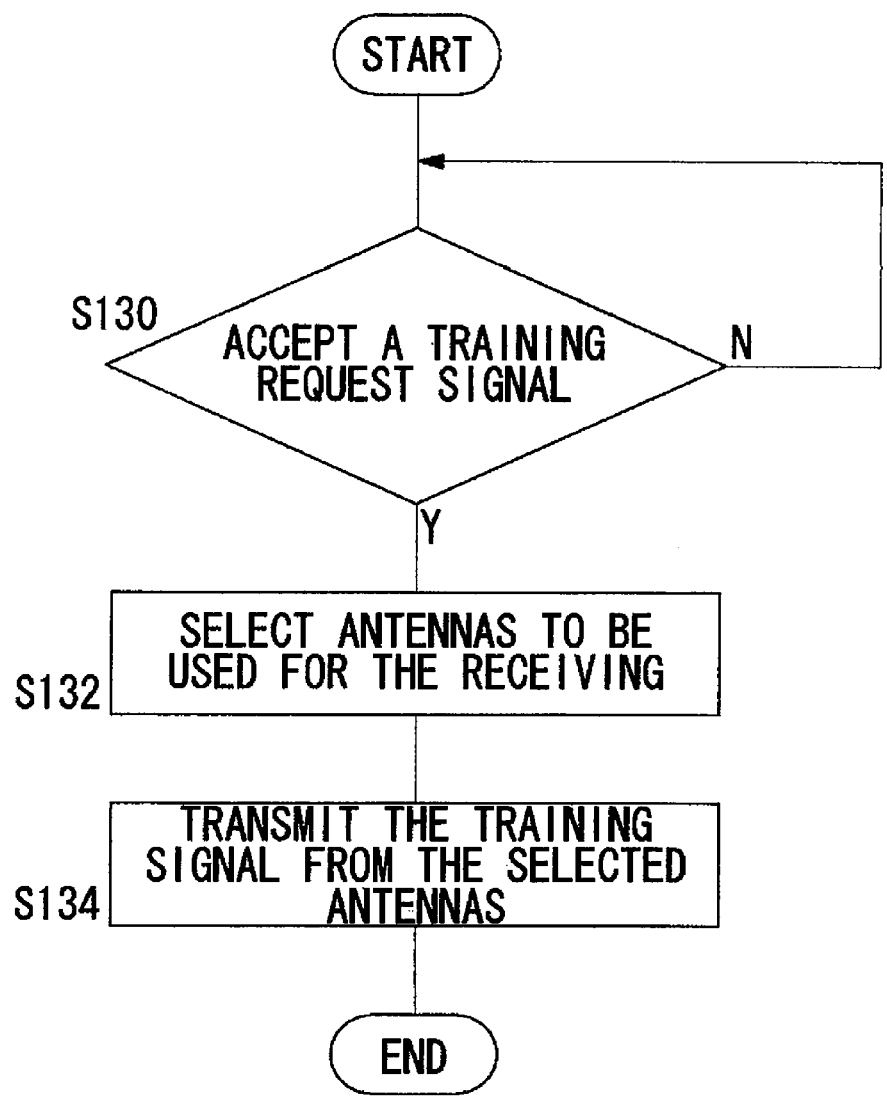
FIG. 14 is a flowchart showing a transmission procedure in a second radio apparatus of FIG. 13.

FIG. 14 is a flowchart showing a transmission procedure in the second radio apparatus 10*b*. FIG. 14 corresponds to the operation of the second radio apparatus 10*b* of FIG. 13. The processing is not started if the IF unit 26 does not accept a training request signal via the antenna 12, radio unit 20, processing unit 22 and modem unit 24 (N of S130). If, on the other hand, the IF unit 26 accepts the training request signal (Y of S130), the control unit 30 selects an antenna 14 which is to be used at the time of receiving (S132). The processing unit 22 transmits training signals from the selected antennas 14 (S134).

In the present embodiment described so far, the first radio apparatus 10*a* does not carry out adaptive array signal processing, namely, beam forming at the time of sending the training signals. This is for the purpose of having the second radio apparatus 10*b* perform the channel estimation in a state where the directivity of antenna is omnidirectional. In other words, this is for the purpose of having the second radio apparatus 10*b* perform the channel estimation in a state close to that of the channel in which the antennas are omnidirectional. As described earlier, if the training signals and the rate request signal are combined together, the first radio apparatus 10a can process, at high speed, the rate information determined in the second radio apparatus 10b by performing the following processing. If the first radio apparatus 10a performs beamforming, SNR (Signal-to-Noise Ratio) in the second radio apparatus 10b at the time of receiving can be improved compared to the case when it does not perform beamforming. If the second radio apparatus 10b determines the data rate based on the SNR, the improved SNR makes the determined data rate higher. Thus, when sending the rate request signal, the first radio apparatus 10a here performs beamforming at least on the training signals.

Figure 15:
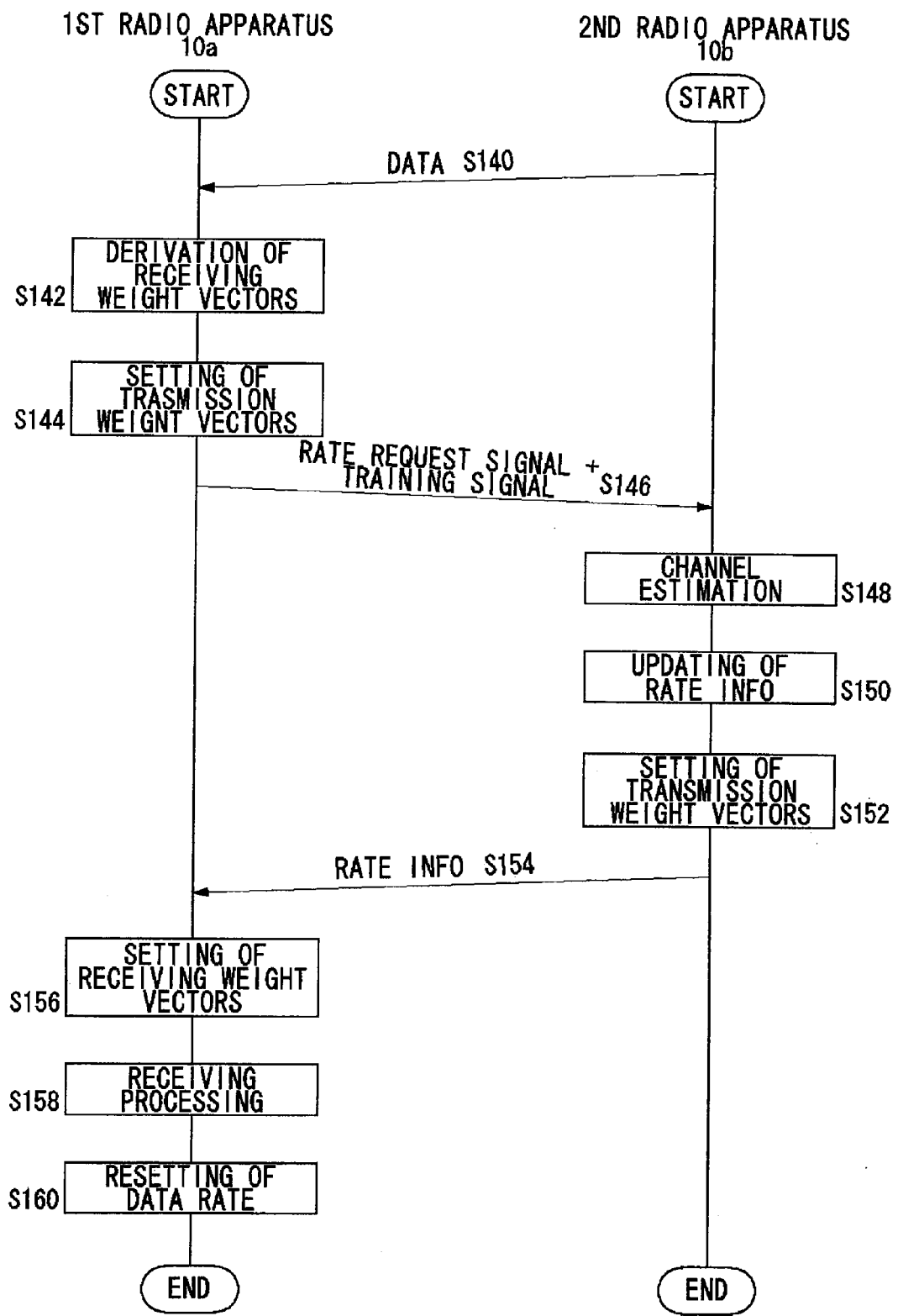
FIG. 15 is a sequence diagram showing still another procedure of setting a data rate in the communication system of FIG. 2.

FIG. 15 is a sequence diagram showing still another procedure of setting a data rate in the communication system 100. The second radio apparatus 10b transmits data to the first radio apparatus 10a (S140). Assume here that a communication has already been executed between the first radio apparatus 10a and the second radio apparatus 10b and the data rate has been set to a predetermined value. The first radio apparatus 10a derives receiving weight vectors, based on the received data (S142). The first radio apparatus 10a derives transmission weight vectors, based on the estimated receiving weight vectors and then sets these (S144). The first radio apparatus 10a performs a receiving processing on the received data. While carrying out beamforming by the derived transmission weight vectors, the first radio apparatus 10a transmits to the second radio apparatus 10b the rate request signal and training signals, as illustrated in FIG. 3B (S146).

Based on the training signals, the second radio apparatus 10b carries out channel estimation (S148). Based on the estimated channel, the second radio apparatus 10b updates rate information (S150). The second radio apparatus 10b derives transmission weight vectors and sets these (S152). The second radio apparatus 10b transmits the rate information to the first radio apparatus 10a (S154). In so doing, the adaptive array signal processing is carried out by using the transmission weight vectors. The first radio apparatus 10a sets receiving weight vectors, based on a burst signal that contains the rate information (S156). Then, while using the receiving weight vectors, the rate information undergoes a receiving processing (S158). The first radio apparatus 10a resets the data rate by referring to the accepted rate information (S160)

Figure 16:
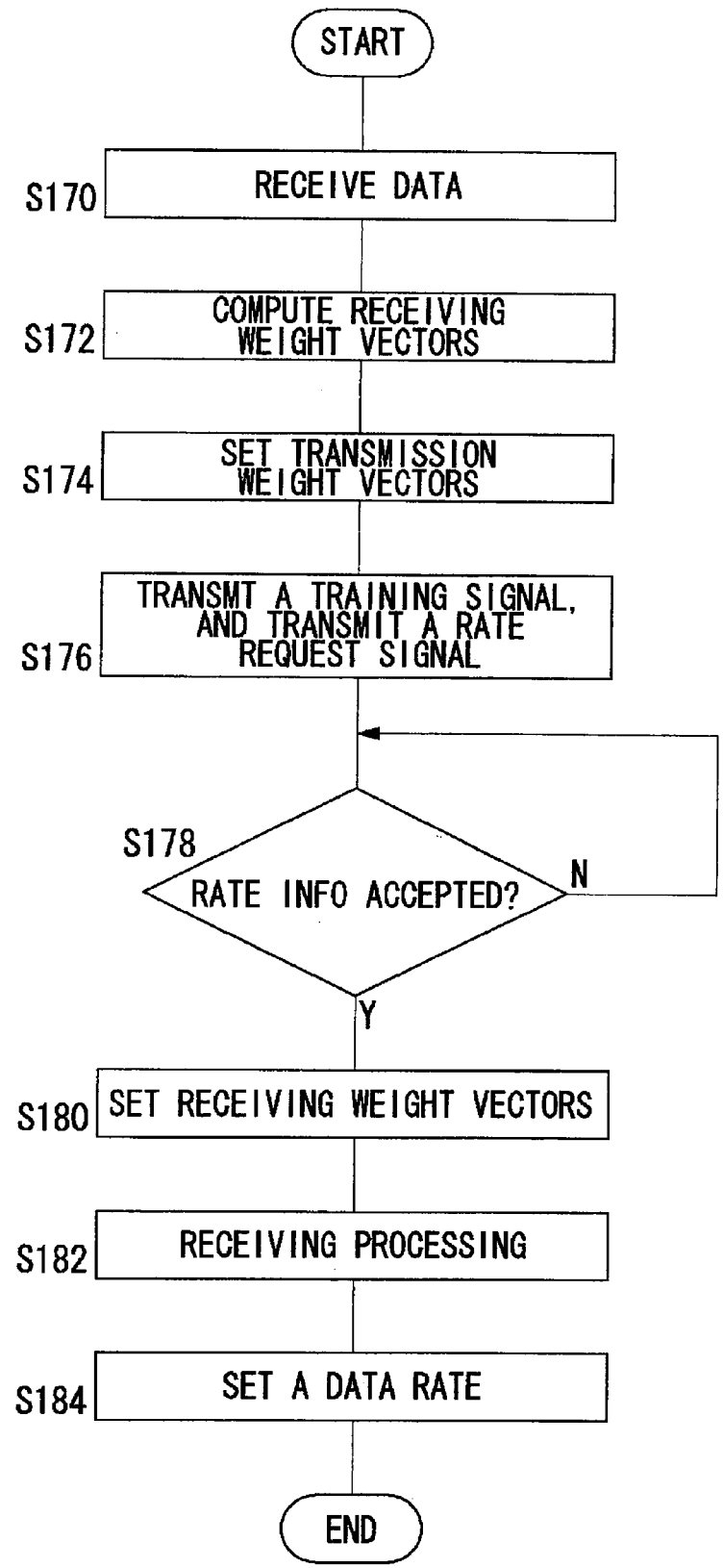
FIG. 16 is a flowchart showing still another procedure of setting a data rate in the first radio apparatus of FIG. 6.

FIG. 16 is a flowchart showing still another procedure of setting a data rate in the first radio apparatus 10a. FIG. 16 corresponds to the operation of first radio apparatus 10a shown in FIG. 15. The radio unit 20 receives data (S170). The processing unit 22 computes receiving weight vectors (S172) and sets transmission weight vectors (S174). While it carries out beamforming by the transmission weight vectors in a form a of training signals as shown in FIG. 3B, the processing unit 22 transmits the training signals from antenna 12 and, at the same time, transmits a rate request signal (S176).

If the IF unit 26 does not accept rate information via the antenna 12, radio unit 20, processing unit 22 and modem unit 24 (N of S178), keep waiting until the IF unit 26 accepts it. If, on the other hand, the IF unit 26 accepts the rate information (Y of S178), the processing unit 22 sets the receiving weight vectors (S180). The processing unit 22, modem unit 24 and IF unit 26 each carries out receiving processing (S182). The control unit 30 sets a data rate (S184). The rate information managing unit 32 stores the rate information.

Figure 17:
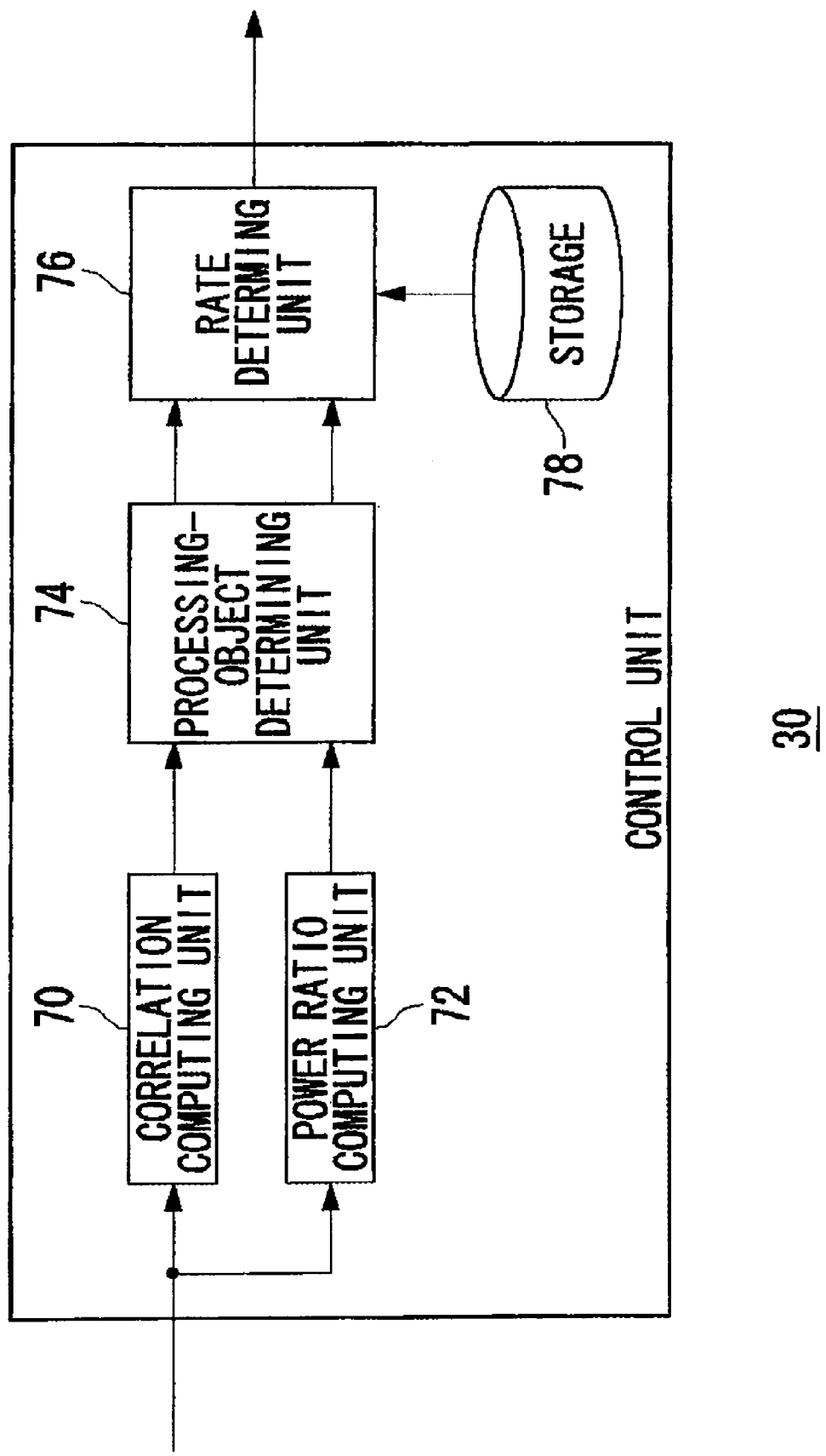
FIG. 17 illustrates a structure of a control unit shown in FIG. 6.

Next, a description on the generation of rate information will be given. The generation of rate information is done in Step 44 of FIG. 9. It is done by the second radio apparatus 10b. When the direction in which the rate request signal is transmitted is one from the second radio apparatus 10b to the first radio apparatus 10a, the rate information is also generated by the first radio apparatus 10a. However, the generation of rate information will be described herein as the processing to be carried out by the second radio apparatus 10b. In this case, the structure shown in FIG. 6 is replaced by that with the antenna 14 instead of the antenna 12. FIG. 17 illustrates a structure of a control unit 30. The control unit 30 includes a correlation computing unit 70, a power ratio computing unit 72, a processing-object determining unit 74, a rate determining unit 76 and a storage 78.

The processing performed by the control unit 30 is based on the assumption, as described earlier, that the radio unit 20, processing unit 22 and modem unit 24 shown in FIG. 6 all receive trainings signal via the antenna 14. As shown FIG. 3B, the training signals are transmitted from a plurality of antennas 12 that include antennas other than the first antenna 12a and second antenna 12b to transmit the first data and second data. The training signal corresponds to "MIMO-LTS". The respective training signals are so defined as to correspond respectively to a plurality of antennas 12. Based on the received training signals, the receiving weight vector computing unit 54 computes receiving weight vectors corresponding respectively to the plurality of antennas 12. A method for computing the receiving response vectors is implemented as described above and the repeated description thereof is omitted here. The OFDM modulation scheme is applied to the training signals received, as described above, and a plurality of subcarriers are used. Hence, the receiving response vectors are calculated for a plurality of subcarriers, respectively.

The correlation computing unit 70 computes, from the receiving response vectors, correlations among the receiving response vectors corresponding respectively to a plurality of antennas 12. Although the channel characteristics, namely, the receiving response vectors, corresponding to the first antenna 12a are denoted as "$h_{11}$", "$h_{12}$", "$h_{13}$" and "$h_{14}$" in FIG. 1, these are brought together and generically called "$h_1$" here and it is assumed here that the number of antennas 12 is "2". If assumed accordingly, then the correlation computing unit 70 computes a correlation value S which is expressed by the following Equation (5).

$$S = \frac{h_1^H h_2}{\sqrt{h_1^H h_1} \sqrt{h_2^H h_2}} \tag{5}$$

The thus computed correlation value S is the value corresponding to one subcarrier, and the correlation computing unit 70 derives correlation values S, respectively, that correspond to a plurality of subcarriers. It is to be noted here that the numerator in Equation (5) may serve as the correlation value S.

The power ratio computing unit 72 computes, from the receiving response vectors, power ratios among the receiving response vectors corresponding respectively to a plurality of antennas. The power ratio computing unit 72 computes a power ratio R which is expressed by the following Equation (6).

$$R = \frac{h_1^H h_1}{h_2^H h_2} \tag{6}$$

The thus computed power ratio R is the value corresponding to one subcarrier, and the power ratio computing unit 72 derives power ratios, respectively, that correspond to a plurality of subcarriers.

The processing-object determining unit 74 inputs a plurality of correlation values S and power ratios R corresponding respectively to a plurality of subcarriers. The processing-object determining unit 74 determines an object to be used to determine a data rate, from a plurality of correlation values S and a plurality of power ratios. One of methods for determining the object is to select a correlation value S and power ratio R that correspond to any of the plurality of subcarriers. For example, a measuring unit, which is not shown here, measures the signal strength of the respective subcarriers and the processing-object determining unit 74 selects a subcarrier whose signal strength is large. Alternatively, a statistical processing, such as taking the average, is performed on a plurality of correlation values S and a plurality of power ratios R, and derives the correlation values S that have undergone the statistics processing and the power ratios R that have undergone the statistics processing. Hereinafter, the correlation values S and power ratios R which have been determined by the processing-object determining unit 74 will be also referred to as the correlation value S and power ratio R.

Figure 18:
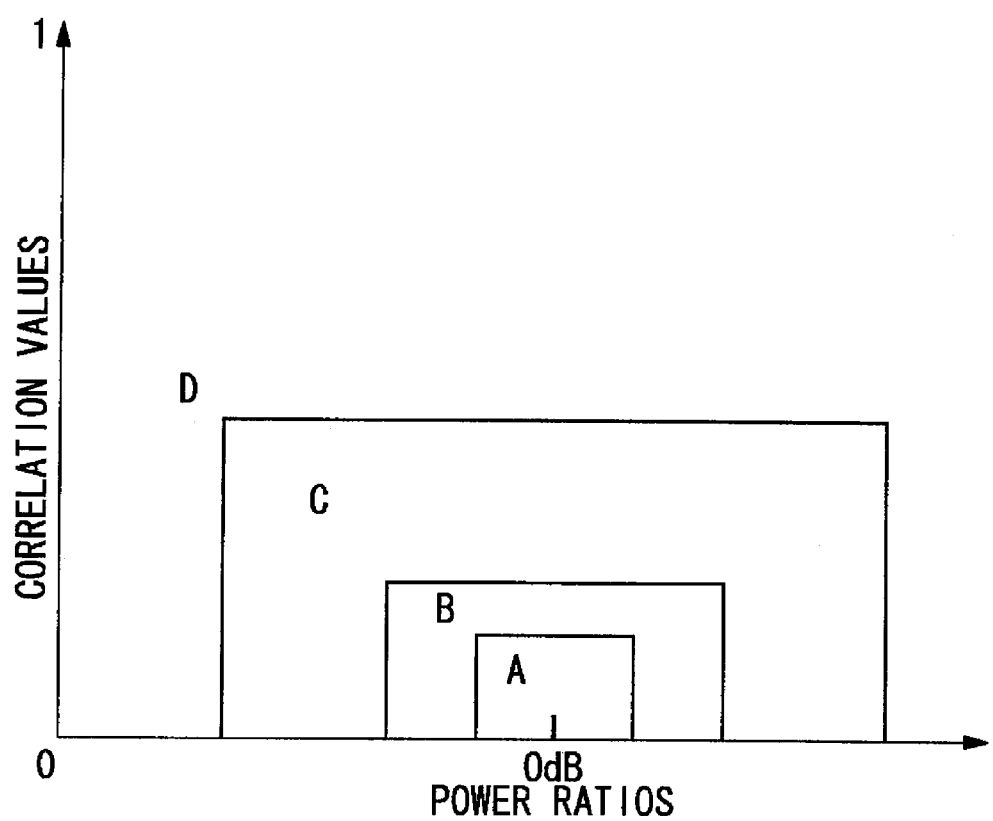
FIG. 18 illustrates a structure of criteria stored in a storage of FIG. 17.

Based on the correlation value S and the power ratio R from the processing-object determining unit 74, the rate determining unit 76 determines a data rate for data. In so doing, criteria stored in the storage 78 are referred to. FIG. 18 illustrates a structure of criteria stored in the storage 78. The criteria are so defined as to form a two-dimensional space by the correlation values and the power ratios, and the two-dimensional space is divided into a plurality of partial regions, namely, "A", "B", "C" and "D" as shown in FIG. 18. Here, the plurality of partial regions constituted by the regions "A", "B", "C" and "D" each corresponds to a predetermined data rate. For example, if the partial regions are corresponded to the number of antennas 12, the region "A" corresponds to "4" antennas, "B" to "3", "C" to "2" and "D" to "1".

It is to be noted that the modulation scheme and the coding rate may be defined in the similar manner, too, and by using this added combination thereof the two-dimensional space may be further divided into an added plurality of partial regions. Referring back to FIG. 17, the rate determining unit 76 associates an inputted correlation value S and power ratio R with a criterion and then identifies a partial region that contains the inputted correlation value S and power ratio R. Then the rate determining unit 76 derives a predefined data rate from the identified partial region. Upon acceptance of a rate request signal, the control unit 30 carries out the aforementioned processing. When the rate information is transmitted, the determined data rate is included in this rate information. The rate determining unit 76 may determine a data rate for data, based on either the correlation value S or power ratio R. In such a case, the processing can be simplified.

Next, a burst format which is modified over the burst format shown in FIG. 3b will be explained. As shown in FIG. 3B, training signals are transmitted from a plurality of antennas 12 in order for the second radio apparatus 10b to estimate a plurality of channels. As described earlier, a part such as "First MIMO-STS" is used to set the gain of AGC while a part such as "First MIMO-LTS" is used to estimate channels. With the structure as shown in FIG. 3B under the following situation, the receiving characteristics of the first data and second data possibly suffer deterioration. If the propagation loss in the channel from antennas in which no data is being transmitted, namely, the third antenna 12c and the fourth antenna 12d, is smaller than the propagation loss in the channel from the other antennas, the receiving strength at the second radio apparatus 10b gets large to some extent due to the "Third MIMO-STS" and "Fourth MIMO-STS". For such occasions, the gain of AGC is set to a low value. As a result, when the "First Data" and "Second Data" are demodulated, the gain is not in the enough level, so that the error is likely to occur. A description will be given here of a burst format by which to suppress such deterioration of channel quality. The burst format is formed in the processing unit 22, based on an instruction from the control unit 30.

FIGS. 19A and 19B illustrate another structures of burst format in the communication system 100. FIG. 19A corresponds to a case when three MIMO-LTSs are allotted respectively to three antennas 12 and two Data are allotted respective to two antennas 12. Components therein from "Legacy-STS" to "MIMO signal" are the same as those shown in FIG. 3B, and the description thereof is omitted here. "MIMO-LTSs" are allocated respectively to the three antennas 12 that include antennas other than those used to transmit "MIMO-STS". That is, the number of antennas 12 that should transmit "MIMO-LTSs" is determined based on the number of channels to be estimated. On the other hand, the number of antennas 12 that should transmit "MIMO-STSs" is made equal to the antennas 12 that should transmit "Data". In other words, two sets of "MIMO-STS" and "Data" are defined at a time, and those are allotted respectively to the same two antennas 12. Thus, at the setting of the gain of AGC, the signal strength at the instant when "Data" is received is brought close to that at the instant when "MIMO-STS" is received. As a result, the deterioration of receiving quality due to the gain of AGC can be prevented.

In the burst format of FIG. 19A, "MIMO-STS" is transmitted from the antenna 12. Here, "First MIMO-STS" and "Second MIMO-STS" are so defined as to use different subcarriers from each other. For example, "First MIMO-STS" uses the odd-numbered subcarriers while "Second MIMO-STS" uses the even-numbered subcarriers. The relation between these two MIMO-STSs in terms of such the use of subcarriers is called "tone interleaving". The tone interleaving is carried out in "MIMO-LTSs" among three antennas 12. When "first MIMO-LTS" and the like are subjected to the tone-interleaving, the number of OFDM symbols are extended to three times the original number thereof, compared with when the tone-interleaving is not executed.

In FIG. 19B, two MIMO-LTSs are allocated respectively to two antennas. This corresponds to a case where one data is allocated to one antenna 12. As described earlier, if the number of "Data" is one, "MIMO-STS" can be put to a common use with "Legacy STS". Since "Legacy STS" is a signal necessary for maintaining compatibility with a communication system which is not compatible with a MIMO system, "Legacy STS" cannot be omitted. Thus, "MIMO-STS" is omitted. Accordingly, "Legacy STS" may also be said to correspond to "MIMO-STS".

FIG. 20 illustrates still another structure of burst format in the communication system 100. Similar to FIG. 19A, FIG. 20 corresponds to a case when three "MIMO-LTSs" are allocated respectively to three antennas 12 and two data are allocated respectively to two antennas 12. As for "MIMO-LTSs", the same as with FIG. 19A holds true. The control unit 30 increases the number of antennas 12 that should transmit "MIMO-STS" up to the number of antennas that should transmit "MIMO-LTS". In other words, as shown in FIG. 20, the number of antennas 12 is increased from "2" of FIG. 19A to "3" of FIG. 20. Furthermore, the data corresponding respective to the antennas 12 the number of which is not yet increased are segmented, and the thus segmented data are associated to the antennas 12 the number of which has been increased.

The data corresponding respective to the antennas 12, the number of which corresponds to that prior to increasing the number of antennas, corresponds to, for example, "Second Data" of FIG. 19. The control unit 30 segments the "Second Data" into "First-half Data" and "Second-half Data" as shown in FIG. 20. When the data is segmented, the control unit 30 carries out the data segmentation on a subcarrier-by-subcarrier basis. That is, "First-half Data" and "Second-half Data" are in a tone-interleave relationship. In this case, too, at the setting of the gain of AGC, the signal strength at the instant when "Data" is received is brought close to that at the instant when "MIMO-STS" is received. As a result, the deterioration of receiving quality due to the gain of AGC can be prevented.

FIGS. 21A to 21D illustrate still another structure of burst format in the communication system 100. Similar to FIG. 19A, FIGS. 21A to 21D also correspond to a case when three "MIMO-LTSs" are allocated respectively to three antennas 12 and two data are allocated respectively to two antennas 12. As for "MIMO-STSs" and "Data", the same as with FIG. 19A holds true. The control unit 30 assigns a part, in "MIMO-LTS", corresponding to antennas 12 to transmit "MIMO-STS" and a part, in the "MIMO-LTS", corresponding to antenna 12 other than the antennas 12 to transmit the "MIMO-STS" in such a manner as to have different timings. Here, the antennas 12 to transmit the "MIMO-STS" are the first antenna 12a and the second antenna 12b.

Accordingly, the parts corresponding thereto correspond to "First MIMO-LTS" and "Second MIMO-LTS". On the other hand, the antenna 12 other than the antennas 12 to transmit the "MIMO-STS" is the third antenna 12c, and the part corresponding thereto corresponds to "Third MIMO-LTS". As shown in FIGS. 21A to 21D, these formats are so assigned that timings thereof are varied or shifted. It is to be noted that "Third MIMO-LTS" is so defined as to use all of subcarriers. According to such formats as these, when "First MIMO-LTS" and "Second MIMO-LTS" are amplified by AGC, "Third MIMO-LTS" has no effect on them, so that the channel estimation by use of these formats can be made more accurately. In this case, too, at the setting of the gain of AGC, the signal strength at the instant when "Data" is received is brought close to that at the instant when "MIMO-STS" is received. As a result, the deterioration of receiving quality due to the gain of AGC can be prevented. FIG. 21B corresponds to a case when two MIMO-LTSs are allotted respectively to two antennas 12 while one data is allotted to one antenna 12. As shown in FIG. 21B, the structure of burst format shown in FIG. 21B corresponds to that shown in FIG. 21A. The same is true for FIG. 21C but "First MIMO-STS" is omitted in FIG. 21C. It can also be said that "Legacy STS" corresponds to "MIMO-STS". FIG. 21D is in the same situation as with FIG. 21B but "MIMO Signal" is further omitted. Thus, the overhead in a burst signal can be made small. In such a case, a control signal for a MIMO system is not contained therein, so that it is necessary to become aware beforehand that the burst signal in question has been transmitted. For example, a training request signal has been transmitted in advance.

Various modifications to the burst format shown in FIG. 20 will be described hereinbelow. In the burst format show in FIG. 20, the number of MIMO-STSs, MIMO-LTSs and Data are the same. That is, the MIMO-STS, MIMO-LTS and Data are transmitted from three antennas 12, respectively. According to such a burst format as shown in FIG. 20, the number of MIMO-STS is equal to that of Data, so that the error contained in the setting of AGC at the receiving side is reduced when a receiving processing is carried out for Data. Furthermore, the MIMO-LTS is transmitted from a plurality of antennas 12, so that it is possible to estimate the channels corresponding to the plurality of antennas 12 at the receiving side. Furthermore, the number of MIMO-STSs is equal to that of MIMO-LTSs, so that the degree of accuracy in channel estimation based on MIMO-LTS is raised.

In a modification described below, the following advantageous features are added. For instance, assume now that the number of antennas 12 is "3" and the data to be transmitted is composed of "2" streams. The data are turned into "3" streams by segmenting any of "two"-stream data, and then the data are allotted respectively to "3" antennas 12. In such a case, there exist a plurality of combinations of segmentation of data and allotment of antennas 12. When the number of antennas 12 increases, the number of combinations also increases. In other words, if any of data streams is segmented and allotted to any of antennas 12, the processing may possibly become complicated. It is an object of a first modification to reduce the processing amount or throughput and, at the same time, allot the data to the antennas 12 even if the number of data streams to be transmitted is less than the number of antennas 12.

FIGS. 22A and 22B illustrate structures of burst format modified over that of FIG. 20, and these correspond to the first modification. Similar to what has been described above, in each of FIGS. 22A and 22B, the top row indicates a signal corresponding to the first antenna 12a; the middle row a signal corresponding to the second antenna 12b; and the bottom row a signal corresponding to the third antenna 12c. On one occasion these are collectively called a burst signal, whereas on another occasion a signal transmitted from one antenna 12 is called the burst signal. In this patent specification, the term "burst signal" will be used without any such distinction. "MIMO-LTS" and the like serving as known signals and Data are contained in the burst signal. In FIG. 22A, Legacy STS (hereinafter referred to as "L-STS"), Legacy LTS (hereinafter referred to as "L-LTS"), Legacy signal (hereinafter referred to as "L-signal") and MIMO signal are allotted to the first antenna 12a only.

A structure subsequent to the above is as follows. In the following description, data is assumed to correspond to two antennas 12. That is, it is assumed herein that the number of data streams is less than the number of antennas 12. The control unit 30 as shown in FIG. 6 increases the number of antennas 12 that should transmit MIMO-STS and Data, up to the number of antennas 12 that should transmit MIMO-LTS. That is, if the Data corresponds to at least one of the antennas 12 that should transmit MIMO-LTS, the control unit 30 associates the Data to antenna 12 that should transmit MIMO-LTS by increasing the number of antennas 12 to be associated thereto. Since the number of antennas 12 that should transmit MIMO-LTS is "3" here, the number of antennas 12 that should transmit MIMO-STS and Data becomes "3", too. The data, which correspond respectively to antennas 12 prior to increasing the number thereof, namely, the "2"-stream data, are segmented and the thus segmented data are associated respectively to antennas 12 having the number of antennas 12 that should transmit MIMO-LTS.

Describing the above more specifically, the control unit 30 causes the IF unit 26 to combine the "2"-stream data into one, segment the thus combined data into "3" data and allot the "3" data to "3" antennas 12. The data may be assumed to correspond to "2" streams and then treated as one data. In this case, the data are not combined but segmented into "3". The number of antennas 12 may be other than "3". Here, for example, the segmentation of data are so carried out as to be of approximately evenly divided data amount for each of a plurality of antennas 12. Also, the data may be segmented according to a predefined rule. As a result of the above processing, MIMO-STS, MIMO-LTS and Data are allotted respectively to the three antennas 12, as shown in FIG. 22A. In FIG. 22A or FIG.

22B, the data are represented as "first segmented data", "second segmented data" and "third segmented data".

As described earlier, the control unit 30 uses a plurality of subcarriers for MIMO-LTS and Data, and varies the combination of subcarriers to be used respectively for MIMO-LTSs, for each of the plurality of antennas 12. In other words, the MIMO-LTSs corresponding respectively to the first antennas 12a to the third antennas 12 use different subcarriers, respectively. In FIG. 22A, a first MIMO-LTS(1) uses ⅓ of entire subcarriers, the second MIMO-LTS(1) uses also ⅓ of entire subcarriers, and the third MIMO-LTS(1) uses also ⅓ of entire subcarriers. It is assumed that the subcarrier used for the first MIMO-LTS(1) to third MIMO-LTS(1) do no overlap. The same relationship holds among first MIMO-LTS(2) to third MIMO-LTS(2). The same relationship also holds among first MIMO-LTS(3) to third MIMO-LTS(3). Also, the first MIMO-LTS(1), the first MIMO-LTS(2) and the first MIMO-LTS(3) use mutually different subcarriers. The first MIMO-LTS(1), the first MIMO-LTS(2) and the first MIMO-LTS(3) are MIMO-LTSs allotted to different symbols.

The above rule can be interpreted as follows. For the period of one symbol, MIMO-LTSs allotted respectively to a plurality of antennas 12 use mutually different subcarriers. While MIMO-LTSs, which are allotted to one antennas 12 and contained over a plurality of symbols, are using mutually different subcarriers, respectively, they use, as a whole, all of subcarriers to be used. When data are associated to antennas 12 that should transmit MIMO-LTS, a combination of subcarriers in MIMO-LTS transmitted from the same antennas 12 as the one from which the data are sent is used for the data in question. For example, it is structured such that subcarriers used for the first segmented data are the same as those used for the first MIMO-LTS(1). By carrying out such a processing, the processing amount necessary for segmenting data is reduced and at the same time the data can be allotted respectively to a plurality of antennas 12.

The subcarries used for MIMO-LTS placed in the beginning are the same as those used for Data. Hence, when a receiving apparatus, not shown, receives MIMO-LTSs assigned in a plurality of symbols, the channel estimation is carried out from at least the MIMO-LTS placed in the beginning, and the Data are demodulated based on the result thereof. Subcarriers used for MIMO-LTS other than the MIMO-LTS placed in the beginning differ from those used for Data. Hence, even if such subcarriers are not used for demodulation, the deterioration in the quality of demodulation is suppressed. Thus, the receiving apparatus may skip a processing for MIMO-LTSs other than the MIMO-LTS placed in the beginning. As a result, the processing amount can be reduced and the same processing as with a receiving apparatus compliant with the IEEE802.11a standard can be applied.

FIG. 22B illustrates a modification of the burst format shown in FIG. 22A. MIMO-STS and its subsequent portions in FIG. 22B are the same as with FIG. 22A. L-STS to MIMO Signal are allotted to the second antenna 12b and the third antenna 12c, too. In this case, for example, CDD (Cyclic Delay Diversity) is performed on L-STSs allotted to the second antenna 12b and the third antenna 12c. That is, the L-STS allotted to the second antenna 12b undergoes a timing shift against the L-STS allotted to the first antenna 12a. The same is applied to the L-STS allotted to the third antenna 12c.

Figure 23:
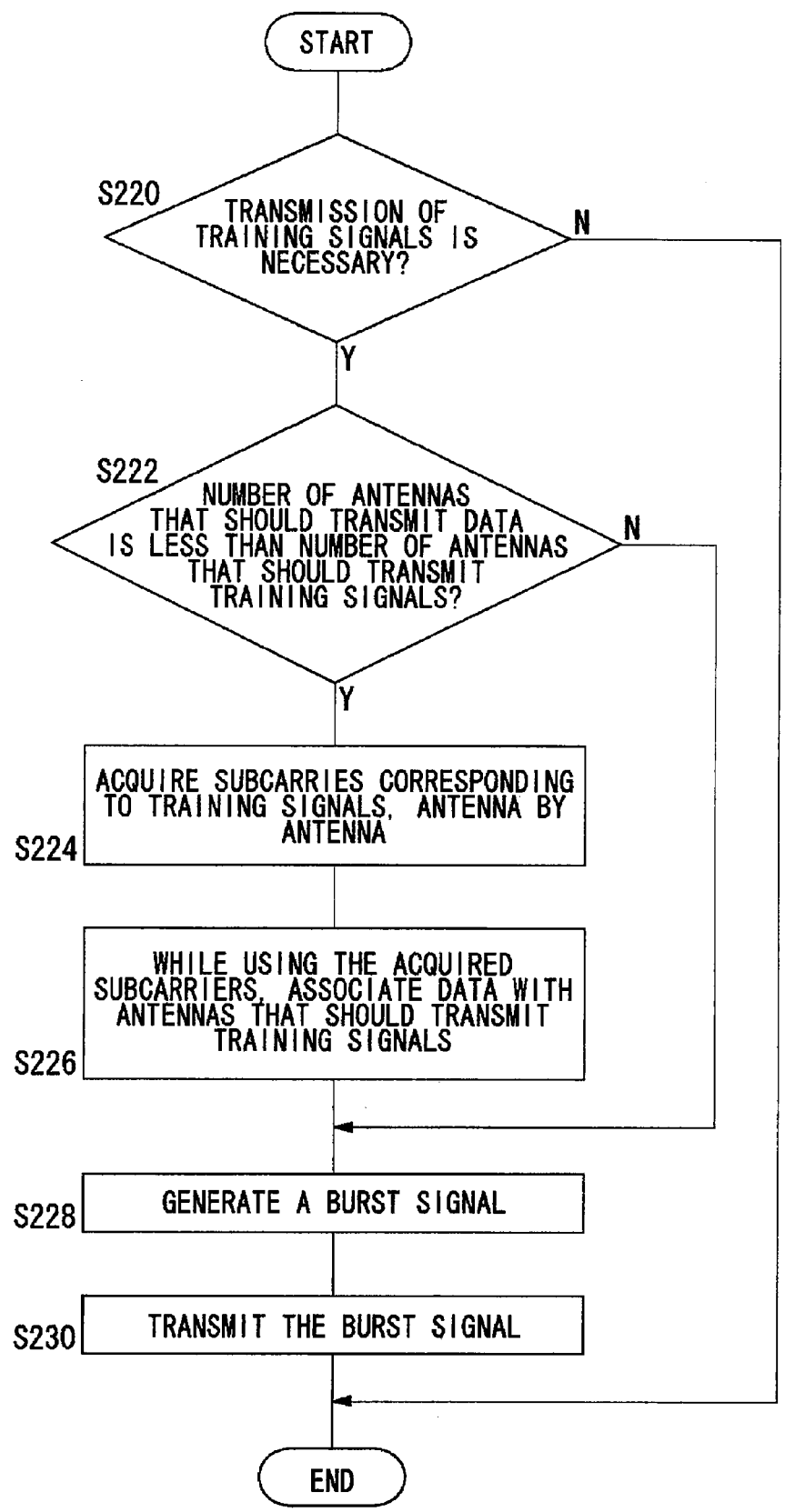
FIG. 23 is a flowchart showing a transmission procedure corresponding to the burst formats shown in FIGS. 22A and 22B.

FIG. 23 is a flowchart showing a transmission procedure corresponding to the burst formats shown in FIGS. 22A and 22B. If the transmission of training signals is necessary (Y of S220) and the number of antennas 12 that should transmit data is less than the number of antennas 12 that should transmit the training signals (Y of S222), the control unit 30 acquires subcarriers corresponding to the training signals for each of a plurality of antennas 12 (S224). While using the thus acquired subcarriers, the control unit 30 associates the data with the antennas 12 that should transmit the training signals (S226). That is, similar to the training signals, the data corresponding to a plurality of antennas 12 are mutually subjected to tone interleaving.

The control unit 30 generates a burst signal from at least the training signals and data (S228). If, on the other hand, the number of antennas 12 that should transmit data is not less than the number of antennas 12 that should transmit the training signals (N of S222), namely, if the number of antennas 12 that should transmit data is equal to the number of antennas 12 that should transmit the training signals, the control unit 30 generates a burst signal from at least the training signals and data (S228). The radio apparatus 10 transmits the burst signal (S230). If the transmission of training signals is not necessary (N of S220), the processing is terminated.

Next, a second modification of burst format shown in FIG. 20 will be described. If the characteristics of channel from any of a plurality of antennas is not suited for the transmission of data when MIMO-LTS is transmitted from the plurality of antennas 12, there is a possibility that data transmitted from the plurality of antennas 12 is corrupted and thus erroneous. It is an object of the second modification to reduce the probability of the data error even if the data are transmitted from a plurality of antennas. The burst format according to this second modification is represented by FIGS. 22A and 22B.

If data corresponds to at least one of antennas 12 that should transmit MIMO-LTS, the control unit 30 of FIG. 6 has the data associated to the antennas 12 that should transmit MIMO-LTS by increasing the number of antennas to be associated thereto, as described earlier. The control unit 30 determines the data rate of data contained in the burst signal. If the data are associated to the antennas 12 that should transmit MIMO-LTS, the control unit 30 decides on a data rate which is lower than the data rate set before the data is associated thereto, for the antennas 12 that should transmit MIMO-LTS. For example, assume that the number of antennas 12 that should transmit MIMO-LTS is "3" and the data is composed of "2" streams. If the data rate of "2"-stream data is 100 Mbps, the data rate when the data is turned into "3"-stream data will be 50 Mbps. "The data rate set before the data is associated thereto, for the antennas 12 that should transmit MIMO-LTS" may be the data rate which has been used for a communication so far, or may be the data rate determined according to a channel characteristics. Here, as described earlier, the data rate is determined by the modulation scheme, coding rate of error correction and the number of antennas 12.

Figure 24:
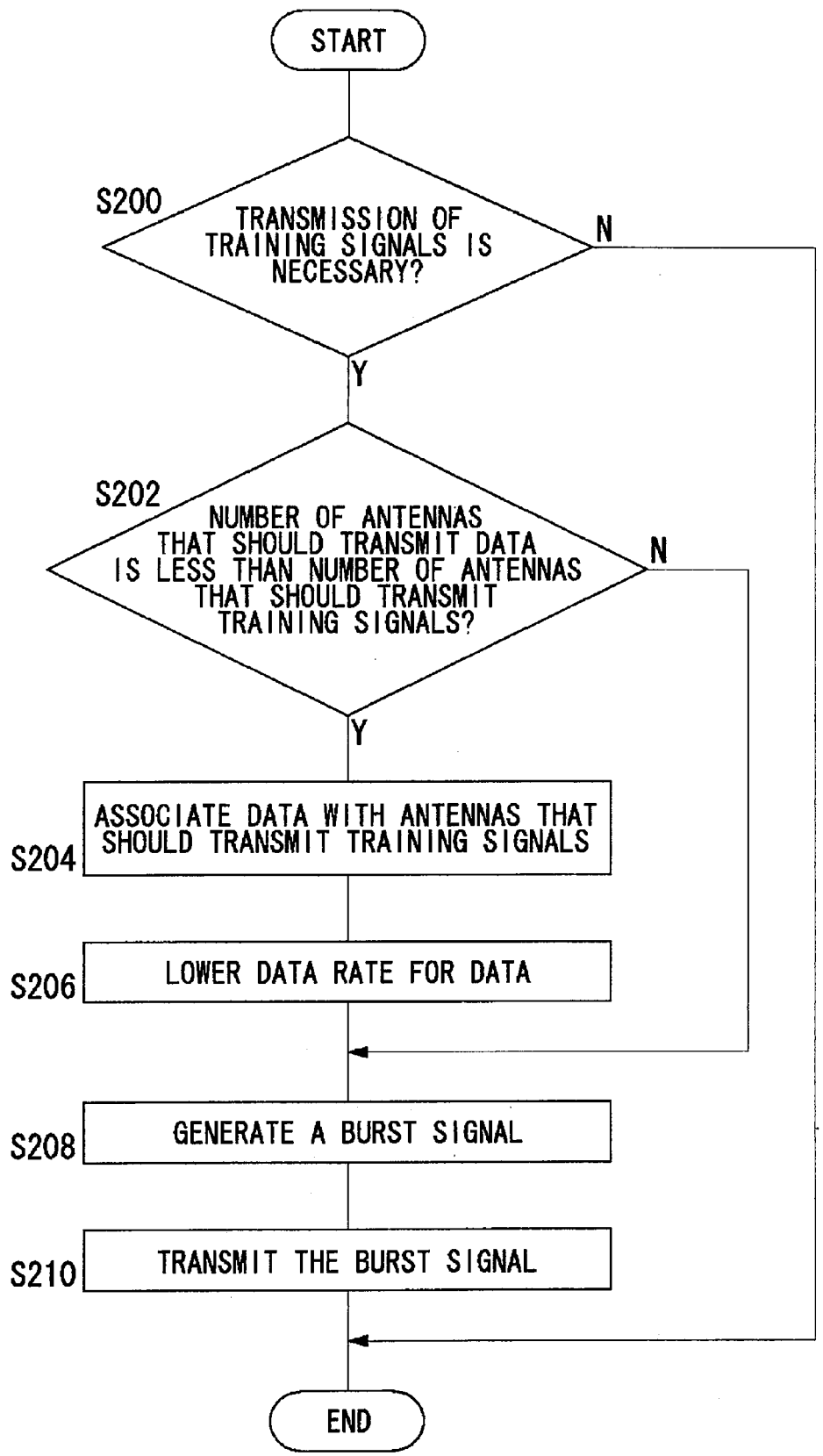
FIG. 24 is a flowchart showing another transmission procedure corresponding to the burst formats shown in FIGS. 22A and 22B.

FIG. 24 is a flowchart showing another transmission procedure corresponding to the burst formats shown in FIGS. 22A and 22B. If the transmission of training signals is necessary (Y of S200) and the number of antennas 12 that should transmit data is less than the number of antennas 12 that should transmit the training signals (Y of S202), the control unit 30 has the data associated to the antennas that should transmit the training signals (S204). The control unit 30 lowers the data rate for data (S206). The control unit 30 generate a burst signal from at least the training signals and data (S208). If, on the other hand, the number of antennas 12 that should transmit data is not less than the number of antennas 12 that should transmit the training signals (N of S202), namely, if the number of antennas 12 that should transmit data is equal to the number of antennas 12 that should transmit the training signals, the control unit 30 generates a burst signal from at least the training signals and data (S208). The radio apparatus 10 transmits the burst signal (S210). If the transmission of training signals is not necessary (N of S200), the processing is terminated.

According to the first embodiment, when a request signal is transmitted to a targeted radio apparatus, training signals are transmitted from a plurality of antennas. Thus, the rate information, about the targeted radio apparatus, which has been generated based on the training signals can be obtained and therefore the degree of accuracy in rate information can be improved. The rate information is determined in consideration of the effect of various channels by using the training signals, so that the degree of accuracy in rate information can be improved. Since the request signal and the training signals are transmitted consecutively, the most recent rate information can be obtained. Since the latest updated rate information can be acquired, the error in rate information can be made small even if a channel fluctuates. Moreover, when information on the data rate of a targeted radio apparatus is needed, the request signal is transmitted. Thus, even if the rate information is not transmitted on a periodic basis, accurate rate information can be obtained. With the improved accuracy of rate information, the occurrence of data error is reduced and the accuracy of control in transmitting data can be improved. Since the rate request signal and the training signals are transmitted in a combined manner, the deterioration of effective data rate can be prevented.

Since the number of antennas that should transmit training signals is reduced, the power consumption can be reduced. The antennas to be used for a communication transmit the training signals, so that the deterioration of characteristics can be suppressed. Since the power consumption can be reduced, the operable period can be extended even if the radio apparatus is powered by a battery. Since the power consumption can be reduced, the radio apparatus can be made smaller in size. Since antennas that have higher signal strength are preferentially selected, the deterioration of quality in data transmission can be prevented. Since antennas are selected according to the wireless quality, the deterioration of quality in data transmission can be prevented while reducing the power consumption. The known signals are transmitted from antennas that should transmit data, so that the deterioration of transmission weight vectors derived in a radio apparatus to be communicated is prevented. Also, antennas that should transmit data are selected, so that the power consumption is reduced. Since the derived transmission weight vectors are accurately produced, the deterioration of antenna directivity can be prevented.

The beamforming is carried out at the time of transmitting the training signals, so that the signal strength at a targeted radio apparatus can be raised and the information on a rate having faster values can be obtained. The beamforming is also executed at the time of actually transmitting the data, so that a data rate suited for the occasion of a data rate transmission can be obtained. When a data rate is determined, the values of correlation among the receiving response vectors and the ratios in strength among receiving response vectors are taken into account, so that the effect among signals transmitted respectively from a plurality of antennas can be reflected. The degree of accuracy of the determined rate information can be improved. In a MIMO system, when the correlation value becomes smaller, the channel characteristics improve. Also, when the strength ratio becomes smaller, they improve. Thus, the data rate can be so determined as to reflect such characteristics. The decision based on the correlation values and strength ratios can be applied to a system in which a plurality of carriers are used. When the training signals are received, the rate request signal is also received. Thus, the rate information determined can be notified and the highly accurate rate information can be provided.

Since the antennas for transmitting MIMO-STSs are the same as those for transmitting Data, the signal strengths at the time when MIMO-STS is received and Data is received in setting AGC gain at a receiving side can be brought close to each other. The deterioration of receiving quality due to AGC gain can be prevented. The effect of portions corresponding to antennas other than antennas to transmitting MIMO-STS upon those corresponding to antennas to transmit MIMO-STS can be made smaller, so that the accuracy of channel estimation at portions corresponding to the antennas to transmit MIMO-STS can be improved at a receiving side. The interference among the segmented data can be made small.

Even if, in a case where data are associated to antennas that should transmit MIMO-LTS, the characteristics of radio channel from the thus associated antenna are not suited for data transmission, the occurrence of data error can be reduced by lowering the data rate. When the number of antennas transmitting MIMO-LTS is increased, the number of antennas transmitting MIMO-STS can be increased, too, and the data streams having the same number of streams as the number of antennas transmitting MIMO-STS can be transmitted. In a case when the number of data streams is increased, the deterioration of transmission quality of data can be prevented. In a case where data are associated to a plurality of antennas, the same subcarriers are used for MIMO-LTS and Data corresponding to each antenna, so that the selection of subcarriers to be used for the respective data can be facilitated. Even in cases where the number of antennas that should transmit MIMO-LTSs and the number of data streams vary, the allotment of data to antennas can be facilitated. If two modifications to FIG. 20 are combined, the advantageous aspects gained by both the two modifications can be obtained.

Second Embodiment

Similar to the first embodiment, a second embodiment of the present invention relates to a MIMO system and it particularly relates to a transmitting apparatus in the MIMO system. The transmitting apparatus according to the present embodiment corresponds to transmitting functions in the first radio apparatus or second radio apparatus in the first embodiment. In the same situation as in the first embodiment where the training signals are to be transmitted, the transmitting apparatus transmits training signals. Here, a description will be given centering around a burst format containing training signals, and the repeated description on the same situation, in which the training signals are to be transmitted, as in the first embodiment is omitted. The transmitting apparatus transmits a burst signal composed of a plurality of streams, namely a burst signal of multiple streams, corresponding to a plurality of antennas and assigns a plurality of MIMO-STSs in a burst signal composed of a plurality of streams. Subsequent to a plurality of MIMO-STSs, the transmitting apparatus assigns a plurality of MIMO-LTSs in the burst signal composed of a plurality of streams. The transmitting apparatus also assigns Data in part of the burst signal composed of a plurality of streams. The transmitting apparatus increases data up to the number of a plurality of streams by multiplying the data by a steering matrix. The transmitting apparatus also multiplies MIMO-LTS by a steering matrix. However, the transmitting apparatus does not multiple MIMO-STS by a steering matrix. In what is to follow, a burst signal of a plurality of streams that has been multiplied by a steering matrix will be called "a burst signal of a plurality of streams" (namely, "a burst signal of multiple streams") also as before without distinguishing therebetween.

Here, MIMO-STS has a predetermined cycle. More specifically, a guard interval is added to a signal having a cycle of 1.6 μs. The aforementioned steering matrix contains therein a component in which a time shifting is cyclically executed for each stream. The cyclically executed time shift is the so-called CDD (Cyclic Delay Diversity). Here, the cyclic time shifting is performed on a cycle of pattern contained in MIMO-LTS. The similar processing is performed on Data as well. Although time-shift amounts differ for each burst signal of a plurality of streams, at least one of these time-shift amounts is set to an amount greater than or equal to the cycle in MIMO-STS. According to the processing described as above, the transmitting apparatus deforms a burst signal of a plurality of streams and transmits the burst signal of a plurality of deformed streams from a plurality of antennas, respectively.

Problems associated with the above embodiments may be expressed as follows. Want to transmit the training signals by such a burst format as to improve the accuracy of channel estimation in a targeted radio apparatus. Want to transmit the training signals by such a burst format as to improve the accuracy of rate information in a targeted radio apparatus. Want to transmit data by such a burst format as to prevent the deterioration of communication quality of data even in a case when these training signals are transmitted. Want to utilize the training signals to have the data received.

Figure 25:
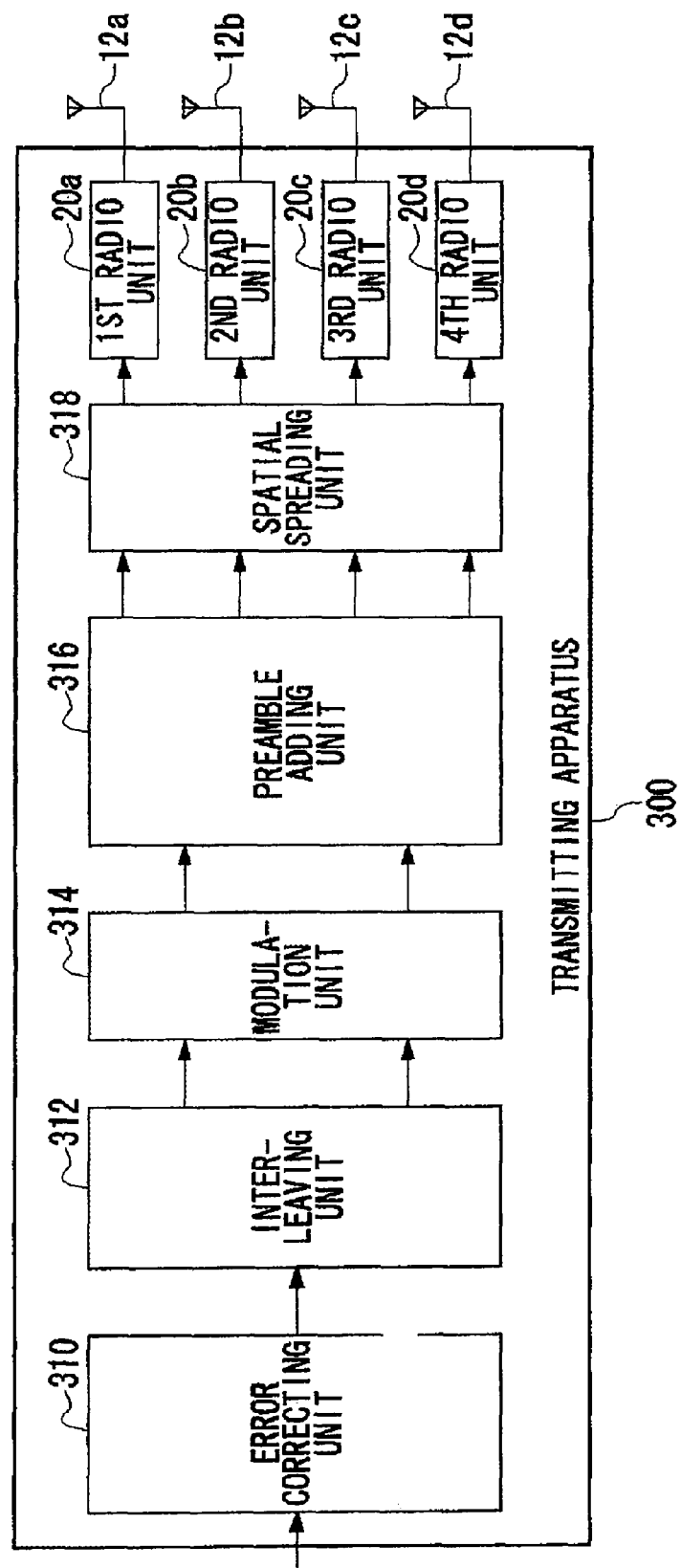
FIG. 25 illustrates a structure of a transmitting apparatus according to a second embodiment of the present invention.

FIG. 25 illustrates a structure of a transmitting apparatus 300 according to a second embodiment of the present invention. The transmitting apparatus 300 includes an error correcting unit 310, an interleaving unit 312, a modulation unit 314, a preamble adding unit 316, a spatial spreading unit 318, a first radio unit 20a, a second radio unit 20b, a third radio unit 20c and a fourth radio unit 20d, which are generically referred to as "radio unit 20", and a first antenna 12a, a second antenna 12b, a third antenna 12c and a fourth antenna 12d, which are generically referred to as "antennas 12". The transmitting apparatus 300 corresponds to part of the first radio apparatus 10a shown in FIG. 6.

The error correcting unit 310 carries out coding for error correction. Here, the convolutional coding is carried out and the coding rate thereof is selected from among predefined values. The interleaving unit 312 interleaves data on which the convolutional coding has been performed. The interleaving unit 312 separates data into a plurality of streams before outputting the data. Here, suppose that the data are separated into two streams. The data of two streams are mutually independent from each other.

The modulation unit 314 modulates the data of two streams, respectively. The preamble adding unit 316 adds a preamble to the modulated data. For that purpose, the preamble adding unit 316 stores MIMO-STSs, MIMO-LTSs and so forth as preambles. The preamble adding unit 316 generates a burst signal, composed of a plurality of streams, that contains MIMO-STSs and MIMO-LTSs assigned respectively in a plurality of streams and Data assigned in at least one of the plurality of streams. As described earlier, the data is formed by two streams. It is assumed herein that a plurality of streams is "4". Thus, MIMO-STSs and MIMO-LTSs are assigned respectively in a burst signal of four streams, and Data are assigned in two of four streams in the burst signal of four streams. As a result, a burst signal of four streams is outputted from the preamble adding unit 316. Though the detailed description of MIMO-STSs is omitted here, STSs corresponding to at least one of a plurality of streams in a burst signal of a plurality of streams may, for example, be defined to use subcarriers at least part of which differs from those corresponding to a burst signal of other streams. STSs may be defined in a manner such that the number of subcarriers to be used for each STS is the same and mutually different subcarriers are used. As described earlier, burst signals of a plurality of streams use different subcarries, respectively, and MIMO-LTSs assigned in the burst signals of a plurality of streams use different subcarries for each stream. In other words, the tone interleaving is carried out. Each of burst signals of a plurality of streams may be called "burst signal". Also, the burst signals of a plurality of streams may be collectively called "burst signals". In this patent specification, the term "burst signal" will be used without any such distinction therebetween.

The spatial spreading unit 318 multiplies, by a steering matrix each, the MIMO-LTS and the data among the burst signals of a plurality of streams so as to generate the MIMO-LTS multiplied by the steering matrix and the data whose count has been increased to the number of a plurality of streams. Before the multiplication, the spatial spreading unit 318 extends the degree of inputted data up to the number of a plurality of streams. The number of inputted data is "2" and is represented here by "Nin". Hence, the inputted data is expressed by a vector "Nin×1". The number of a plurality of streams is "4" and is represented here by "Nout". The spatial spreading unit 318 extends the degree of inputted data from Nin to Nout. That is, the vector "Nin×1" is extended to a vector "Nout×1". In so doing, "0's" are inserted to components from (Nin+1)th row to Nout-th row.

A steering matrix S is expressed by the following Equation (7).

$$S(\lambda) = C(\lambda)W \qquad (7)$$

The steering matrix is a matrix of "Nout×Nout". W is an orthogonal matrix. One example of the orthogonal matrices is Walsh matrix. Here, "λ" indicates the subcarrier number, and the multiplication by the steering matrix is carried out on a subcarrier-by-subcarrier basis. C is expressed by the following Equation (8) and is used for CDD.

$$C(\lambda) = \mathrm{dia}(1, \exp(-j2\pi\lambda\delta/N\mathrm{out}), \Lambda, \exp(-j2\pi\lambda\delta(N\mathrm{out}-1)/N\mathrm{out})) \qquad (8)$$

In Equation (8), δ indicates a shift amount. That is, the spatial spreading unit 318 carries out, stream by stream, the cyclic time shifting in the MIMO-LTS multiplied by an orthogonal, by a shift amount corresponding to each of a plurality of streams, and at the same time carries out, stream by stream, the cyclic time shifting in the data whose count has been increased to the number of a plurality of streams. It is to be noted that the structure of MIMO-LTS is similar to that of Legacy LTS which is equivalent to LTS in the IEEE802.11a standard. The shift amount is set to a value that differs for each stream. In the setting of shift amounts, at least one of shift amounts corresponding respectively to a plurality of streams is so set as to be greater than or equal to a predetermined cycle that the MIMO-STS had. Since the cycle that the MIMO-STS had is 1.6 μs, at least one of shift amounts is set to 1.6 μs, for instance. In this case, performing time shifting on MIMO-STS is equivalent to the fact that no time shift is generated. Thus, the time shifting is not performed here on MIMO-STS. As a result of the above processing, the spatial spreading unit 318 varies, modifies or deforms the structure of burst signals of a plurality of streams.

There are provided radio units 20 the number of which is equal to the number of antennas 12. The radio unit 20 transmits the deformed burst signals of a plurality of streams. Then the radio unit 20 transmits the burst signals of a plurality of streams by associating them to a plurality of antennas 12. The radio unit 20 includes an IFFT unit, a GI unit, a quadrature modulation unit, a frequency conversion unit and an amplification unit, which are all not shown here. The IFFT unit performs IFFT (Inverse Fast Fourier Transform), thereby converting a frequency-domain signal using a plurality of subcarriers into a time-domain signal. The GI unit adds a guard interval to time-domain data. The quadrature modulation unit carries out quadrature modulation. The frequency conversion unit performs a frequency conversion by transforming a quadrature-modulated signal into a radio-frequency signal. The amplification unit is a power amplifier for amplifying radio-frequency signals. It is to be noted that the spatial spreading unit 318 may be provided in a position posterior to the IFFT unit, not shown.

FIGS. 26A and 26B each illustrate a burst format of a burst signal generated in the transmitting apparatus 300. FIG. 26A illustrates a burst format of a burst signal of a plurality of streams outputted from the preamble adding unit 316. Since FIG. 26A is equivalent to FIG. 3B, the description thereof is omitted. Here, "4" MIMO-STSs and "4" MIMO-LTSs are added to burst signals of a plurality streams, namely, "four" streams, respectively. On the other hand, data of "2" streams which are at least one of a plurality of streams are added as "First Data" and "Second Data". FIG. 26B illustrates burst signals of a plurality of streams deformed by the spatial spreading unit 318. MIMO-STSs of FIG. 26B are the same as that of FIG. 26A. The MIMO-LTSs of FIG. 26A are multiplied by a steering matrix so as to become "MIMO-LTS's" of FIG. 26B. In FIG. 26B, these LTSs are indicated as "First MIMO-LTS'" to "Fourth MIMO-LTS'". As a result of multiplication by the steering matrix, the "First Data" and "Second Data" are turned into Data of four streams. In FIG. 26B, these data are shown as "First Data'" to "Fourth Data'".

According to the second embodiment, even if the number of data streams is less than the number of MIMO-LTS streams, the multiplication by orthogonal matrices and the cyclic time shift processing are carried out. As a result thereof, the number of data streams can be made equal to the number of MIMO-LTS streams. MIMO-LTS also undergoes the same processing as with Data. Thus, the radio apparatus to be communicated can use MIMO-LTS at the time of receiving the Data. MIMO-STS does not undergo the same processing with data streams. Thus, the time shift amount in CDD can be made large and the receiving characteristics of a radio apparatus to be communicated can be improved. MIMO-LTS is transmitted from all of the antennas, so that an assumed channel can be estimated at a receiving side. Even if the number of data streams is not equal to the number of antennas, signals can be evenly transmitted from all of the antennas by performing the Walsh matrices and CDD processing on data. The data power can be adjusted to MIMO-LTS.

Since the processing by Walsh matrices and CDD is also performed on MIMO-LTS, the channel estimated by MIMO-LTS can be used intact for receiving the data at a receiving side. When CDD is performed on MIMO-LTS and Data by a sufficient shift amount, the difference in power between MIMO-LTS and Data becomes very small, so that the accuracy of AGC setting at a receiving side can be improved. Furthermore, the time shifting with a large shift amount cannot be performed on MIMO-STS. Hence, in such a case, the power for MIMO-STS and the power for MIMO-LTS can be adjusted by associating MIMO-STS to all of antennas. Also, the power for MIMO-STS and the power for MIMO-LTS can be adjusted even if no CDD processing is done to MIMO-STS. MIMO-LTS has undergone the tone interleaving.

Hence, even if MIMO-LTS is transmitted from all of antennas, the transmission power can be retained by the processing of Walsh matrices and CDD. If the processing of Walsh matrices and CDD is not carried out and if data of two streams are transmitted by three antennas, each power within a burst signal is related such that "3 STSs"="3 LTSs">"2 Data". If, however, the processing by Walsh matrices and CDD is carried out, it can be related such that "3 STSs"="3 LTSs"="3 Data".

Third Embodiment

A third embodiment of the present invention corresponds to an embodiment in which the first embodiment and the second embodiment are combined together. That is, the radio apparatus generates training signals formed by burst formats as in the first embodiment, namely, burst signals of a plurality of streams. The radio apparatus also multiplies the thus generated burst signals of a plurality of streams by a steering matrix as in the second embodiment, so as to vary and deform the burst signals of a plurality of streams. The radio apparatus transmits the thus deformed burst signals of a plurality of streams from a plurality of antennas. Here, the radio apparatus may respectively multiply MIMO-STS, MIMO-LTS and Data contained in the burst signals of a plurality of streams, by a steering matrix.

A radio apparatus 10 according to the third embodiment is of the same type as the first radio apparatus 10a of FIG. 6. The transmitting functions in the radio apparatus 10 according to the third embodiment is of the same type as the transmission apparatus 300 of FIG. 25. The control unit 30 and/or the preamble adding unit 316 generate burst signals of a plurality of streams which contain MIMO-STS assigned in at least one of a plurality of streams, MIMO-LTS assigned respectively in a plurality of streams, and Data assigned in the same streams as MIMO-STS. The control unit 30 and/or the preamble adding unit 316 arrange them such that a portion assigned in a stream in which MIMO-STS is assigned, among MIMO-LTSs, and a portion assigned in a stream other than the stream assigned in which MIMO-STS is assigned, among MIMO-LTSs, are placed at different timings. As a result thereof, burst signals having the burst formats as shown in FIG. 21A are produced. The spatial spreading unit 318 deforms burst signals of a plurality of streams by multiplying the thus produced burst signals of a plurality of streams by a steering matrix. The spatial spreading unit 318 also multiplies MIMO-STS by a steering matrix and carries out time shifting with its time shift amount being an arbitrary value. The rest of operation is the same as in the second embodiment and the description thereof is omitted. FIG. 27 illustrates a structure of a burst format according to the third embodiment of the present invention. FIG. 27 corresponds to a burst format for a burst signal of a plurality of streams outputted from the spatial spreading unit 318 and corresponds to a burst format in which a steering matrix is multiplied to the burst format of FIG. 21A. "First MIMO-STS'" to "Third MIMO-STS'" of FIG. 27 correspond to a result of "First MIMO-STS" and "Second MIMO-STS" of FIG. 21A multiplied by a steering matrix. The steering matrix corresponds to a "3×3" matrix. Thus, it is extended to "3×1" vectors by adding rows composed of "0"s in "First MIMO-STS" and "Second MIMO-STS" of FIG. 21A. "First MIMO-LTS'" to "Third MIMO-LTS'" of FIG. 27 correspond to a result of "First MIMO-LTS" and "Second MIMO-LTS" of FIG. 21A multiplied by a steering matrix. "Fourth MIMO-LTS'" to "Sixth MIMO-LTS'" of FIG. 27 correspond to a result of "Third MIMO-LTS" FIG. 21A multiplied by a steering matrix. Data are the same as in the second embodiment.

It is to be noted that burst formats for burst signals of a plurality of streams generated by the control unit 30 and/or preamble adding unit 316 may correspond to FIGS. 22A and 22B. The description on these burst formats are the same as those in the first embodiment and are thus omitted here. The spatial spreading unit 318 multiples a steering matrix to these burst signals. It is preferred that the burst signals of a plurality of streams, which are the above training signals, are transmitted at the timing explained in the first embodiment. That is, it is preferred that the control unit 30 generates a rate request signal with which to supply a radio apparatus 10 with information on a data rate corresponding to a radio channel between radio apparatuses 10, and the training signals are used when the radio apparatus 10 transmits the thus generated rate request signal. The details thereof are the same as in the first embodiment and the description thereof is omitted here. With a plurality of antennas 12 of the first embodiment replaced by the burst signals of a plurality of streams, the present invention according to the first embodiment is applied to the third embodiment. According to the third embodiment, as described above, a steering matrix is multiplied to the burst signals of a plurality of streams and the signals of a plurality of streams multiplied by the steering matrix are transmitted from a plurality of antennas 12.

According to the third embodiment, when a rate request signal is outputted to a targeted radio apparatus, MIMO-LTSs assigned in a plurality of streams are outputted while a steering matrix is being multiplied thereto. Thus the data rate information, in the targeted radio apparatus, which is newly produced based on MIMO-LTS can be obtained and the accuracy of information can be improved. Various burst formats as shown in the first embodiment can be transmitted from a plurality of antennas by multiplying a steering matrix to the various burst formats as shown in the first embodiment. Even if the number of data is less than that the number of antennas, the data and the like can be transmitted from a plurality of antennas by multiplying a steering matrix thereto. Also, even if the number of data is less than the number of antennas, the same advantageous effects as when the data and the like are transmitted from a plurality of antennas can be obtained by multiplying a steering matrix thereto.

Fourth Embodiment

A fourth embodiment of the present invention relates to a burst format which can be applied to the first to third embodiments. Here, the burst format may be defined as a burst signal outputted from antennas as in the first embodiment or defined as a burst signal generated by a control unit or preamble adding unit as in the second or third embodiment. A burst format according to the fourth embodiment is used as a burst signal used when the training signals are transmitted. However, the timing at which a burst signal having said burst format is to be transmitted may be after the acceptance of training signals or upon transmission of a rate request signal as in the first embodiment.

The radio apparatus 10 according to the fourth embodiment is of the same type as the first radio apparatus 10*a* shown in FIG. 6. Three kinds of burst formats are explained here. The three kinds of burst formats are each subdivided into a case where it is defined as a burst signal outputted from antennas as in the first embodiment and a case where it is defined as a burst signal generated by a control unit and/or preamble adding unit as in the second or third embodiment. They are also subdivided in terms of the timing at which the burst signal is transmitted. The burst format per se will be mainly explained here. Specific implementation for such subdivision will be made based on the description of first to third embodiments.

The three kinds of burst formats correspond to the case when the number of antennas 12 that should transmit MIMO-LTS is greater than the number of antennas 12 that should transmit Data or when the number of streams in which MIMO-LTS is assigned is greater than the number of streams in which Data is assigned. This can be said to be a modification to FIG. 3B, FIGS. 19A and 19B, FIGS. 21A to 21D and FIG. 26A.

A first modification will now be described. The first modification is explained with reference to FIG. 19A. In FIG. 19A, MIMO-LTSs are so assigned as to correspond to the first antenna 12*a* to third antenna 12*c*, and Data are so assigned as to correspond to the first antenna 12*a* and second antenna 12*b*. The first modification relates to the selection of antenna 12 for use with Data when the number of antennas 12 that should transmit MIMO-LTS (hereinafter, all of or one of such antennas 12 will be referred to as "LTS antenna 12" is greater than the number of antennas 12 that should transmit Data (hereinafter, all of or one of such antennas 12 will be referred to as "Data antenna 12"). Problems associated with this modification are expressed as follows. In an antenna 12 where no Data is transmitted, no MIMO-STS is transmitted from this antenna 12, too. Accordingly, if the signal strength of MIMO-LTS transmitted from said antenna 12 becomes, at a receiving side, larger than the signal strength of MIMO-LTS transmitted from the other antenna 12, a distortion is likely to occur in received MIMO-LTSs. Hence, Data is likely to suffer an error and the communication quality is likely to deteriorate. As in Step 64 of FIG. 11, the radio apparatus 10 according to this modification measures the strength of signals received from a targeted radio apparatus, for each of a plurality of antennas 12. Here, the signal strength may be measured in not only the MIMO-STS or MIMO-LTS across burst signals but also an arbitrary portion of the burst signal. Based on the measured signal strength, the radio apparatus 10 selects at least one antenna 12 from among a plurality of antennas 12. The selected antenna 12 corresponds to the data antenna 12. For instance, selected are antennas 12 that have received signals having the largest and the second largest signal strength. More specific explanation is as follows. The radio apparatus 10 measures the strength of signals received by the first antenna 12*a* to third antenna 12*c*. The radio apparatus 10 selects the first antenna 12*a* and second antenna 12*b* according to the magnitude of the signal strength measured. A burst signal in which Data are assigned is produced so as to be associated to the selected first antenna 12*a* and second antenna 12*b*. The symmetric property in radio channel at transmission and receiving sides is utilized here.

In the first modification, the following combination is also possible. The antenna 12 selected for transmitting Data may be contained in the antennas 12 selected for transmitting MIMO-LTS. Accordingly, the first modification may be applied to the cases shown in FIG. 11 and FIG. 12. The training signals having the burst format according to the first modification may be transmitted after the training request signal has been accepted or when the rate request signal is transmitted, as in the first embodiment. Accordingly, the first modification may be applied to the cases shown in FIG. 4, FIG. 5, and FIG. 9 to FIG. 16. Moreover, a modification may be such that a modified burst format is not so defined as to correspond to the antenna 12 but defined in a burst signal generated by the control unit 30 and/or preamble adding unit 316, as in the second or third embodiment. In such a case, the transmitting functions in the radio apparatus 10 may be of the same type as those of the transmitting apparatus shown in FIG. 25. A steering matrix may be applied as in the transmitting apparatus 300 shown in FIG. 25.

A second modification will now be described. The second modification relates to MIMO-LTSs transmitted from antennas 12, among LTS antennas 12, other than Data antennas 12 when the number of LTS antennas 12 is greater than the number of Data antenna 12. Problems associated with this second modification are expressed the same way as those in the first modification. In the case of FIG. 19A, the antennas 12, among the LTS antenna 12, other than the Data antennas 12 correspond to the third antenna 12c.

In the second modification, the amplitude of the third MIMO-LTS transmitted from the third antenna 12c is defined to be a value less than the amplitude of the first MIMO-LTS and second MIMO-LTS transmitted from the first antenna 12a and second antenna 12b, respectively. This corresponds to a case where the amplitude of the third MIMO-LTS is ½ of the amplitude in the first MIMO-LTS and the second MIMO-LTS. The first antenna 12a and second antenna 12b correspond to Data antennas 12. According to the second modification, the signal strength of the third MIMO-LTS can be made smaller by reducing the amplitude of the third MIMO-LTS transmitted from the third antenna 12c. When the signal strength of the third MIMO-LTS gets small, the distortion against MIMO-LTS becomes less likely to occur even if no MIMO-STS is added to the third MIMO-LTS. The accurate channel can be estimated by correcting at the receiving side the thus reduced signal strength of the MIMO-LTS.

In the second modification, the same combination as in the first modification is also possible. It is effective to reduce the amplitude of part of MIMO-LTS in FIG. 3B, FIGS. 19A and 19B and FIG. 21A to FIG. 21D. The second modification can also be applied to the case of FIG. 26A. More specifically, a steering matrix may be applied to the second modification. For instance, the second modification is applied to the burst format shown in FIG. 19A and thereafter a steering matrix is applied to this burst format, which will result in the burst format as shown in FIG. 27.

Next, a third modification will be described. Similarly to the second modification, the third modification relates to MIMO-LTSs transmitted from antennas 12, among LTS antennas 12, other than Data antennas 12 when the number of LTS antennas 12 is greater than the number of Data antenna 12. Problems associated with this third modification are expressed the same way as those in the first modification. In the case of FIG. 19A, the antennas 12, among the LTS antenna 12, other than the Data antennas 12 correspond to the third antenna 12c. In the third modification, the number of subcarriers used in the third MIMO-LTS transmitted from the third antenna 12c is defined to be a value less than the number of subcarriers used in the first MIMO-LTS and second MIMO-LTS transmitted from the first antenna 12a and second antenna 12b.

This is equivalent to the case where "52 subcarries" are used in the first MIMO-LTS and second MIMO-LTS but "26 subcarriers" are used in the third MIMO-LTS. The first antenna 12a and second antenna 12b correspond to Data antennas 12. According to the third modification, the signal strength of the third MIMO-LTS can be made smaller by reducing the number of subcarriers used for the third MIMO-LTS. When the signal strength of the third MIMO-LTS gets small, the distortion against MIMO-LTS becomes less likely to occur even if no MIMO-STS is added to the third MIMO-LTS. Although part of the subcarriers is not used at a transmitting side, channels for all of the subcarriers can be estimated if channels estimated for predetermined subcarriers are interpolated and supplemented at a receiving side.

In the third modification, the same combination as in the first modification is also possible. In other words, it is effective not to use part of subcarriers in FIG. 3B, FIGS. 19A and 19B and FIGS. 21A to 21D. The third modification can be applied to the case of FIG. 26A. More specifically, a steering matrix may be applied to the third modification. For instance, the third modification is applied to the burst format shown in FIG. 19A and thereafter a steering matrix is applied to this burst format, which will result in the burst format as shown in FIG. 27.

According to the present embodiment, when antennas that should transmit MIMO-STSs and Data are decided, an antenna whose strength of a signal received is larger is preferentially used. As a result, when a targeted radio apparatus receives a burst signal, the signal strength of MIMO-STS becomes large to a certain degree. Hence, AGC is set in a manner that the gain is somehow low. As a result thereof, the occurrence probability of distortion against MIMO-LTS on account of AGC can be reduced. Since the occurrence probability of distortion against MIMO-LTS can be reduced, the deterioration of data error can be prevented. Since the deterioration of data error can be prevented, the deterioration of communication quality can be prevented. The channel estimation can be done accurately. The data transmission efficiency can be improved.

The amplitude of the MIMO-LTSs transmitted from antennas other than Data antennas is set to a value smaller than the amplitude of the other MIMO-LTSs, so that the occurrence probability of distortion against MIMO-LTS can be reduced at a receiving side. The number of subcarriers in MIMO-LTS transmitted from the antennas other than the Data antennas is set to a value smaller than the number of subcarriers in the other MIMO-LTSs, so that the occurrence probability of distortion against MIMO-LTS can be reduced at the receiving side. The third modification can be applied to the case when a steering matrix is used.

The present invention has been described based on the embodiments which are only exemplary. It is therefore understood by those skilled in the art that other various modifications to the combination of each component and process described above are possible and that such modifications are also within the scope of the present invention.

In the first embodiment of the prevent invention, the selector 28 selects preferentially the antennas 12 whose strengths of received signals are larger. However, the present invention is not limited thereto and, for example, delay spread may be derived for each of the antennas 12 and antennas 12 whose delay spreads are smaller may be preferentially selected. According to this modification, the antennas 12 having less effect of delayed wave can be selected. That is, this modification can be used so long as the wireless quality of antennas 12 is satisfactory.

In the first embodiment of the present invention, the first radio apparatus 10a controls so that the number of antennas 12 to be used when the training signals are transmitted is equal to the number of antennas 12 to be used when the training signals are received. However, the present invention is not limited thereto and different controls may be exercised. For example, the processing unit 22 receives training signals for use with receiving, from the second radio apparatus 10b via a plurality of antennas 12, and the selector 28 selects at least one antenna, among a plurality of antennas, that should transmit the training signals. In this case, the selector 28 may derive wireless qualities corresponding respectively to a plurality of antennas 12, based on the received training signals for use with receiving and then select preferentially antennas whose wireless qualities are desirable. According to this modification, the number of transmitting antennas 12 and the number of receiving antennas 12 can be set independently from each other.

A modification resulting from the combination of the first embodiment and the second embodiment is also effective. For instance, in the present embodiments, the number of a plurality of streams finally transmitted from the radio unit 20 may be less than the number of antennas 12, in accordance with description of the first embodiment. According to this modification, the advantageous aspects gained by combining the first embodiment with the second embodiment are obtained.

Arbitrary combination among the first to fourth embodiments is also effective. According to this modification, the advantageous aspects gained by this combination thereamong is obtained.

Data may be composed of a plurality of streams. A known signal may be composed of a plurality of streams. A control signal may be composed of a plurality of streams.

It is to be noted that any arbitrary combination of the above-described structural components and expressions changed among a method, an apparatus, a system, a recording medium, a computer program and so forth are all effective as and encompassed by the present embodiments.

Moreover, this summary of the invention does not necessarily describe all necessary features so that the invention may also be sub-combination of these described features.

While the preferred embodiments of the present invention have been described using specific terms, such description is for illustrative purposes only, and it is to be understood that changes and variations may be made without departing from the spirit or scope of the appended claims.

What is claimed is:

1. A radio apparatus, comprising:
   a generating unit configured for generating a burst signal that comprises:
   (1) STS(s) (Short Training Sequence(s)) for AGC (Automatic Gain Control), operative in a MIMO system assigned to N of M streams, where N and M are integers, N is less than M, and N is equal to or greater than 1,
   (2) LTSs (Long Training Sequences) for channel estimation, operative in the MIMO system assigned to the respective M streams, and
   (3) data assigned to the N of M streams, each of the N of M streams including the STS, the LTS, and the data in that order in a time sequence; and
   a plurality of antennas configured for transmitting the burst signal generated by the generating unit,
   wherein transmitting timing of the LTS assigned to the N of M streams is different from that of another LTS which is not assigned to the N of M streams.

2. The radio apparatus according to claim 1, wherein N is variable.

3. A radio apparatus, comprising:
   a generating unit configured for generating a burst signal that comprises:
   (1) STS(s) (Short Training Sequence(s)) for AGC (Automatic Gain Control), operative in a MIMO system assigned to N of M streams, where N and M are integers, N is less than M, and N is equal to or greater than 1,
   (2) LTSs (Long Training Sequences) for channel estimation, operative in the MIMO system assigned to the respective M streams, and
   (3) data assigned to the N of M streams, each of the N of M streams including the STS, the LTS, and the data in that order in a time sequence;
   a power amplifier configured for amplifying the burst signal generated by the generating unit; and
   a plurality of antennas configured for transmitting the burst signal amplified by the power amplifier,
   wherein transmitting timing of the LTS assigned to the N of M streams is different from that of another LTS which is not assigned to the N of M streams.

4. The radio apparatus according to claim 3, wherein N is variable.

5. A radio apparatus, comprising:
   a generating unit configured for generating a digital burst signal that comprises:
   (1) STS(s) (Short Training Sequence(s)) for AGC (Automatic Gain Control), operative in a MIMO system assigned to N of M streams, where N and M are integers, N is less than M, and N is equal to or greater than 1,
   (2) LTSs (Long Training Sequences) for channel estimation, operative in the MIMO system assigned to the respective M streams, and
   (3) data assigned to the N of M streams, each of the N of M streams including the STS, the LTS, and the data in that order in a time sequence;
   a D-A conversion unit configured for converting the digital burst signal generated by the generating unit into an analog burst signal;
   a power amplifier configured for amplifying the analog burst signal converted by the D-A conversion unit; and
   a plurality of antennas configured for transmitting the analog burst signal amplified by the power amplifier,
   wherein transmitting timing of the LTS assigned to the N of M streams is different from that of another LTS which is not assigned to the N of M streams.

6. The radio apparatus according to claim 5, wherein N is variable.

7. A radio apparatus, comprising:
   a generating unit configured for generating a burst signal that comprises:
   (1) STS(s) (Short Training Sequence(s)) for AGC (Automatic Gain Control), operative in a MIMO system assigned to N of M streams, where N and M are integers, N is less than M, and N is equal to or greater than 1,
   (2) LTSs (Long Training Sequences) for channel estimation, operative in the MIMO system assigned to the respective M streams, and
   (3) data assigned to the N of M streams, each of the N of M streams including the STS, the LTS, and the data in that order in a time sequence; and
   a power amplifier configured for amplifying the burst signal generated by the generating unit,
   wherein transmitting timing of the LTS assigned to the N of M streams is different from that of another LTS which is not assigned to the N of M streams.

8. The radio apparatus according to claim 7, wherein N is variable.

9. A radio apparatus, comprising:
   a generating unit configured for generating a digital burst signal that comprises:
   (1) STS(s) (Short Training Sequence(s)) for AGC (Automatic Gain Control), operative in a MIMO system assigned to N of M streams, where N and M are integers, N is less than M, and N is equal to or greater than 1,
   (2) LTSs (Long Training Sequences) for channel estimation, operative in the MIMO system assigned to the respective M streams, and (3) data assigned to the N of M streams, each of the N of M streams including the STS, the LTS, and the data in that order in a time sequence;

a D-A conversion unit configured for converting the digital burst signal generated by the generating unit into an analog burst signal; and a power amplifier configured for amplifying the analog burst signal converted by the D-A conversion unit, wherein transmitting timing of the LTS assigned to the N of M streams is different from that of another LTS which is not assigned to the N of M streams.

10. The radio apparatus according to claim 9, wherein N is variable.

* * * * *